(12) United States Patent
Mueller

(10) Patent No.: US 6,871,456 B1
(45) Date of Patent: Mar. 29, 2005

(54) A-FRAME SHEAR ASSEMBLY FOR WALLS

(76) Inventor: Lee W. Mueller, 4132 Rainbow Blvd. PBM #247, Las Vegas, NV (US) 89103

( * ) Notice: Subject to any disclaimer, the term of this patent is extended or adjusted under 35 U.S.C. 154(b) by 0 days.

(21) Appl. No.: 10/890,814

(22) Filed: Jul. 13, 2004

Related U.S. Application Data

(62) Division of application No. 09/932,181, filed on Aug. 17, 2001, now Pat. No. 6,761,001.
(60) Provisional application No. 60/226,354, filed on Aug. 18, 2000.

(51) Int. Cl.$^7$ ................................................ E04B 1/98
(52) U.S. Cl. ......................... 52/167.4; 52/300; 52/769; 52/773; 52/1
(58) Field of Search ........................ 52/300, 764, 769, 52/773, 167.1, 167.3, 167.4, 1

(56) References Cited

U.S. PATENT DOCUMENTS

| | | |
|---|---|---|
| 140,526 A | 7/1873 | Munson, Jr. |
| 2,780,936 A | 2/1957 | Hillberg |
| 3,037,593 A | 6/1962 | Webster |
| 3,328,927 A | 7/1967 | Kates |
| 3,418,768 A | 12/1968 | Cardan |
| 3,822,521 A | 7/1974 | Lucas |
| 3,871,153 A | 3/1975 | Birum, Jr. |
| 3,894,370 A | 7/1975 | Parazader |
| 4,078,350 A | 3/1978 | Ting |
| 4,603,531 A | 8/1986 | Nash |
| 4,631,894 A | 12/1986 | Jerila |
| 4,641,726 A | 2/1987 | Fearon et al. |
| 4,675,238 A | 6/1987 | Karoubas |
| 4,905,444 A | 3/1990 | Semaan et al. |
| 4,910,929 A | 3/1990 | Scholl |
| 5,054,251 A | 10/1991 | Kemeny |
| 5,303,520 A | 4/1994 | Gozdziak |
| 5,375,384 A | 12/1994 | Wolfson |
| 5,390,466 A | 2/1995 | Johnson et al. |
| 5,456,047 A | 10/1995 | Dorka |
| 5,619,837 A | 4/1997 | DiSanto |
| 5,630,298 A | 5/1997 | Tsai et al. |
| 5,687,529 A | 11/1997 | Pickering |
| 5,706,626 A | 1/1998 | Mueller |

(Continued)

OTHER PUBLICATIONS

Fahim Sadek, Bijan Mohraz, Andrew W. Taylor, and Riley M. Chung, "Passive Energy Dissipation Devices for Seismic Applications", NISTIR 5923, United States Department of Commerce Technology Administration, Nov. 1996.

(Continued)

*Primary Examiner*—Naoko Slack
(74) *Attorney, Agent, or Firm*—Knobbe, Martens, Olson & Bear, LLP

(57) ABSTRACT

Lateral motion devices are used in conjunction with shear assemblies to further dissipate shear forces on buildings. In one embodiment, the lateral motion device is interposed between the shear assembly and the upper portion of the wall to permit relative motion therebetween and to absorb and dissipate a portion of the shear forces through expansion and/or compression of spring members. In another embodiment, the lateral motion device is interposed between the foundation and the bottom of the shear assembly and in yet another embodiment, the lateral motion device is embedded in the foundation so as to be interposed between the anchor bolt and the foundation. The shear assembly can be either a panel assembly or an A-frame assembly.

20 Claims, 40 Drawing Sheets

U.S. PATENT DOCUMENTS

| | | | |
|---|---|---|---|
| 5,727,663 | A | 3/1998 | Taylor |
| 5,819,484 | A | 10/1998 | Kar |
| 5,870,863 | A | 2/1999 | Taylor |
| 5,904,025 | A | 5/1999 | Bass et al. |
| 5,913,788 | A | 6/1999 | Herren |
| 5,934,028 | A | 8/1999 | Taylor |
| 6,006,487 | A | 12/1999 | Leek |
| 6,012,256 | A | 1/2000 | Aschheim |
| 6,058,668 | A | 5/2000 | Herren |
| 6,148,583 | A | 11/2000 | Hardy |
| 6,212,849 | B1 | 4/2001 | Pellock |
| 6,233,884 | B1 | 5/2001 | Tipping et al. |
| 6,247,275 | B1 | 6/2001 | Taylor |
| 6,405,493 | B1 | 6/2002 | Taylor |
| 6,560,940 | B2 | 5/2003 | Mueller |

OTHER PUBLICATIONS

PACO The Engineered Steel Company brochure.
Light Beam System, Low Cost Steel Frame Housing, Light Beam Inc., Brochure, Jan. 1997.
Light Beam System, LBN Shear Panel, Light Beam, Inc. Brochure, Jan. 1997.
Ultra–Span Prefabricated Light Gauge Steel Truss System, MiTek, Brochure, 1996.
CeeWal brochure Jul. 1999.
Shear Max Panel, brochure, 1998.
Zwall, Strength Where You Need It, brochure.
ICBO Evaluation Service, Inc., Evaluation Report, Strong–Wall Shear Panels, Simpson Strong Tie Company, PFC–5485, Feb. 1, 1999.
Strong–Wall Shearwall, Simpson Strong Tie brochure, 1999.
Strong–Wall Shearwall brochure, Simpson Strong Tie Connectors, Form PF–SW3 3/99 EXP Jun. 2000.
Shear Max™ Panel, Product description brochure, 1998, 1 page.
Shear–Max™ Panel, Installation Instructions, 1 page.
Multi–Direction Insert brochure, Connection Specialties, Inc.
SEMCO Metal Connectors, Southeastern Metals Manufacturing Company, Inc. Catalog, 1998.

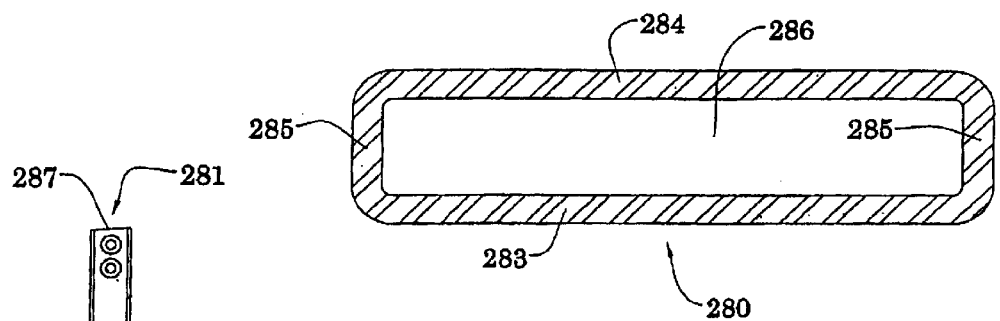
FIG. 3B
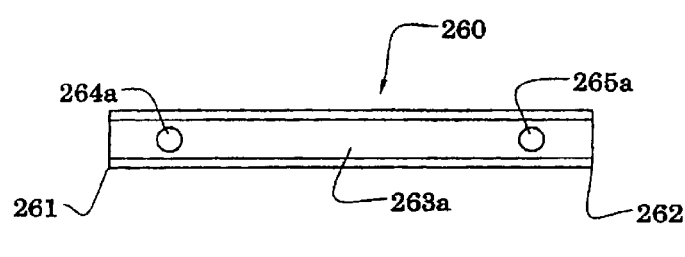
FIG. 3C
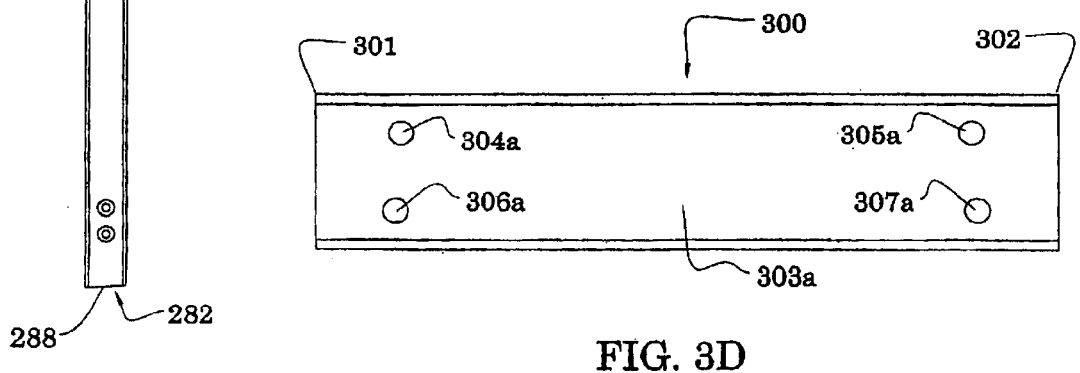
FIG. 3D
FIG. 3A

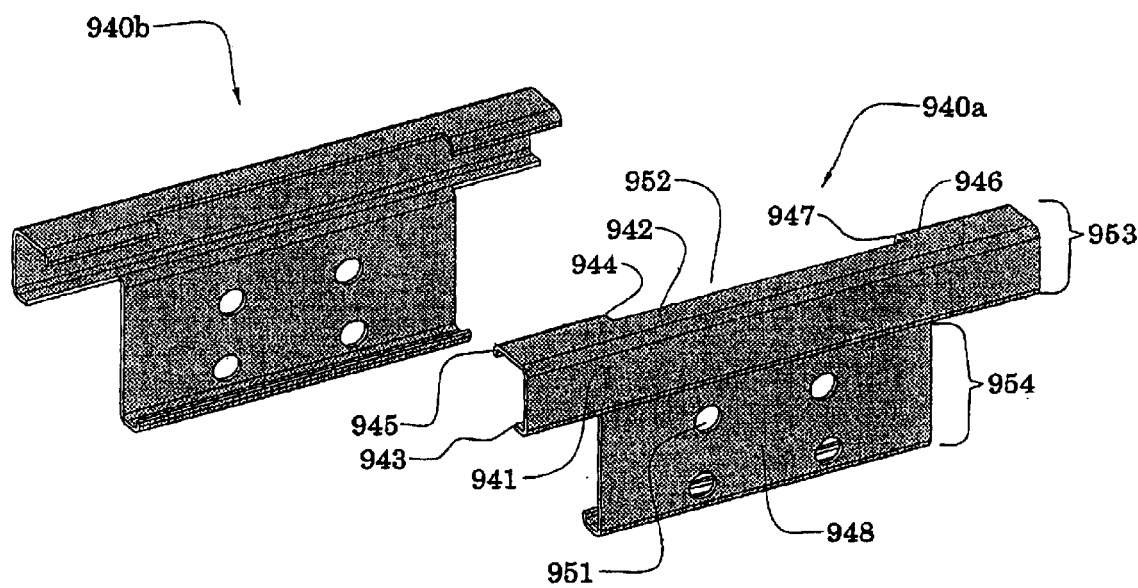
FIG. 9F
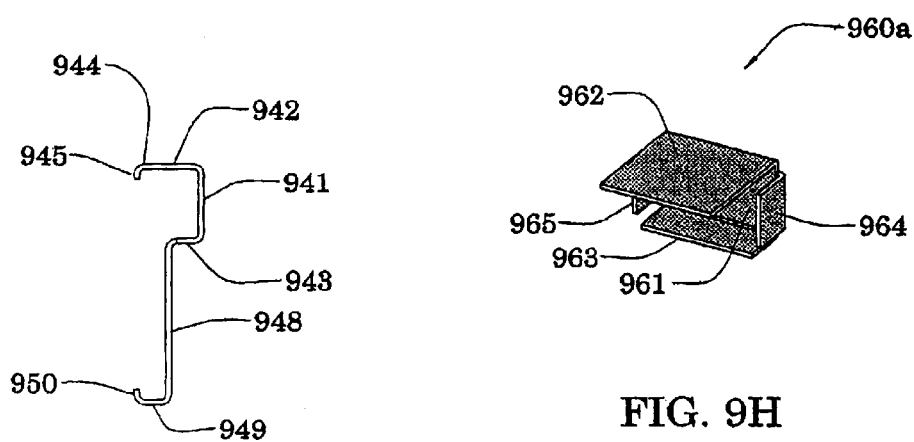
FIG. 9G
FIG. 9H

A-FRAME SHEAR ASSEMBLY FOR WALLS

RELATED APPLICATIONS

This application is a divisional of U.S. patent application Ser. No. 09/932,181, filed on Aug. 17, 2001, entitled "A-FRAME SHEAR ASSEMBLY FOR WALLS," now U.S. Pat. No. 6,761,001 B2 issued on Jul. 13, 2004. This application also claims the benefit of U.S. Provisional Application No. 60/226,354, filed on Aug. 18, 2000, entitled "A-FRAME SHEAR ASSEMBLY FOR WALLS."

BACKGROUND OF THE INVENTION

1. Field of the Invention

The invention relates to the construction industry and, in particular, concerns a method of providing lateral strengthening of wall structures using factory manufactured, field installed A-frame shear assembly with ductile attachment members.

2. Description of the Related Art

Low-rise, commercial, institutional and residential (single and multifamily) buildings comprise the majority of buildings in the United States. Within this group of buildings, by far the most prevalent type of structure is the light framed structure, specifically wood or cold-formed/light-gauge steel framing. In the typical light framed building structure, as in any other building structure, the basic structural design goals is to ensure the safe performance of the building under anticipated loading conditions. Safe performance may include, but is not limited to, one or more of the following performance objectives: operational/immediate occupancy performance, life safety performance and collapse prevention performance (FEMA-273 "NEHRP Guidelines for the Seismic Rehabilitation of Buildings," 1997).

The loads to be considered in design vary in the degree by which they can be reasonably (in a probabilistic sense) defined. Fundamentally though, there are two types of load to consider in design: gravity and lateral loads. Gravity loads, as the name implies, act vertically and they have one characteristic that makes them more deterministic than lateral loads—they can be controlled to some extent. Lateral loads (for example those induced by earthquakes and hurricane/tornado winds) are unpredictable in both occurrence and magnitude. In design for lateral load, the conventional philosophy has been to provide a lateral load resisting structural system that is strong enough to resist the maximum expected design event. In earthquake resistant design, this philosophy is further augmented by the additional requirement for inelastic deformation capability (ductility) of the lateral load resisting system. Inherent in this ductility requirement is the understanding that under the maximum design event, a building will undergo some amount of damage associated with the design performance objectives stated above.

In conventional light framed building construction, gravity and lateral load resistance is achieved essentially by a stick frame (studs, joists, rafter and trusses) for the gravity loads and sheathing attached to the stick frame for lateral loads. Loads are typically generated at different levels within the building and must be carried to the foundation via the combined action of the stick frame and the attached sheathing. This combined action implies that some elements of the gravity and lateral load systems will be common. As a result, failure of any one of these common elements under one loading condition (say lateral) can compromise the integrity of the entire system under the other condition.

Sheathed stick-framed walls that are designed to resist lateral loads are commonly referred to in the literature as shear walls or vertical diaphragms. The details of how a shear wall resists lateral load are quite complex. Generally though, the basic mechanism of resistance is achieved by a transfer of load from the point where they are generated into the frame, from the frame into the sheathing, from the sheathing back into the frame and from the frame into the foundation. Because of this load path, each component in the load path needs to have capacity of transferring the full load for a shear wall to work as expected. In other words, the performance of the shear wall is controlled by its weakest link. In earthquake resistant design, performance is attained by having the capacity to transfer loads at the foundation be higher than the capacity of the sheathing to frame attachment.

The sheathing materials commonly used in light frame shear wall construction typically include plywood, oriented strand board, fiberboard, gypsum wallboard/sheathing board, siding and sheet steel. The sheathing is typically attached to the frame with nails, staples or screws. In some cases, as may be the case with light gauge steel framing, sheet steel may be attached to the frame by clinching, welding or an adhesive. Additionally, in cold-formed steel construction lateral resistance may also be accomplished with flat-strap x-bracing. These generic systems, which are typically included in building codes, are not the only means of providing lateral resistance. In fact, other prefabricated systems are available for use as braced wall components. The primary benefits of these systems are improved performance due to the quality control associated with fabrication of the component and ease of installation in the field.

The aforementioned prefabricated systems, though more advanced than shear and x-braced walls, provide a response similar to that of the conventional field-built shear wall. That is, to develop a certain level of lateral resistance under the design event, these systems must undergo significant inelastic deformation (damage) which in turn results in damage to the contents and other non-structural components of the building. Furthermore, conventional shear walls and other prefabricated panel systems used in light framed buildings, may have to be comparatively large or strong to withstand the magnitude of lateral loads and/or deformations that are generated in design events or as limited by building codes. For example, most building codes limit the inelastic story drift or lateral displacement to between 2 inches and 2.5 inches for an 8-foot wall height in all types of buildings. To meet this limitation, the braced wall (shear wall, x-bracing or prefabricated system) must generally be ductile (ability to deform), strong and stiff. As the stiffness and strength of bracing components increase, the demands placed on other components of the structure also increases, thereby requiring larger members. It can be appreciated that multi-story buildings will be more susceptible to larger lateral forces/deformations often necessitating even larger lateral bracing structures. Increased spatial requirements for the lateral bracing system exacerbates the problem of a limited amount of space in walls of smaller lengths.

Hence, there is a need for a lateral bracing system that is easy to install, is comparatively small in size so that it can be readily installed in walls having short lengths, has the ability to dissipate energy without significant damage to the structures (and its components), has the ability to reduce the magnitude of deformations and forces induced in the building, improves life-safety of occupants and protects building functionality. To this end, there is a need for a prefabricated internal shear assembly with a mechanical lateral motion dampening device.

SUMMARY OF THE INVENTION

The aforementioned needs are satisfied by the A-frame shear assembly of the present invention which, in one aspect is comprised of a shear assembly for reducing shear and uplift forces between an upper portion of a wall and a foundation of a building, the assembly comprising an anchor assembly having a first and a second lateral end adapted to anchor the shear assembly to the foundation of the building; an attachment assembly adapted to be attached to the upper portion of the wall; a first elongate member having an upper and a lower end interconnecting the anchor assembly and the attachment assembly wherein the upper end of the first elongate member is attached to a first lateral position on the attachment assembly and wherein the lower end of the first elongate member is attached to a first lateral position on the anchor assembly; and a second elongate member having an upper and a lower end interconnecting the anchor assembly and the attachment assembly wherein the upper end of the second elongate member is attached to a third lateral position on the attachment assembly and wherein the lower end of the second elongate member is attached to a fourth lateral position on the anchor assembly and wherein the first and third lateral positions on the attachment assembly are located inward of the second and fourth lateral positions on the anchor assembly such that when a lateral shear force is exerted on the upper portion of the wall, one of the first and second elongate members is in compression and the other one of the first and second elongate members is in tension.

In another aspect of the invention the A-frame shear assembly is comprised of a shear assembly for reducing the effects of shear forces on a building structure that includes a wall attached to a foundation, the shear assembly comprising a head assembly that attaches to an upper portion of the wall; an anchor assembly that attaches to the foundation; an interconnecting structure that interconnects the head assembly to the anchor assembly so as to transfer forces between the upper portion of the wall and the foundation, the interconnecting structure comprising a first leg with first and second ends, and a second leg with first and second ends, wherein the first end of the first leg and the first end of the second leg are connected to the head assembly so as to be separated by a first distance, and the second end of the first leg and the second end of the second leg are connected to the anchor assembly so as to be separated by a second distance, wherein the first distance is less than the second distance such that the interconnecting structure resists relative movement between the head assembly and the anchor assembly by combinations of compression and tension of the first and second legs, wherein a lateral shear force applied at the upper portion of the wall is transferred to the foundation through the head assembly and through the interconnecting structure such that one of the legs is in compression while the other leg is simultaneously in tension.

A third aspect of the invention is comprised of a shear assembly for reducing the effects of lateral and vertical shear forces on a building structure that includes a wall having a plurality of vertical framing members and at least one upper horizontal plate interconnecting the plurality of vertical framing members wherein the wall is attached to a foundation, the assembly comprising a head assembly that attaches to the horizontal plate of the wall; an anchor assembly that attaches to the foundation; an interconnecting structure positioned between at least two of the vertical framing members of the wall wherein the interconnecting structure has a first end that is mechanically coupled to the head assembly and a second end that is mechanically coupled to the anchor assembly, wherein the interconnecting structure transfers forces between the first and second end; and a lateral motion damping device that is mechanically coupled to the shear assembly so as to be interposed between the building structure and the shear assembly so as to permit limited relative movement between the shear assembly and the building structure such that at least a portion of the lateral shear forces exerted on the upper portion of the wall are dissipated by lateral damping device.

A fourth aspect of the invention is comprised of a method of reinforcing a building structure comprised of a wall mounted on a foundation having a plurality of vertical framing members and at least one upper horizontal plate interconnecting at least two of the plurality of vertical framing members, the method comprising: mechanically coupling a shear assembly to the upper horizontal plate of the wall; mechanically coupling the shear assembly to the foundation such that the shear assembly transmits lateral shear forces on the upper horizontal plate of the wall to the foundation so as to reduce the tendency of the upper portions of the vertical framing members to move laterally when exposed to shear forces; and mechanically interposing a motion damper device between the shear assembly and the building structure such that a portion of the shear forces on the upper horizontal plate of the wall are dissipated by the motion damper device.

Yet another aspect of the invention is comprised of a shear assembly for reducing the effects of shear forces on a building structure that includes a wall attached to a foundation, the shear assembly comprising an interconnecting structure with a first end and a second end, wherein the interconnecting structure transfers forces between the first end and the second end; a head assembly that mechanically couples an upper portion of the wall to the first end of the interconnecting structure; and at least one spring member that is mechanically interposed between the first end of the interconnecting structure and the upper portion of the wall that permits limited relative movement between the upper portion of the wall and the first end of the interconnecting structure such that at least a portion of lateral shear forces exerted on the head assembly are dissipated by mechanical extension and retraction of the spring member; and an anchor assembly that mechanically couples the second end of the interconnecting structure to the foundation.

Another aspect of the invention is comprised of a shear assembly for reducing the effects of shear forces on a building structure that includes a wall attached to a foundation, the shear assembly comprising an interconnecting structure with a first end and a second end, wherein the interconnecting structure transfers forces between the first end and the second end; a head assembly that mechanically couples an upper portion of the wall to the first end of the interconnecting structure; and an anchor assembly that mechanically couples the second end of the interconnecting structure to the foundation, wherein the anchor assembly comprises at least one motion damping device that permits limited relative movement between the foundation and the second end of the interconnecting structure such that at least a portion of uplifting and downward compression forces exerted on the anchor assembly are dissipated by the spring member.

Another aspect of the invention is comprised of a shear assembly for reducing shear and uplift forces between an upper portion of a wall and a foundation of a building, the assembly comprising a head assembly that is attached to the upper portion of the wall; an interconnecting member that is mechanically coupled to the head assembly; an anchor assembly that is coupled to the interconnecting member, wherein the anchor assembly includes at least one anchor bolt that is mounted in the foundation so as to be embedded therein; and a motion damping device mechanically coupled to the embedded portion of the anchor bolt of the anchor assembly wherein forces exerted on the upper portion of the wall are transmitted to the foundation via the anchor assembly such that the motion damping device dissipates at least a portion of the forces transmitted to the foundation.

These and other objects and advantages of the present invention will become more fully apparent from the following description taken in conjunction with the accompanying drawings.

BRIEF DESCRIPTION OF THE DRAWINGS

FIG. 3A illustrates an A-frame rail of the A-frame shear assembly of FIG. 2;

FIG. 3B is a cross sectional view of the A-frame rail of FIG. 3A;

FIG. 3C illustrates a stiffener of the A-frame shear assembly of FIG. 2;

FIG. 3D illustrates a base rail of the A-frame shear assembly of FIG. 2;

FIG. 9F is an isometric view of a motion damper casing side of the head assembly of FIG. 8;

FIG. 9G is an end view of the motion damper casing side of FIG. 9F;

FIG. 9H is an isometric view of a motion damper casing end cap of the head assembly of FIG. 8;

DETAILED DESCRIPTION OF THE PREFERRED EMBODIMENT

Reference will now be made to the drawings wherein like numerals refer to like parts throughout.

Figure 1A:
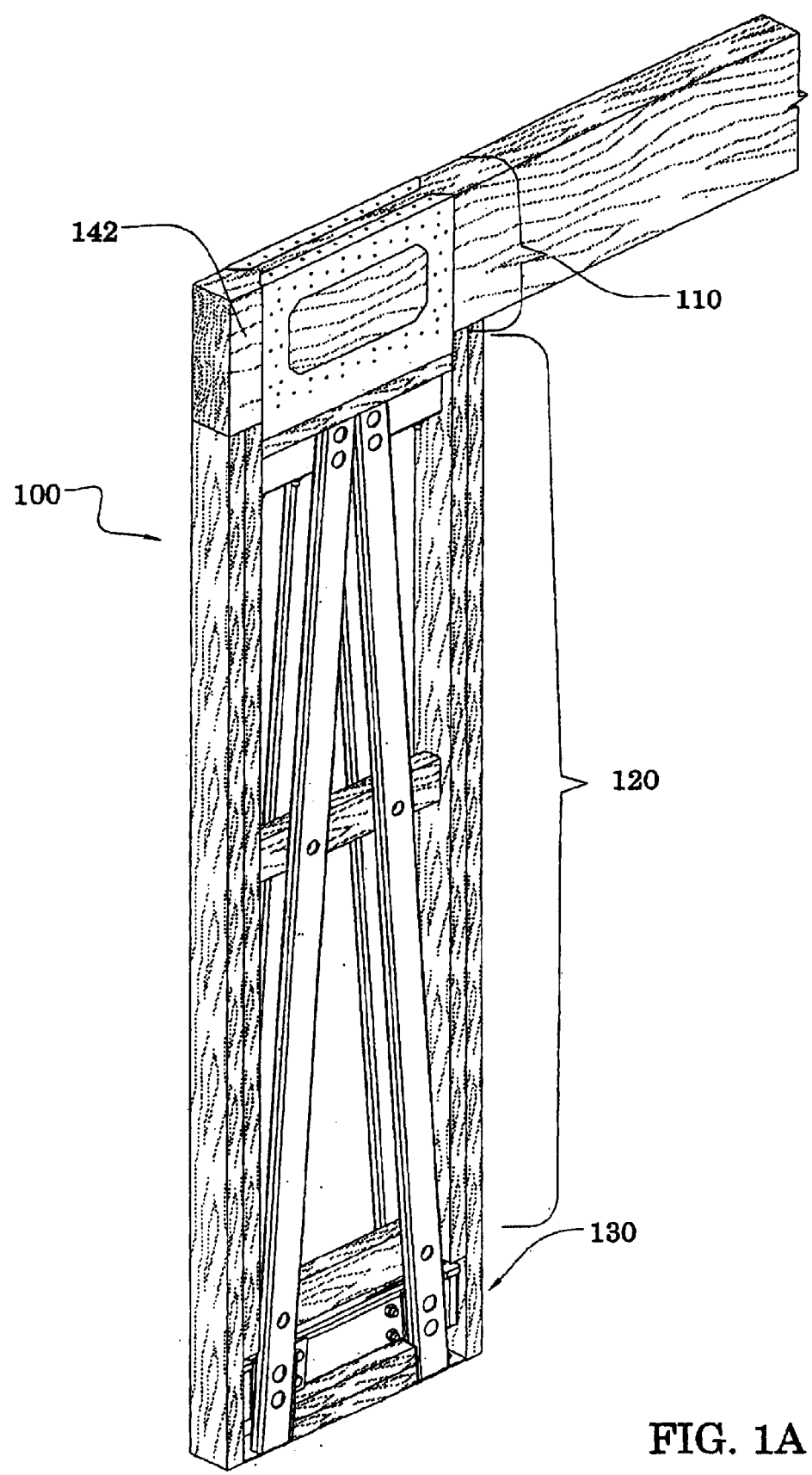
FIGS. 1A and 1B illustrate perspective views of A-frame shear assemblies installed in a wall frame.
Figure 1B:
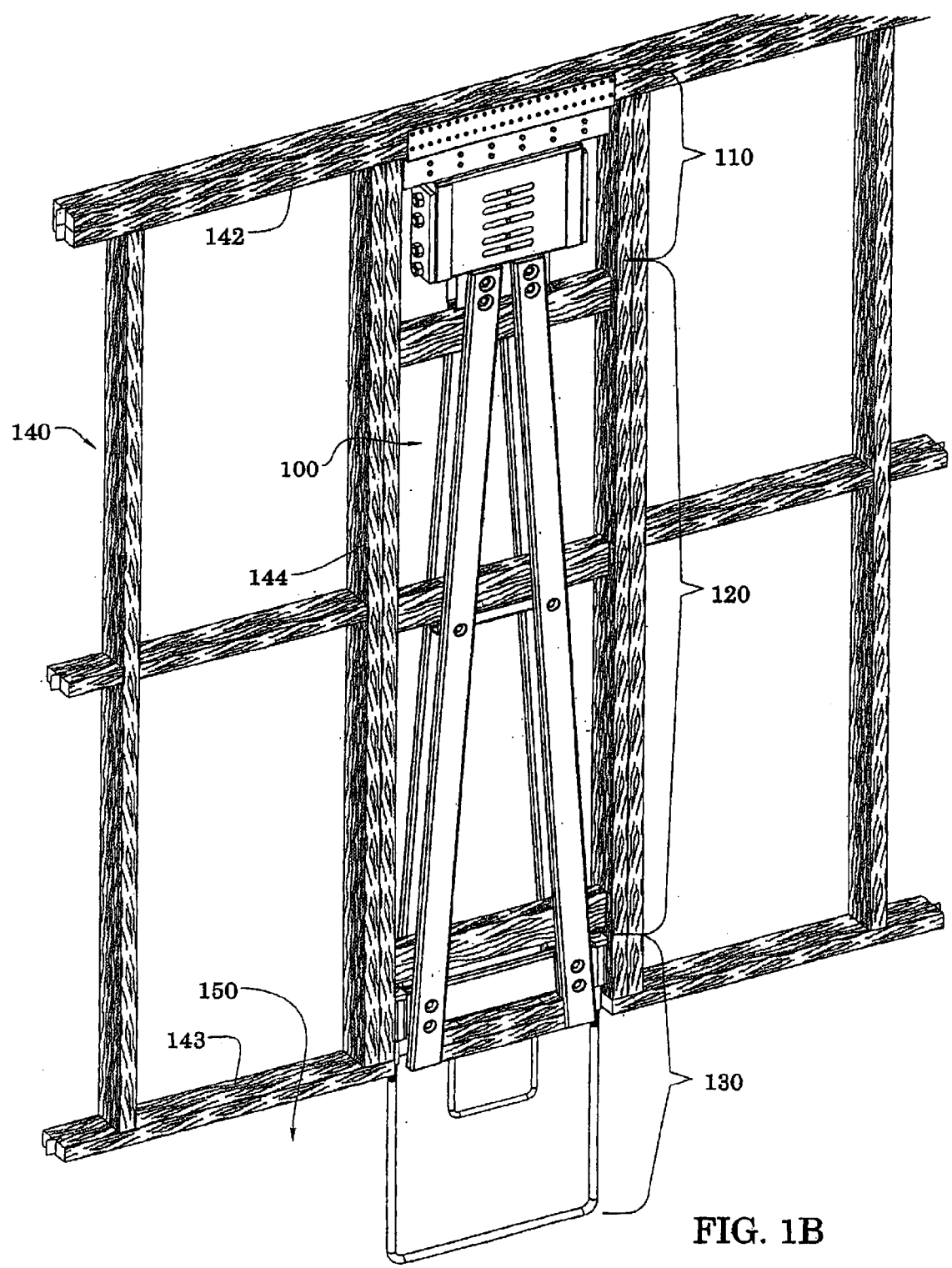

FIGS. 1A and 1B illustrate a perspective view of an A-frame shear assembly 100 installed in a wall frame 140. The wall frame 140 comprises a plurality of studs 144 interconnected by a top plate 142 and a bottom plate 143. The A-frame shear assembly 100 is installed between two adjacent studs 144, and interconnects the top plate 142 to a foundation 150 in manners described below. The A-frame shear assembly 100 comprises a head assembly 110 interconnected to an anchor assembly 130 by a rail assembly 120 to provide structural advantages described below. As is illustrated in FIGS. 1A and 1B, the head assembly 110 can either be a head assembly 110 that is rigidly attached to the upper portion of the wall or it can be a flexible head assembly 110 that permits relative movement between the upper portion of the wall and the shear assembly 100.

The description hereinafter is generally organized such that the A-frame rail assembly 120 and a substantially rigid anchor assembly are described first. Various embodiments of the head assembly 110 are then described, including the A-figure assembly that is rigidly attached to the upper portion of the wall and the A-frame assembly that is attached to the upper portion of the wall in a motion damping manner. Then, various embodiments of the anchor assemblies that provide ductility between the rail assembly 120 and the foundation 150 are described. In the description hereinafter, references are made to attachments of the A-frame shear assembly (or portion of the A-frame shear frame assembly) to the top plate 142. It will be appreciated and understood that, for the description purpose, the top plate 142 is considered to be an upper portion of the wall which is interconnected to other structures, such as a roof. Lastly, various embodiments of shear panels, other than the A-frame, are illustrated with motion damping members incorporated therein.

Figure 2:
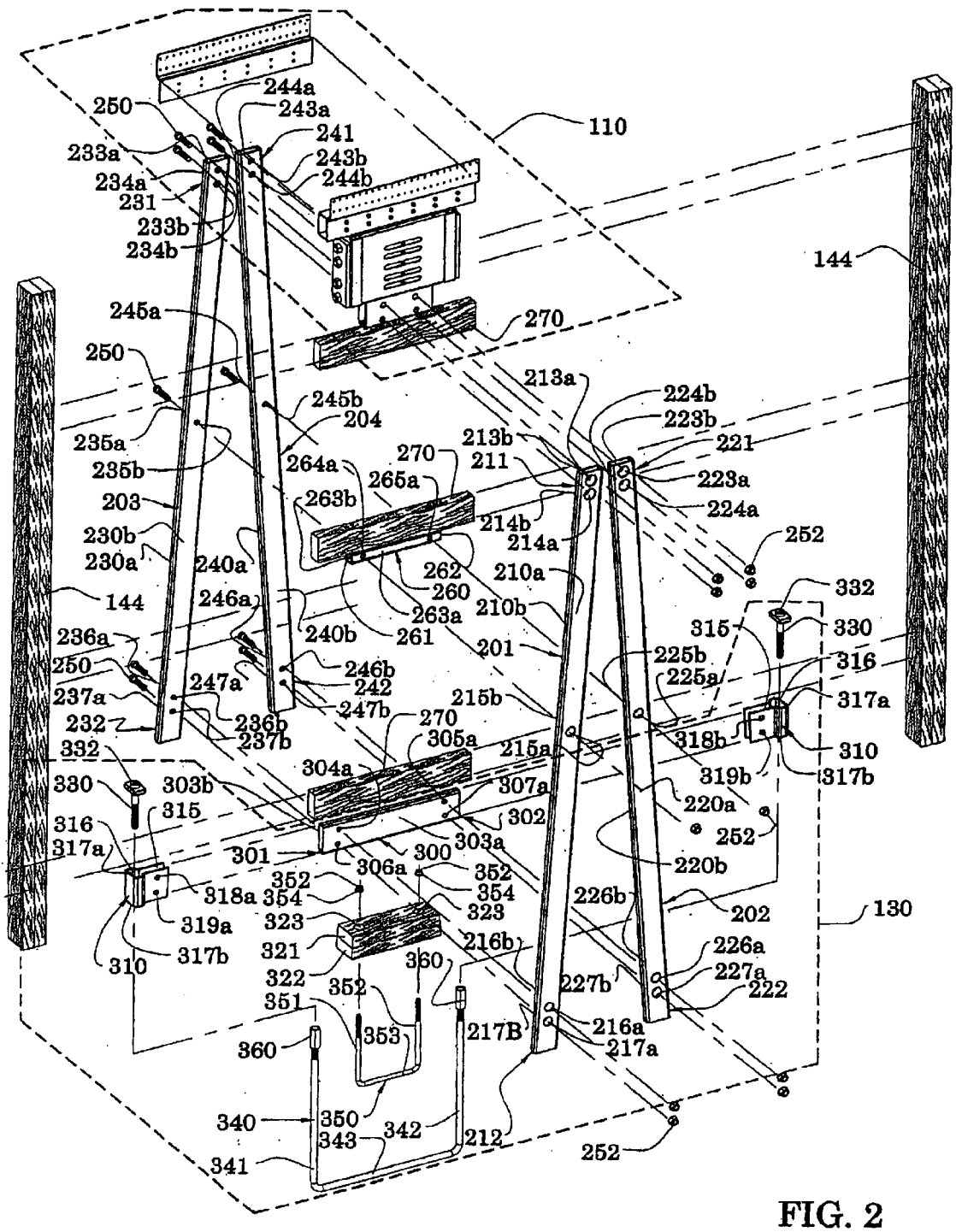
FIG. 2 illustrates an exploded unassembled view of the A-frame shear assembly of FIG. 1.

FIG. 2 illustrates one embodiment of an exploded unassembled view of the A-frame shear assembly 100 interposed between two adjacent studs 144 that can be connected to the top plate 142 in the manner illustrated in either FIG. 1A or 1B. The A-frame shear assembly 100 comprises a first rail 201, a second rail 202, a third rail 203, and a fourth rail 204 that are interconnected in manners described below. The first rail 201 is substantially same as the fourth rail 204, and the second rail 202 is substantially same as the third rail. The first and fourth rails 201, 204 differ from the second and third rails 202, 203 by orientations of beveled ends as described below in reference to FIGS. 3A and 3B.

FIGS. 3A and 3B illustrate a rail 280 that can represent either the first or fourth rail 201, 204 of FIG. 2. In one embodiment, the rail 280 is an elongated member with a rectangular cross sectional shape as illustrated in FIG. 3B. The cross section of the rail 280 comprises two substantially parallel elongate sections 284 interconnected by two substantially parallel interconnecting sections 285 so as to form a rectangular shape. The elongate sections 284 are thus substantially perpendicular to the interconnecting sections 285. The elongate and interconnecting sections 284, 285 define a hollow enclosed rectangular area 286.

The interconnection of the sections 284, 285 that extend in two dimensional direction provide the rail 280 with substantial structural strength to resist lateral buckling when the rail 280 is subjected to a compressional force along the axis of elongation. Furthermore, the hollowness of the rail 280 affords this strength with substantial reduction in weight.

As shown in FIG. 3A, the rail 280 comprises a first side 283 that defines a plurality of holes 289. The rail 280 further comprises a second side (not shown) that defines a plurality of holes 290 that are substantially coaxial with the holes 289. It will be appreciated that the first side 283 and the second side correspond to the elongate sections 284 of FIG. 3B. The holes 289 and 290 permit bolts to pass therethrough so as to secure the rail 280 to the head and anchor assemblies 110, 130 in manners described below. Preferably, the holes 290 are approximately ⅝" in diameter, sized to receive ⅝" thread bolts. The holes 289 are approximately 1¼" in diameter, sized to permit the heads of the ⅝" thread bolts to pass through such that the heads can be positioned within the rail 280.

The rail 280 further comprises a first end 281 and a second end 282, wherein the first end 281 becomes connected to the head assembly 110 and the second end becomes connected to the anchor assembly 130. The first end 281 has a bevel 287, and the second end 282 has a bevel 288 such that the rail 280 can be oriented at an angle and have the beveled edges 287, 288 substantially horizontal. Thus the rail depicted in FIG. 3A represents the first and fourth rails 201, 204 of FIG. 2. As referred to above, the second and third rails 202, 203 differ from the rails 201, 204 by the orientation of the bevels. In embodiment, the rails 202, 203 are substantially same as the rails 201, 204. In one embodiment, the rails 201, 202, 203, and 204 (and 280 of FIGS. 3A and 3B) are approximately 6'8" long elongated sections, with ⅛" thick steel forming an approximately 3"×1" rectangular cross section.

In reference to FIG. 2, the first rail 201 comprises a first end 211 that attaches to the head assembly 110 and a second end 212 that attaches to the anchor assembly 130. Similarly, the second, third, and fourth rails 202, 203, 204 comprise first ends 221, 231, 241, respectively, and second ends 222, 232, 242, respectively.

The first rail 201 further comprises a first side 210a and a second side 210b. The first side 210a defines holes 213a, 214a, 215a, 216a, 217a, and the second side 210b defines holes 213b, 214b, 215b, 216b, 217b. The holes 213a and 214b are substantially coaxial. The holes 214a, 215a, 216a, 217a are also respectively substantially coaxial with the holes 214b, 215b, 216b, 217b.

In a similar manner, the second rail 202 further comprises a first side 220a that defines holes 223a, 224a, 225a, 226a, 227a, and a second side 220b that defines holes 223b, 224b, 225b, 226b, 227b. The holes 223a, 224a, 225a, 226a, 227a are respectively substantially coaxial with the holes 223b, 224b, 225b, 226b, 227b.

The third rail 203 further comprises a first side 230a that defines holes 233a, 234a, 235a, 236a, 237a, and a second side 230b that defines holes 233b, 234b, 235b, 236b, 237b. The holes 233a, 234a, 235a, 236a, 237a are respectively substantially coaxial with the holes 233b, 234b, 235b, 236b, 237b.

The fourth rail 204 further comprises a first side 240a that defines holes 243a, 244a, 245a, 246a, 247a, and a second side 240b that defines holes 243b, 244b, 245b, 246b, 247b. The holes 243a, 244a, 245a, 246a, 247a are respectively substantially coaxial with the holes 243b, 244b, 245b, 246b, 247b.

In assembly, the second side 210b of the first rail 201 faces the second side 230b of the third rail 203, and the second side 220b of the second rail 202 faces the second side 240b of the fourth rail 204. The first and third rail 201, 203 are positioned such that holes 213b, 214b, 215b, 216b, 217b are substantially aligned with the holes 233b, 234b, 235b, 236b, 237b. The second and fourth rails 202, 204 are positioned such that the holes 223b, 224b, 225b, 226b, 227b are substantially aligned with the holes 243b, 244b, 245b, 246b, 247b.

Interposed between the first, second rails 201, 202 and the third, fourth rails 203, 204 is a lower portion of the head assembly 110, whose various embodiments are described in greater detail below. The lower portion of the head assembly 110 defines a plurality of holes that substantially align with the holes 213b, 214b, 223b, 224b, 233b, 234b, 243b, 244b situated at the first ends 211, 221, 231, 241 of the four rails 201, 202, 203, 204.

A bolt 250 extends through the hole 233a, the hole 233b, the holes on the lower portion of the head assembly 110, and the hole 213b. The bolt 250 is secured by a nut 252. As described above in reference to a typical rail 280 of FIG. 3A, the hole 213a on the first rail 201 is sized such that the nut 252 can pass therethrough and secure the bolt 250 by engaging the inside 286 (FIG. 3B) of the second side 210b of the first rail 201. Also, the hole 233a on the third leg 203 is sized such that the head of the bolt 250 can pass therethrough and engage the inside 286 (FIG. 3B) of the second side 230b of the third rail 203. The bolt 250 is preferably a ⅝" thread×2½" shoulder bolt, and the nut 252 is selected to receive the ⅝" thread. The length of the bolt 250 is selected such that the threaded end of the bolt 250 extends through the hole 213b, but does not extend through the hole 213a. Thus, the head and threaded end of the bolt 250 are positioned substantially inside 286 (FIG. 3B) the third and first rails 203, 201. In a similar manner, another bolt 250 extends through the holes 234a, the hole 234b, the holes on the lower portion of the head assembly 110, and the hole 214b, and is secured by another nut 252, so as to secure the first ends 211, 231 of the first and third rails 201, 203.

The first ends 221, 241 of the second and fourth rails 202, 204 are secured in a similar manner. A bolt 250 extends through the hole 243a, the hole 243b, the holes on the lower portion of the head assembly 110, and the hole 223b, and is secured by a nut 252. Another bolt 250 extends through the hole 244a, the hole 244b, the holes on the lower portion of the head assembly 110, and the hole 224b, and is secured by another nut 252.

The rails 201 and 202 (and thus 203 and 204) are arranged such that the distance between the first ends 211 and 221 (and thus 231 and 241) is smaller than the distance between the second ends 212 and 222 (and thus 232 and 242) such that the rails 20i and 202 (and thus 203 and 204) form a shape similar to a letter "A". In one embodiment, the angle between the first and second rails 201 and 202 (and thus 203 and 204) is approximately 8 degrees. Advantages provided by an "A" shaped structure is described in greater detail below.

Interposed between the first, second rails 201, 202 and the third, fourth rails 203, 204 is a base rail 300 and portions of hold down brackets 310 that interconnect the second ends 212, 222, 232, 242 of the four rails 201, 202, 203, 204 in a manner described below. As illustrated in FIGS. 2 and 3D, the base rail 300 is an elongate member with a hollow rectangular cross section. The base rail 300 comprises a first side 303a and a second side 303b. The base rail 300 further comprises a first end 301 and a second end 302. The first side 303a defines holes 304a, 305a, 306a, 307a, and the second side 303b defines holes 304b, 305b, 306b, 307b (substantially similar but not shown) that are substantially coaxial with the holes 304a, 305a, 306a, 307a The holes 304a, 305a, 306a, 307a, and 304b, 305b, 306b, 307b are sized to permit bolts 250 to pass therethrough. In one embodiment, the base rail has a cross sectional dimension of 4"×1", with a ⅛" thick steel that defines the hollow inside. The rectangular cross section of the base rail provides structural strength to resist buckling or bending.

Figure 3E:
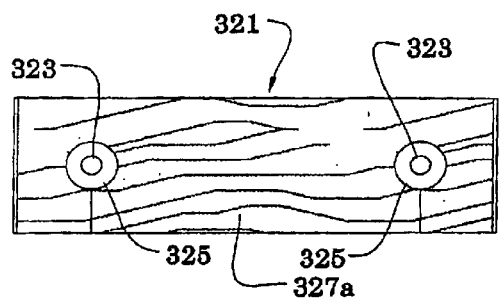
FIG. 3E is a top view of a first shear plate of the A-frame shear assembly of FIG. 2.
Figure 3F:
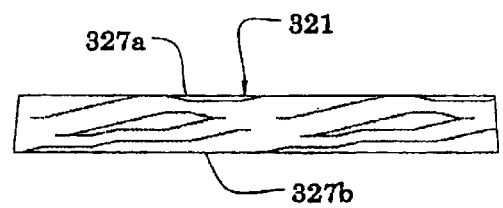
FIG. 3F is a side view of the first shear plate of FIG. 3E.
Figure 3G:
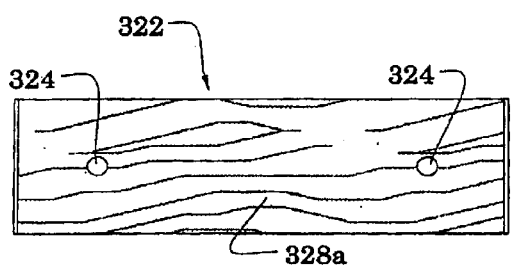
FIG. 3G is a top view of a second shear plate of the A-frame shear assembly of FIG. 2.
Figure 3H:
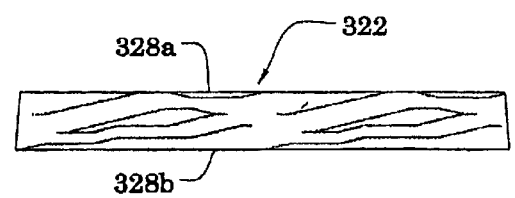
FIG. 3H is a side view of the second shear plate of FIG. 3G.
Figure 3I:
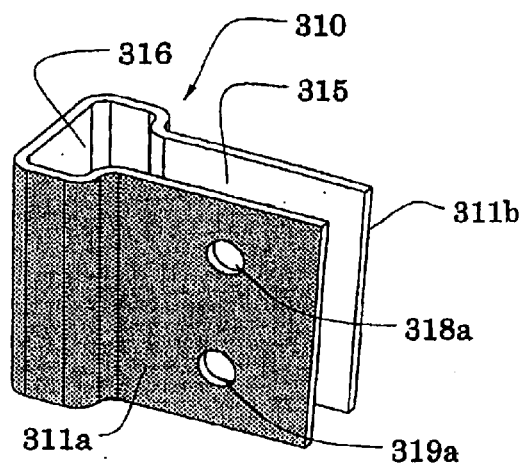
FIG. 3I is an isometric view of a hold down bracket of the A-frame shear assembly of FIG. 2.
Figure 3J:
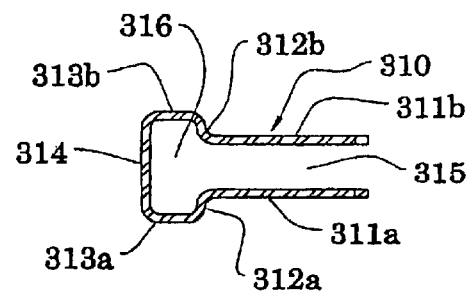
FIG. 3J is a top view of the hold down bracket of FIG. 3I.
Figure 3K:
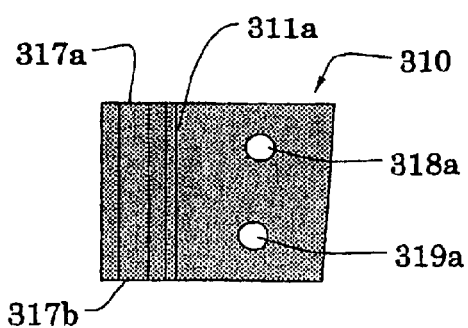
FIG. 3K is a side view of the hold down bracket of FIG. 3I.
Figure 3L:
FIG. 3L is an isometric view of a hold down bolt bearing plate of the A-frame shear assembly of FIG. 2.

The hold down bracket 310, illustrated in FIGS. 3I, 3J, 3K, is a formed steel plate member. As shown in FIG. 3J, the cross section of the hold down bracket 310 comprises first and second sections 311a, 311b that are positioned substantially parallel to each other. On one end of the first section 311a is a first lip section 312a that bends away from the second section 311b. Similarly, on the same end of the second section 311b, is a second lip section 312b that bends away from the first section 311a. The first lip section 312a is connected to a first extension 313a that extends substantially parallel to, but away from the first section 311a. Similarly, the second lip section 312b is connected to a second extension 313b that extends substantially parallel to, but away from the second section 311b. The ends of the first and second extensions 313a, 313b that are away from the first and second lip sections 312a, 312b are interconnected by a interconnecting section 314 that is substantially perpendicular to the first and second extensions 313a, 313b.

The first lip section 312a, first extension 313a, interconnecting section 314, second extension 313b, and second lip section 312b define an opening 316 through which a hold down bolt 330 (FIG. 2) extends to hold down the rail assembly 120 in a manner described below. The first and second sections 311a, 311b are spaced apart in a selected manner so as to receive the first or second ends 301 302 of the base rail 300 in a space 315.

A side view of the hold down bracket 310 is shown in FIG. 3K, wherein the hold down bracket further comprises a top edge 317a and a bottom edge 317b. The top edge 317a engages a hold down bearing plate 332 (FIG. 2) that bears down on the hold down bracket in a manner described below. The bottom edge 317b engages the, surface of the foundation 150 in a manner described below.

The hold down bracket 310 in FIG. 3K further comprises holes 318a, 319a defined by the first section 311a. The second section 311b also defines holes 318b, 319b that are not shown, but substantially similar and substantially coaxial to the holes 318a, 319a. The holes 318a, 319a are positioned at an angle so as to align with the holes 304a, 306a on the first end 301 of the base rail 300. The holes 318b, 319b align with the holes 304b, 306b on the first end of the base rail 300. The second end 302 of the base rail 300 is positioned in the space 315 of another hold down bracket 310 such that the holes 318b, 319b align with the holes 305a, 307a. The holes 318a, 319a align with the holes 305b, 307b. The holes 318a, 319a, 318b, 319b are sized to receive bolts 250 (FIG. 2).

FIG. 3I illustrates a perspective view of the hold down bracket 310. It will be appreciated that the formed steel hold down bracket 310 has a cross section comprising plurality of folds that extend in two dimensions as described above. As such, the hold down bracket 310 provides structural strength that resists lateral buckling when compressed between the top and bottom edges 317a, 317b. In one embodiment, the hold down bracket 310 is formed from a 3/16" thick steel plate.

The base rail 300 is positioned such that its first end 301 is interposed between the first and second sections 311a, 311b of a hold down bracket 310. Similarly, the second end 302 of the base rail 300 is interposed between the first and second sections 311a, 311b of another hold down bracket 310. The first and second sections 311a, 311b of the hold down bracket 310, with the first end 301 of the base rail 300 therebetween, are interposed between the second ends 212, 232 of the first and third rails 201, 203. Similarly, the first and second sections 311a, 311b of the other hold down bracket 310, with the second end 302 of the base rail 300 therebetween, are interposed between the second ends 222, 242 of the second and fourth rails 202, 204.

In this orientation, the holes 236b, 318b, 304b, 304a, 318a, and 216b are substantially aligned so as to permit a bolt 250 to extend therethrough and be secured with a nut 252. The holes 236a and 216a are sized larger than the holes 236b and 216b to permit the head of the bolt 250 and the nut 252 to be positioned substantially within the third and first rails 203, 201, similar to the manner described above in reference to the attachment of the first ends 231 and 211. In a similar manner, another bolt 250 extends through the hole 237b, 319b, 306b, 306a, 319a, 217b, so as to be secured with a nut 252.

Similarly, the second ends 222 and 242 of the second and fourth rails 202, 204 are attached by extending a bolt 250 through holes 246b, 318a, 305b, 305a, 318b, 226b, and extending another bolt 250 through holes 247b, 319a, 307b, 307a, 319b, 227b, and securing the bolts 250 with respective nuts 252. The second ends 212, 222, 232, 242 of the four rails 201, 202, 203, 204 are thus interconnected in a substantially rigid manner. As seen in FIG. 3D, the holes 304a and 305a are spaced closer than the holes 306a and 307a to accommodate the angled orientation of the four rails 201, 202, 203, 204. Similarly, the holes 304b and 305b are spaced closer than the holes 306b and 307b.

FIGS. 2 and 3C illustrate a stiffener 260 that interconnects the middle portions of the four rails 201, 202, 203, 204. The stiffener 260 is an elongate member with a hollow rectangular cross section. The stiffener 260 comprises a first side 263a and a second side 263b. The stiffener 260 further comprises a first end 261 and a second end 262. The first side 263a defines holes 264a, 265a, and the second side 263b defines holes 264b, 265b (substantially similar but not shown) that are substantially coaxial with the holes 264a, 265a The holes 264a, 265a, and 264b, 265b are sized to permit bolts 250 to pass therethrough. In one embodiment, the stiffener is formed from an 1/8" thick steel plate, and has a cross sectional dimensions of approximately 1½'×1 ½" that defines the hollow inside.

The stiffener 260 is positioned such that the holes 264b and 264a are interposed between and substantially aligned with the holes 235b and 215b of the third and first rails 203, 201. Similarly, the holes 265b and 265a are interposed between and substantially aligned with the holes 245b and 225b of the fourth and second rails 204, 202. A bolt 250 extends through the holes 235b, 264b, 264a, and 215b, and is secured by a nut 252. Similarly, another bolt 250 extends through the holes 245b, 265b, 265a, and 225b, and is secured by a nut 252. The holes 235a and 245a are sized to permit the heads of the bolts 250 to pass therethrough and be secured substantially within the third and fourth rails 203, 204. Similarly, the holes 215a and 225a are sized to permit the nuts 252 to pass therethrough and be secured to the bolts 250 substantially within the first and second rails 201, 202.

It will be appreciated that the A-frame in general comprises a first leg and a second leg arranged at angled orientation such that a distance between the two legs at the top is less than a distance between the two legs at the bottom. In the rail assembly 120 described above in reference to FIGS. 1 and 2, the first leg comprises the first and third rails 201, 203, and the second leg comprises the second and fourth rails 202, 204. In other embodiments of the rail assembly, each of the first and second legs may comprise a single rail, or more than two rails.

In general, when the two legs of the A-frame are interconnected to each other at the top and bottom, the two legs provide structural strength by both compression and tension modes. As an example, if a downward force is exerted at the top of the A-frame, then both legs transfer that force to the bottom by compression. If an upward force is exerted at the top of the A-frame, then both legs transfer that force to the bottom by tension. If a lateral shear force is exerted at the top of the A-frame in a first direction (first leg to second leg) then that force is transferred to the bottom by simultaneous tension of the first leg and compression of the second leg. If the lateral force is in a second direction opposite the first direction, then that force is transferred to the bottom by simultaneous compression of the first leg and tension of the second leg.

FIG. 2 illustrates a plurality of frame blockings 270 that are interposed between the two studs 144 to inhibit inward warping of the two studs 144. In one embodiment, each of the frame blocking 270 is a 2×4 lumber sized to fit between the two studs 144.

As described above in reference to FIGS. 2, 3D, and 3I–3K, the rail assembly 120 can be attached to the base rail 300 and the hold down brackets 310 in a substantially rigid manner. As will be discussed in greater detail hereinbelow, the rail members 120 can also be attached in a more flexible motion damping manner to the foundation. The base rail 300 and the hold down brackets 310 are two components of the anchor assembly 130. The anchor assembly 130 secures the rail assembly 120 to the foundation 150 in manners described below.

The anchor assembly 130, in this implementation, further comprises a hold down U-bolt 340 that has first and second sections 341, 342 interconnected by a base section 343 so as to form a "U" shape. The base section 343 and portions of the first and second sections 341, 342 are embedded in the foundation 150 (FIG. 1). The upper ends of the first and second sections 341, 342 are threaded such that the U-bolt 340 can be coupled to the two hold down bolts 330 by nut couplers 360. Preferably the first and second sections 341, 342 are approximately 1'–9⅜" long, including the ¾" threads at the upper ends. Approximately 1'–8" of the first and second sections 341, 342 are embedded in the foundation 150 such that approximately 1⅜" of threads protrude upward from the surface of the foundation 150. The base section 343, which is also embedded in the foundation 150, is preferably approximately 1'–7½" long.

The nut coupler 360 is adapted to receive threaded bolts from both ends so as to couple the two bolts. Preferably the nut coupler 360 has ¾" thread adapted to receive the upper end of one of the sections 341, 342 from the bottom. The top of the nut coupler 360 receives the threaded end of the hold down bolt 330 referred to above. The hold down bolt 330 is preferably a ¾" thread×6" shoulder bolt.

In reference to FIGS. 2, 3I–3L, the hold down bracket 310 is interconnected to the U-bolt 340 in the following manner. The rail assembly 120 that is attached to the base rail 300 and the hold down brackets 310, as described above, is positioned on the foundation 150 such that the nut couplers 360 attached to the upper ends of the first and second sections 341, 342 of the U-bolt 340 protrudes upward into the openings 316 defined by the hold down brackets 310. To secure the first end 301 of the base rail 300 to the foundation 150, the hold down bolt 330 extends through an opening 333 defined by the hold down bolt bearing plate 332 (FIG. 3L) and into the opening 316 in the hold down bracket 310. The threaded end of the hold down bolt 330 is received by the upper end of the nut coupler 360. The hold down bolt 330 is tightened such that the bearing plate 332 engages the upper edge 317a of the hold down bracket and secures the first end 301 of the base rail 300 and the second ends 212, 232 of the first and third rails 201, 203. The second end 302 of the base rail 300 and the second ends 222, 242 of the second and fourth rails 202, 204 are secured to the foundation in a substantially similar manner.

The hold down bolt bearing plate 332 is preferably a rectangular shaped ½" thick steel plate with dimensions of approximately 2½"×1½". The hole 333 has a diameter of approximately 13/16" so as to permit the ¾" threaded bolt to pass through. The dimensions of the bearing plate 332 is selected to be larger than the cross sectional area of the opening 316 (FIG. 3J) so as to allow limited lateral adjustment of the hold down bolt 330 with respect to the U-bolt 340. This feature permits adjustability to compensate for misalignment that may exist in the orientation of the U-bolt 340.

The anchor assembly, in this implementation, further comprises an embedded shear U-bolt 350 that has a first section 351 and a second section 352 interconnected by a base section 353 so as to form a "U" shape. Preferably, the first and second sections 351, 352 are approximately 9⅞" long, and the base section 353 is approximately 8" long. Approximately 7" of the first and second sections 351, 352, along with the base section 353, are embedded in the foundation 150 (FIG. 1), leaving approximately 2⅞" of ½" threads protruding upward from the surface of the foundation 150. The protruding threads of the shear U-bolt 350 is received by holes defined by first and second shear plates 321 and 322.

FIGS. 3E and 3F illustrate the first shear plate 321, preferably comprising a 2×4 lumber with a first side 327a and a second side 327b. The first shear plate 321 defines two holes 323 that extend from the first side 327a to the second side 327b. The holes 323 are preferably sized 9/16" so as to permit the threaded ends of the shear U-bolt 350. Each of the holes 323 on the first side have a countersink 325 that is preferably 1¼" in diameter and ¾" deep. The countersinks 325 permit the threaded ends of the shear U-bolt 350 to be secured such that washers 354 and nuts 352 are positioned flush inside the countersinks 325. The first shear plate 321 is preferably approximately 11 25/32" long in overall length.

FIGS. 3G and 3H illustrate the second shear plate 322, preferably comprising a 2×4 lumber with a first side 328a and a second side 328b. The second shear plate 322 defines two holes 324 that extend from the first side 328a to the second side 328b. The holes 324 are preferably sized 9/16" so as to permit the threaded ends of the shear U-bolt 350. The second shear plate 322 is preferably approximately 11 63/64" long in overall length.

To attach the first and second shear plates 321, 322 to the shear U-bolt 350, the second shear plate 322 is positioned on the surface of the foundation 150 (FIG. 1B) such that the holes 324 receive the protruding threaded ends of the shear U-bolt 350. The first shear plate 321 is positioned on top of the second shear plate 322 such that the holes 323 receive the protruding threaded ends of the shear U-bolt 350. The length of protrusion of the threaded ends of the shear U-bolt 350 is selected such that the protrusion does not protrude beyond the first surface 327a of the first shear plate 321. The threaded ends of the shear U-bolt 350 is secured by the washers 354 and the nuts 352, substantially within the countersinks 325, so as to secure the first and second shear plates 321, 322 to the foundation 150.

The first and second shear plates 321, 322 are each beveled at both ends such that when stacked together, the overall beveling with respect to vertical direction substantially matches the angles of the rails 201, 202, and 203, 204. This permits the ends of the first and second shear plates 321, 322 to have substantially full engagement with the lower portions of the rails 201, 202, 203, 204. The first and second shear plates 321, 322., secured to the foundation 150 in a substantially rigid manner, and interposed between the second ends 212, 222 of the first and second rails 201, 202 (and also between the seconds ends 232, 242 of the third and fourth rails 203, 204) inhibits lateral motion of the lower portion of the rail assembly 120. It will be appreciated that the first and second shear plates 321, 322 are attached to the foundation 150 prior to attaching the base rail 300 to the foundation 150.

The anchor assembly 130 described above in reference to FIGS. 1 to 3 interconnect the rail assembly 120 to the foundation 150 in a substantially rigid manner so as to resist both shear and uplifting forces. Other embodiments of the anchor assembly are described below, wherein the rail assembly 120 and the foundation 150 are coupled by springs so as to provide ductility during an uplifting force situation.

Figure 4:
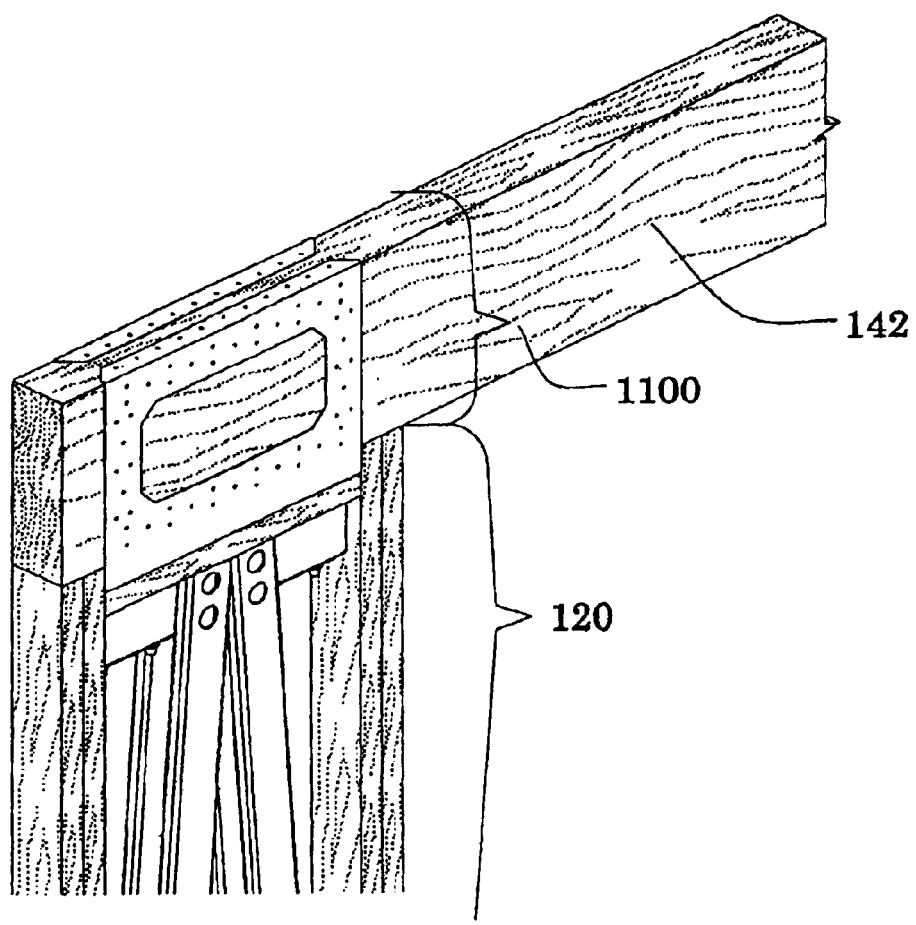
FIG. 4 is a perspective assembled view of one embodiment of a head assembly of the A-frame shear assembly, wherein the head assembly interconnects the A-frame to an upper portion of the wall in a substantially rigid manner.
Figure 5:
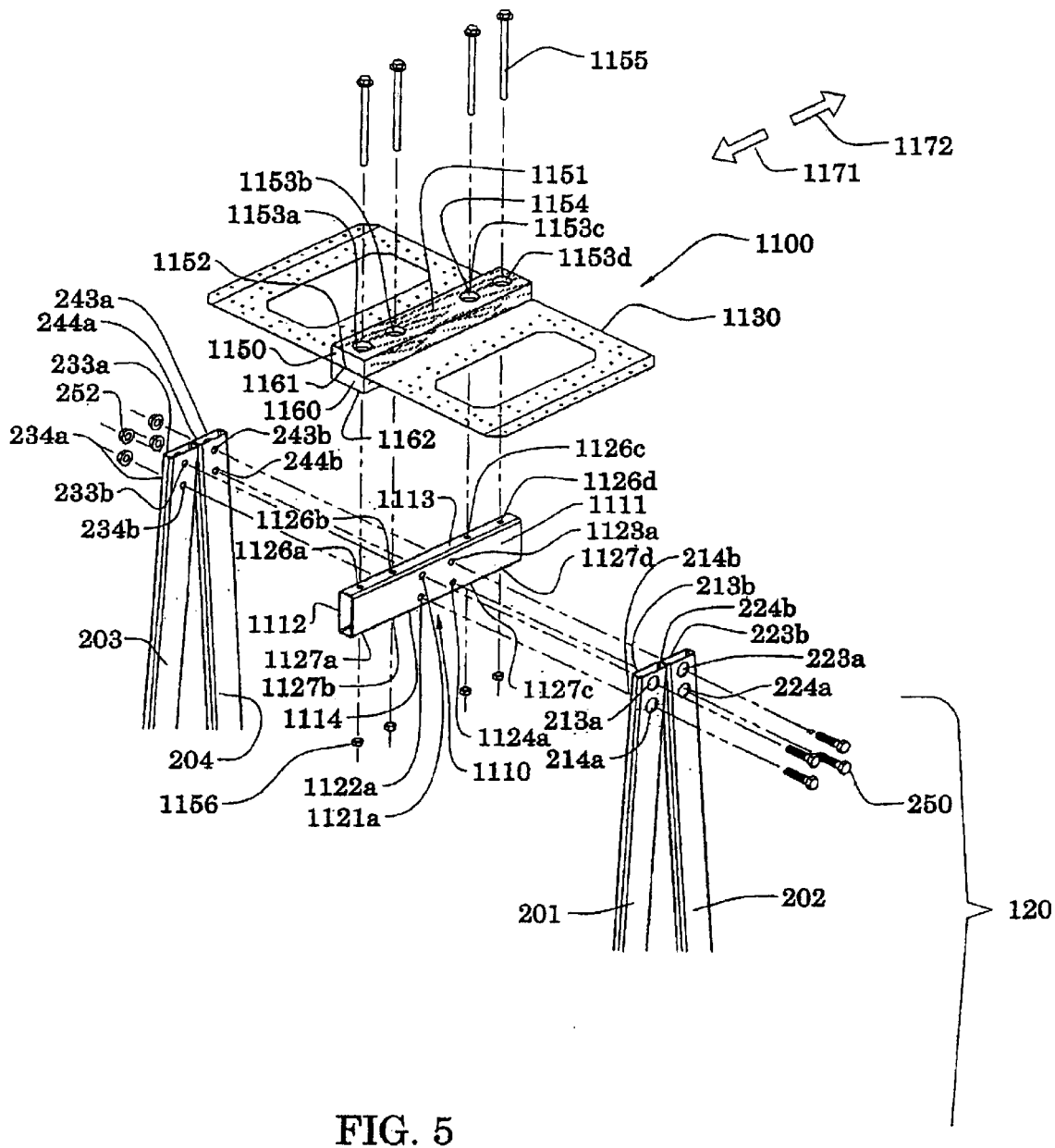
FIG. 5 is an exploded unassembled view of the head assembly of FIG. 4.
Figure 6:
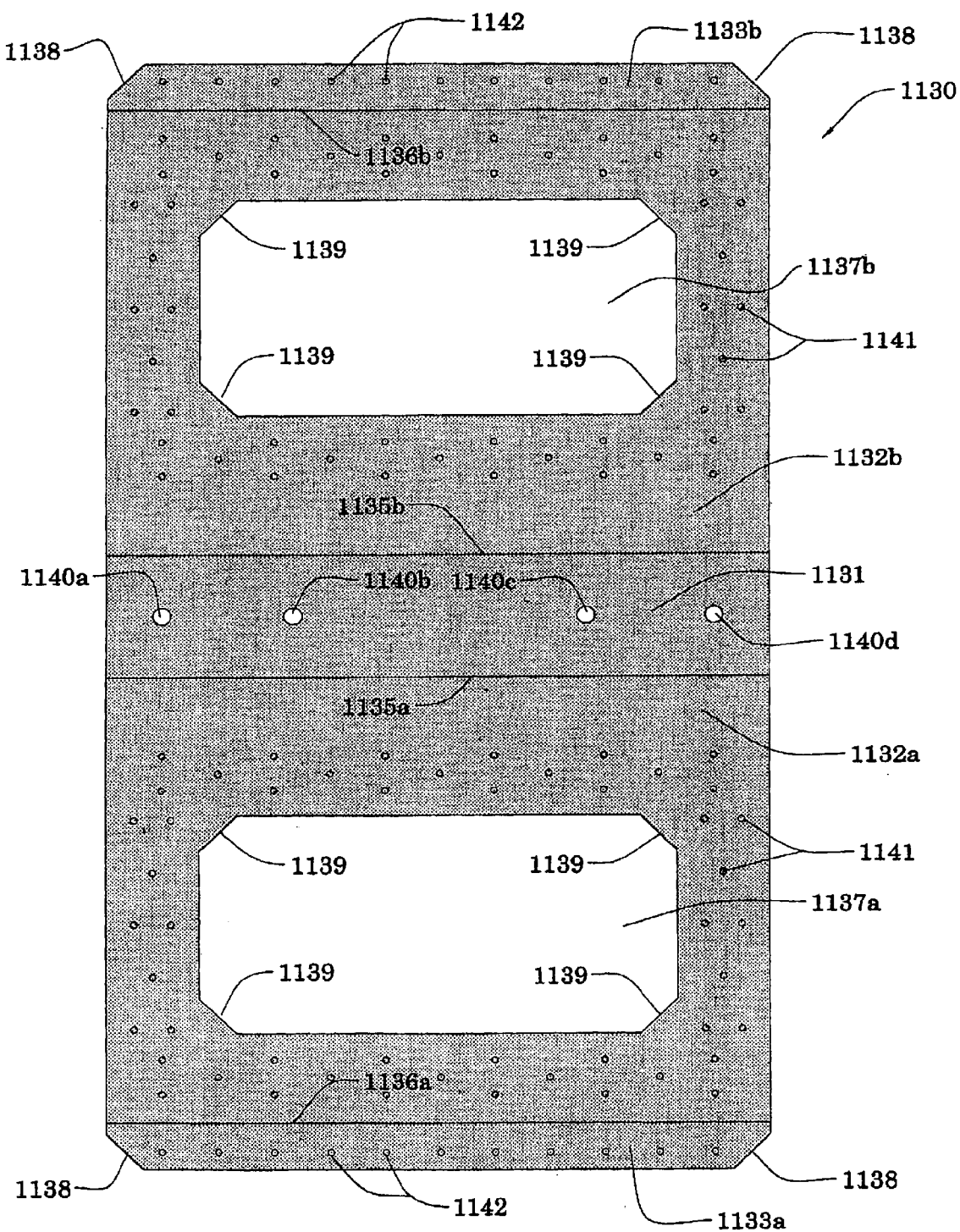
FIG. 6 illustrates a gusset connector plate of the head assembly of FIG. 5.

The A-frame shear assembly 100 further comprises the head assembly 110 that interconnects the A-frame to the upper portion of the wall. Various embodiments of the head assembly 110 are described below, wherein the head assembly can provide either a substantially rigid interconnection or a ductile, motion damping interconnection. FIGS. 4 to 6 relate to one embodiment of the head assembly that interconnects the A-frame to the upper portion of the wall in a substantially rigid manner. FIGS. 7 to 10 relate to another embodiment of the head assembly that includes a spring member (damper) comprising coil springs arranged along a single axis. FIGS. 11 to 13 relate to yet another embodiment of the head assembly that includes a spring member (damper) comprising coil springs arranged along two parallel axes. It will be appreciated that other arrangements of spring members can be utilized in the head assembly without departing from the spirit of the invention. Moreover, as will be apparent from the following description, the use of such motion damping members is initially described in conjunction with A-frame-type shear assemblies, but could be used with any of a number of other shear assemblies without departing from the spirit of the present invention.

FIG. 4 illustrates one embodiment of the head assembly, denoted as a shear transfer assembly 1100 that interconnects the top plate 142 to the rail assembly 120 in a substantially rigid manner, such as the manner shown in FIG. 1A, so as to mitigate relative motion between the top plate 142 and the foundation. FIG. 5 illustrates an exploded unassembled view of the shear transfer assembly 1100 that interconnects the top plate 142 (not shown) to the rails 201, 202, 203, 204 of the rail assembly 120. The top plate 142 is interconnected to first and second shear transfer plates 1150, 1160 by a gusset connector plate 1130 in a substantially rigid manner described below. The first and second shear transfer plates 1150, 1160 are interconnected to a head rail 1110 in a substantially rigid manner described below. The head rail 1110 is interconnected to the rail assembly 120 in a substantially rigid manner described below. Thus, the top plate 142 is interconnected to the rail assembly in a substantially rigid manner.

Parts that make up the shear transfer assembly 1100, and the manner in which they are interconnected, are now described in reference to FIGS. 5 and 6. In one embodiment, as shown in FIG. 5, the first shear transfer plate 1150 is a 2×4 lumber with a top side 1151 and a bottom side 1152. The plate 1150 defines holes 1153a, 1153b, 1153c, 1153d that extend through the top and bottom sides 1151, 1152. The holes 1153a, 1153b, 1153c, 1153d are sized to permit bolts 1155 to extend therethrough so as to secure the first plate 1150 to the head rail 1110 in a manner described below. The holes 1153a, 1153b, 1153c, 1153d have countersinks 1154 on the top side 1151 so as to allow the heads of the bolts 1155 to be positioned within the countersinks 1154, such that the top side 1151 of the first plate 1150 can engage the top plate 142 in a substantially flush manner.

The second shear transfer plate 1160 is substantially similar to the first shear transfer plate 1150 with the exception of the countersinks 1154. The second plate has a top side 1161 and a bottom side 1162. In one embodiment, each of the first and second shear transfer plates 1150, 1160 is an approximately 1'–6" long 2×4 lumber. The holes 1153a, 1153b, 1153c, 1153d (holes not shown for the second plate 1160) are sized to have diameters of approximately ½".

The shear transfer assembly 1100 further comprises the rectangular shaped (when unfolded) gusset connector plate 1130 interposed between the first and second shear transfer plates 1150 and 1160. The gusset connector plate 1130 is illustrated in FIGS. 5 and 6 in its unfolded state. As shown in FIG. 6, comprises first and second sides 1132a and 1132b interconnected by a base section 1131. The first and second sides 1132a, 1132b are folded upward along fold lines 1135a and 1135b, such that the first and second sides 1132a and 1132b are substantially parallel to each other and substantially perpendicular to the base section 1131. The base, first and second sections 1131, 1132a, 1132b are rectangular shaped.

The gusset connector plate 1130 further comprises a first top section 1133a that extends from the top of the first side 1132a. The first top section 1133a is folded towards an inward direction at a third fold line 1136a such that the first top section 1133a is substantially perpendicular to the first side 1132a. The two corners at the end of the first top section 1133a have chamfers 1138. Similarly, a second top section 1133b extends from the top of the second side 1132b, and is folded inward at a fourth fold line 1136b such that the second top section 1133b is substantially perpendicular to the second side 1132b. The two corners at the end of the second top section 1133b have chamfers 1138.

The base section 1131 defines holes 1140a, 1140b, 1140c, 1140d that are sized substantially match and align with the holes 1153a, 1153b, 1153c, 1153d of the first and second shear transfer plates 1150 and 1160. The first side 1132a defines a first opening 1137a that is rectangular shaped with chamfers 1139 at the four corners. The opening 1137a reduces the weight of the gusset connector plate 1130, and provides a direct access to the top plate 142 for finishing work and the like, without having to go through the gusset connector plate 1130. Similarly, the second side 1132b defines a second opening 1137b that is rectangular shaped with chamfers 1139 at the four corners.

The first and second sides 1132a, 1132b further define a plurality of holes 1141 that are sized to permit fasteners such as screws or nails to pass through so as to secure the first and second sides 1132a, 1132b to the side of the top plate 142. The holes 1141 are distributed throughout the first and second sides 1132a, 1132b so as to distribute the applied forces throughout the first and second sides 1132a, 1132b.

The first and second top sections 1133a, 1133b define a plurality of holes 1142 that are sized to permit fasteners such as screws or nails to pass through so as to secure the first and second top sections 1133a, 1133b to the top of the top plate 142. The holes 1142 are distributed throughout the first and second top sections 1133a, 1133b so as to distribute the applied forces throughout the first and second top sections 1133a, 1133b. The gusset connector plate 1130 wraps around the first shear transfer plate 1150, and the top plate 142 (not shown), and is secured to the top plate by nails so as to interconnect the top plate 142 to the first shear transfer plate 1150 in a substantially rigid manner.

In one embodiment, the gusset connector plate 1130 is formed from a 16 gauge sheet steel. When unfolded, the plate 1130 has dimensions of approximately 2'–8"×1'–6". When folded, the base section 1131 has dimensions of approximately 1'–6"×3⅝"; Each of the first and second sections 1132a, 1132b has dimensions of approximately 1'6"×1'0⅞". Each of the first and second top sections 1133a, 1133b has dimensions of approximately 1'6"×1⁵⁄₁₆". The chamfers 1138 and 1139 are approximately 1" chamfers Each of the openings 1137a, 1137a has dimensions of approximately 1'–1"×6¼". The holes 1140a, 1140b, 1140c, 1140d are sized with diameter of approximately ½". The holes 1141, 1142 are sized with diameter of approximately ⅛" to receive nails.

FIG. 5 illustrates the head rail 1110 which is an elongate member with a hollow rectangular cross section. The head rail 1110 comprises a first side 1111 and a second side 1112 that are substantially parallel to each other. The head rail 1110 further comprises a top side 1113 and a bottom side 1114 that are substantially parallel to each other, and substantially perpendicular to the first and second sides 1111, 1112. The first side 1111 defines holes 1121a, 1122a, 1123a, 1124a, and the second side 1112 defines holes 1121b, 1122b, 1123b, 1124b (not shown). The holes 1121a, 1122a, 1123a, 1124a are substantially coaxial with the holes 1121b, 1122b, 1123*b*, 1124*b*, and these two sets of holes are used to connect the head rail 1110 to the rail assembly 120 in a manner described below.

The top side 1113 defines holes 1126*a*, 1126*b*, 1126*c*, 1126*d*, and the bottom side 1114 defines holes 1127*a*, 1127*b*, 1127*c*, 1127*d* that are substantially coaxial with the holes 1126*a*, 1126*b*, 1126*c*, 1126*d*. The holes 1126*a*, 1126*b*, 1126*c*, 1126*d* and 1127*a*, 1127*b*, 1127*c*, 1127*d* are sized and arranged to permit bolts 1155 to pass therethrough so as to interconnect the first shear transfer plate 1150, the gusset connector plate 1130, and the second shear transfer plate 1160 to the head rail 1110 in a substantially rigid manner. A bolt 1155 extends through the hole 1153*a* of the first shear transfer plate 1150, through the hole 1140*a* (FIG. 6) of the gusset connector plate 1130, through the hole 1153*a* (not shown) of the second shear transfer plate 1160, through the holes 1126*a* and 1127*a* of the head rail 1110, to be secured by a nut 1156. Similarly, three additional bolts 1155 extend through, respectively, holes 1153*b*, 1153*c*, 1153*d* of the first plate 1150, holes 1140*b*, 1140*c*, 1140*d* of the gusset connector plate 1130, holes 1153*b*, 1153*c*, 1153*d* of the second plate 1160, holes 1126*b*, 1126*c*, 1126*d* and holes 1127*b*, 1127*c*, 1127*d* of the head rail, so as to be secured by nuts 1156.

In one embodiment, the head rail 1110 has a cross sectional dimension of approximately 3"×1"×⅛" thick steel. The head rail 1110 is approximately 1'-6" long. The holes 1121*a*, 1122*a*, 1123*a*, 1124*a*, and 1121*b*, 1122*b*, 1123*b*, 1124*b* are sized with diameter of approximately ⅝". The holes 1126*a*, 1126*b*, 1126*c*, 1126*d*, and 1127*a*, 1127*b*, 1127*c*, 1127*d* are sized with diameter of approximately ½". The bolts 1155 are approximately 6½" long, and have ½" threads at the ends. The nuts 1156 are threaded accordingly to receive the ends of the bolts 1155.

The rail assembly 120 is interconnected to the shear transfer assembly 1100 by bolts 250 and nuts 252. A bolt 250 extends through the holes 213*a* and 213*b* of the first rail 201, through the holes 1121*a* and 1121*b* of the bead rail, through the holes 233*b* and 233*a* of the third rail 203, so as to be secured with a nut 252. The holes 213*a* and 233*a* are sized larger than the holes 213*b* and 233*b* so as to permit the head of the bolt 250 and the nut 252 secured end to be positioned substantially within the rails 201 and 203, similar to the rail attachment methods described above. Similarly, another bolt 250 extends through holes 214*a*, 214*b*, 1122*a*, 1122*b*, 234*b*, and 234*a*, so as to be secured by another nut 252. Another bolt 250 extends through holes 223*a*, 223*b*, 1123*a*, 1123*b*, 243*b*, and 243*a*, so as to be secured by another nut 252. Another bolt 250 extends through holes 224*a*, 224*b*, 1124*a*, 1124*b*, 244*b*, and 244*a*, so as to be secured by another nut 252.

Thus, through the interconnections described above, the top plate 142 is interconnected to the rail assembly 120 in a substantially rigid manner. In a static situation, the top plate 142 bears down on the shear transfer assembly 1100 such that the first leg comprising first and third rails 201, 203 and the second leg comprising second and fourth rails 202, 204 are simultaneously under compression and inhibited from buckling so as to provide structural strength. When the top plate 142 is subjected to a shear force in a first direction 1171, the first leg is under compression and the second leg is under tension so as to transfer the shear force and mitigate lateral displacement of the top plate 142 with respect to the foundation. When the top plate 142 is subjected to a shear force in a second direction 1172, the first leg is under tension and the second leg is under compression so as to transfer the shear force and mitigate lateral displacement of the top plate 142 with respect to the foundation.

Figure 7:
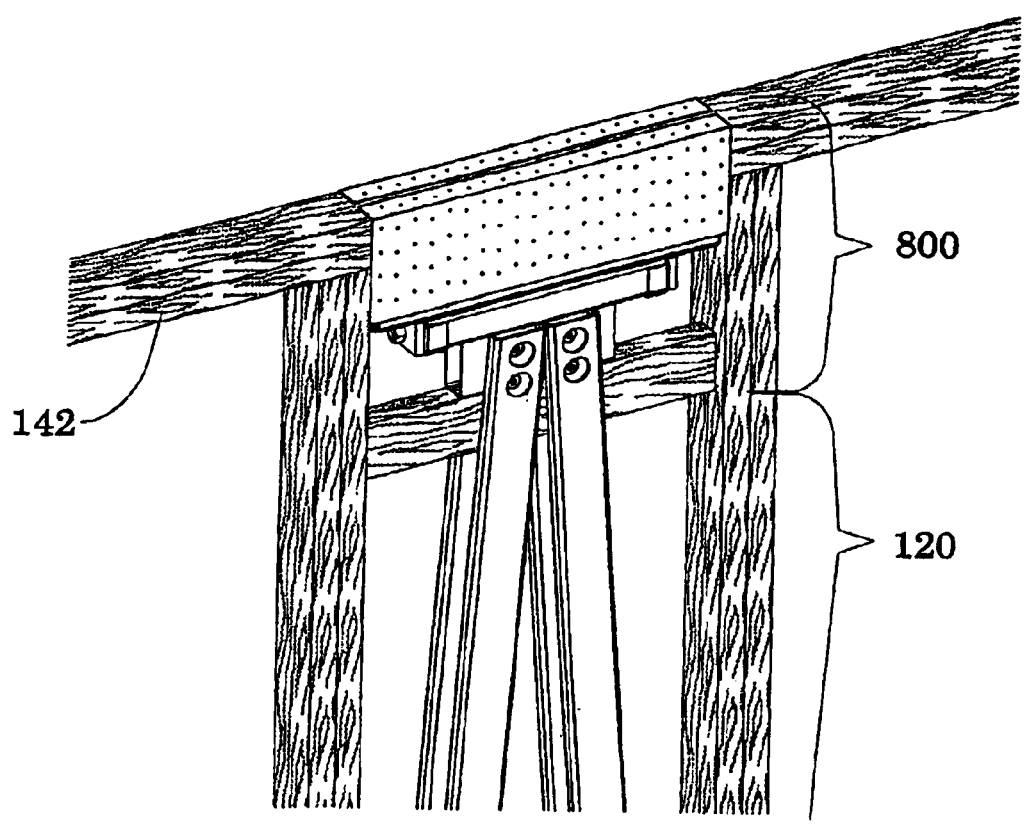
FIG. 7 is a perspective assembled view of another embodiment of the head assembly of the A-frame shear assembly.

FIG. 7 illustrates another embodiment of the head assembly, denoted as a damper 800 that interconnects the top plate 142 to the rail assembly 120 in a manner described below so as to provide dampening of lateral relative motions between the top plate 142 and the foundation. The damper 800 includes a spring member comprising coil springs arranged along a single axis.

Figure 8:
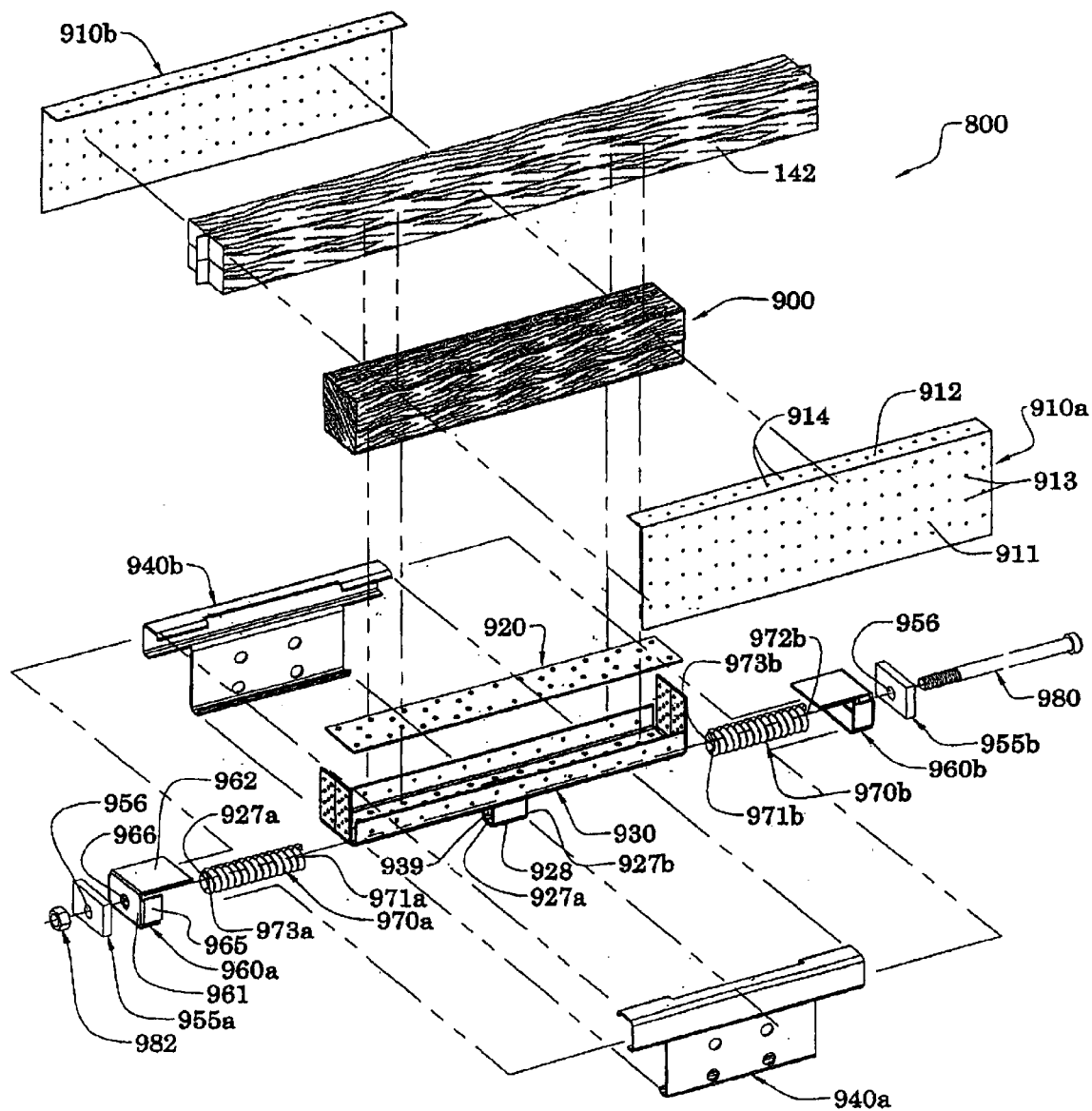
FIG. 8 is an exploded unassembled view of the head assembly of FIG. 7, wherein motion dampening is achieved in part by two motion damper coil springs arranged in a substantially coaxial manner.

FIG. 8 illustrates an exploded unassembled view of the damper 800. The top plate 142 is interconnected to a slide actuator 900 by gusset connector plates 910*a* and 910*b* in a substantially rigid manner described below. The slide actuator 900 is interconnected to a plate connector 920 and a damper slide 930 in a substantially rigid manner described below. Thus, the top plate 142 is interconnected to the damper slide 930 in a substantially rigid manner.

The rail assembly 120 (not shown in FIG. 8) is interconnected to casing sides 940*a* and 940*b* in a substantially rigid manner described below. The casing sides 940*a*, 940*b* are interconnected substantially rigidly to casing end caps 960*a* and 960*b*, by reinforcing plates 955*a*, 955*b*, an assembly bolt 980, and a nut 982.

Portions of the damper slide 930 are in engagement with first ends 971*a*, 971*b* of first and second spring 970*a*, 970*b*. Portions of the casing end caps 960*a*, 960*b* are in engagement with second ends 972*a*, 972*b* of the first and second springs 970*a*, 970*b*. Thus, the top plate 142 is coupled to the rail assembly 120 (and thus the foundation) by the springs 970*a*, 970*b*. The damper 800 also comprises parts that cause frictions so as to promote the dampening effect. In particular, contact of the damper slide 930 with the casing sides 940*a*, 940*b*, as described below, is one such source of friction.

Individual parts of the damper 800 illustrated in FIG. 8 are described below in greater detail in FIGS. 9A to 9G. Methods of attachments that interconnect the parts are also described.

Figure 9A:
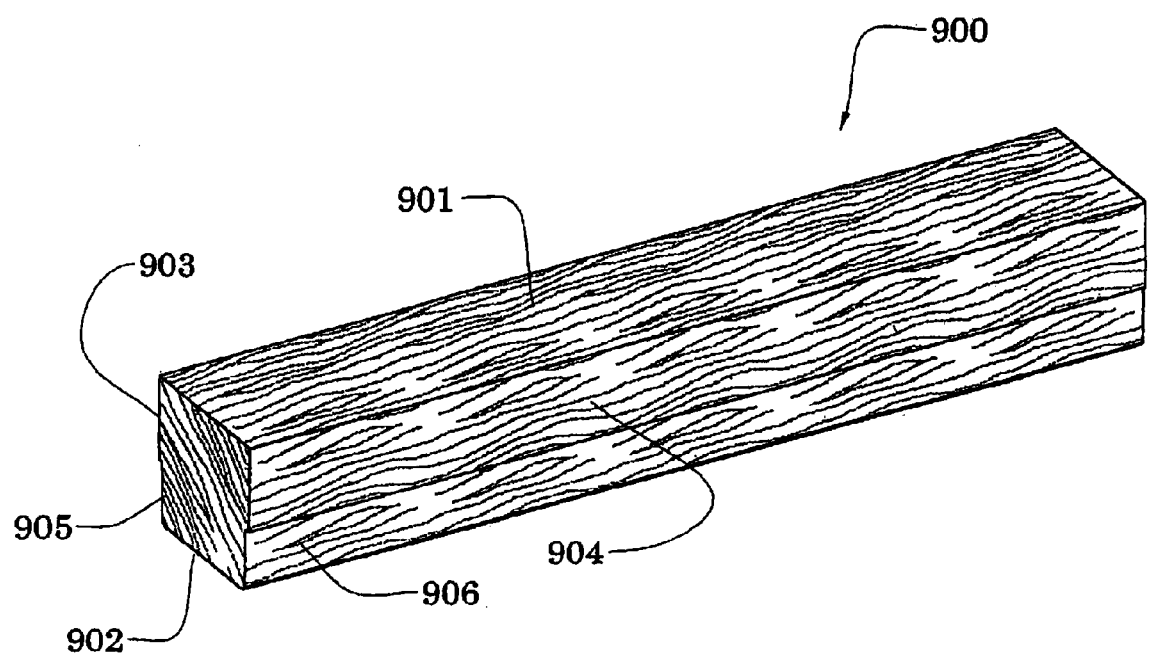
FIG. 9A is an isometric view of a shock absorber slide actuator of the head assembly of FIG. 8.
Figure 9B:
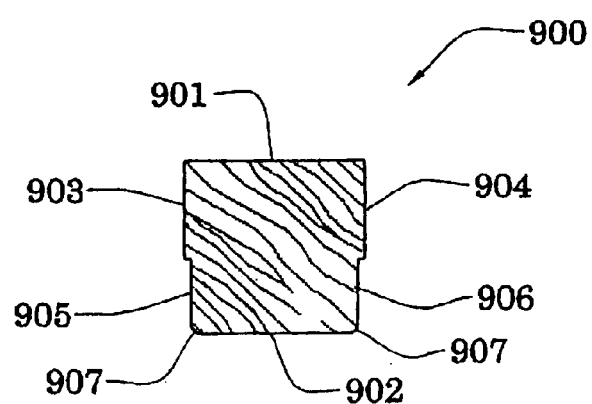
FIG. 9B is an end view of the shock absorber slide actuator of FIG. 9A.

FIGS. 9A and 9B illustrate the slide actuator 900 that transfers the forces from the top plate 142 to the damper slide 930. In one embodiment, the slide actuator 900 comprises an elongate wooden block with a top 901, a bottom 902, a first side 903, and a second side 904 that define a generally square shaped cross section, as show in FIG. 9B. The first side 903 defines a rabbet 905 that extends towards the top 901 starting from the bottom 902. Similarly, the second side 904 defines a rabbet 906 that extends toward the top 901 starting from the bottom 902. As seen in FIG. 9A, the rabbets 905, 906 extend substantially the full length of the slide actuator 900. The rabbets 905, 906 permit the slide actuator 900 to fit into a recess 923 (FIG. 9D) defined by the damper slide 930. The slide actuator 900 further comprises chamfers 907 located at two corners defined by rabbets 905, 906 and the bottom 902. The chamfers 907 facilitate easier insertion of the slide actuator 900 into the recess 923.

In one embodiment, the slide actuator 900 comprises an approximately 1'-8" long 4×4 lumber whose cross section dimensions are approximately 3½"×3½". Each of the rabbets 905, 906 is approximately ⅛" deep and 1½" high along the first and second sides 903, 904. The chamfers 907 are ⅛" chamfers.

The slide actuator 900 is interconnected to the top plate 142 by the gusset connector plates 910*a* and 910*b* (FIG. 8). The description of the gusset connector plate 910*a* below also applies to the substantially similar gusset connector plate 910*b*. As shown in FIG. 8, the gusset connector plate 910*a* comprises a rectangular shaped plate folded along near the top so as to form a panel section 911 and a top section 912. The top section 912 defines a plane that is substantially perpendicular to a plane defined by the panel section 911. The panel section defines a plurality of holes 913 that are adapted to permit fasteners such as nails or screws to pass through so as to be secured to the slide actuator 900 and the top plate 142. The height of the panel section 911 is selected so as to cover the top portion of the slide actuator 900 and the side of the top plate 142. The top section 912 then engages the top side of the top plate 142. The top section 912 also defines a plurality of holes 914 that are adapted to permit fasteners such as nails or screws to pass through so as to be secured to the top side of the top plate 142.

When the gusset connector plates 910a, 910b are secured to the slide actuator 900 and the top plate 142, the slide actuator 900 becomes interconnected to the top plate 142 in a substantially rigid manner. In one embodiment, the gusset connector plate 910a is a 16 gauge steel with ⅛" diameter nail holes 913, 914. The holes 913, 914 are arranged in a staggered fashion throughout the panel section 911 and the top section 912 so as to improve the load distribution placed on the gusset connector plate 910a. The gusset connector plate 910a is approximately 1'–9" long. The panel section 911 is approximately 6½" wide, and the top section 912 is approximately 1½" wide.

Figure 9C:
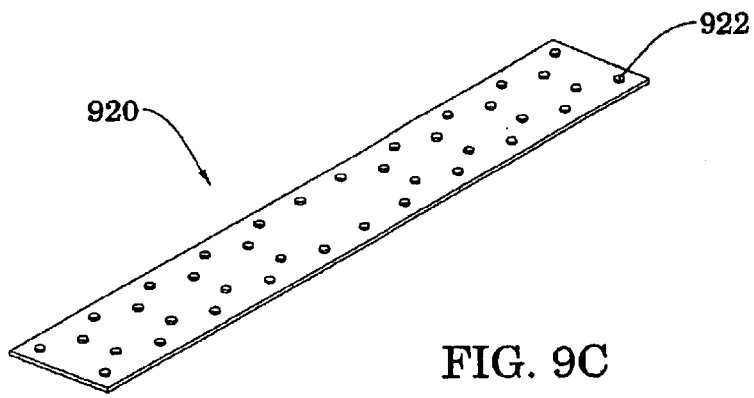
FIG. 9C is an isometric view of a plate connector of the head assembly of FIG. 8.
Figure 9D:
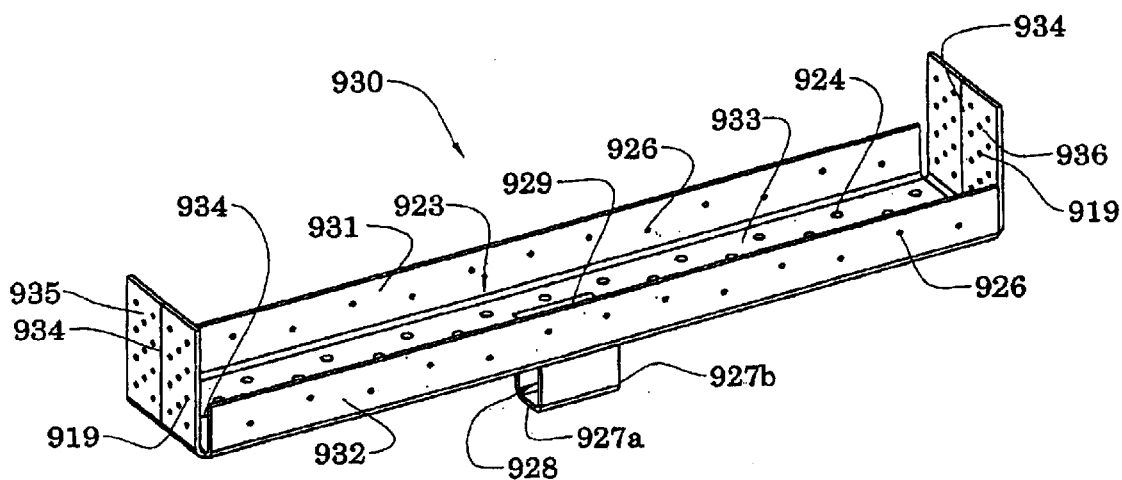
FIG. 9D is an isometric view of a motion damper slide of the head assembly of FIG. 8.
Figure 9E:
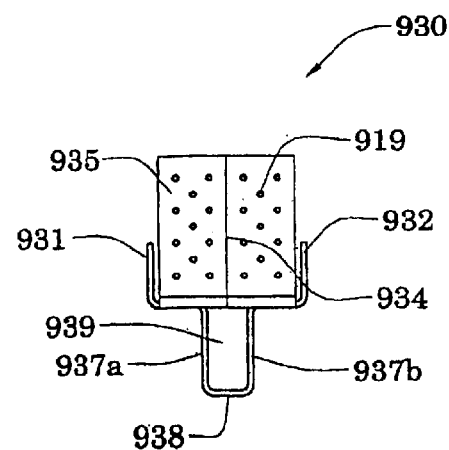
FIG. 9E is an end view of the motion damper slide of FIG. 9D.

FIGS. 9C to 9E illustrate the plate connector 920 and the damper slide 930 that are attached to the slide actuator 900 so as to interconnect the damper slide 930 to the top plate 142 in a substantially rigid manner. The plate connector 920 is a rectangular shaped plate that defines a plurality of press join clinches 922 arranged in a selected manner so as to substantially match plurality of clinch holes 924 defined by the damper slide 930 in a manner described below.

As shown in FIGS. 9D and 9E, the damper slide 930 comprises a base section 933 interposed between a first side 931 and a second side 932 such that in cross section, the first, second, and base sections 931, 932, 933 define a recess 923 within a U-shaped channel. The first and second sides 931, 932 are substantially perpendicular to the base section 933. The damper slide 930 further comprises a first end section 935 located at a first end of the damper slide 930. The first end section 935 extends upward so as to be substantially perpendicular to the base section 933. Similarly, a second end section 936, located at a second end of the damper slide 930, extends upward so as to be substantially perpendicular to the base section 933.

The damper slide 930 further comprises an assembly bolt retainer 928, located substantially at the center of the base section 933, that retains the assembly bolt 980 in a manner described below. As shown in FIGS. 9D and 9E, the bolt retainer 928 comprises first and second extensions 937a and 937b that extend downward from the base section 933 in a substantially parallel manner with the first and second sides 931, 932. The first and second extensions 937a and 937b are interconnected at the bottoms by an interconnecting section 938 so as to define an opening that extends in the direction substantially parallel to the elongation direction of the base section 933. The interconnecting section 938 is substantially parallel to the base section 933. The base section 933 defines an opening 933 that substantially coincides with the top of the bolt retainer 928. The bolt retainer 928 further comprises first and second ends 927a and 927b that engage the first ends 971a, 971b of the coil springs 970a, 970b in a manner described below.

In one embodiment, the damper slide 930 is formed from a single sheet of metal such that when formed, two halves join at a center line 934 that extends along the first and second end sections 935, 936, and the base section 933, so as to define a plane that is substantially parallel to and halfway between the first and second sides 931, 932. The interconnecting section 938, however, is contiguous, and forms the interconnection between the two halves described above.

The base section 933 defines a plurality of holes 924 that are adapted to receive the press join clinches 922 of the plate connector 920 described above. Attaching of the plate connector to the base section 933 by the clinches 922 secures the two halves of the damper slide 930 in a substantially rigid manner.

The first and second sides 931, 932 define a plurality of holes 926 adapted to permit fasteners such as screws or nails to pass through so as to be secured to the lower rabbeted portion 905, 906 (FIG. 9B) of the slide actuator 900. The first and second end sections 935, 936 also define a plurality of holes 919 adapted to permit fasteners such as screws or nails to pass through so as to be secured to the ends of the slide actuator 930.

In one embodiment, the plate connector 920 is an approximately 1'–8"×3"×⅛" thick steel plate. The press join clinches 922 are pressed from the top at the factory such that the clinch extends into the holes 924 of the damper slide 930 and be secured within the holes 924.

In one embodiment, the damper slide 930 is formed from an ⅛" thick steel. The overall length of the damper slide 930 is approximately 1'–8½" long and 3½" wide. The base section 933 is approximately 1'–8"×3", so as to receive the plate connector 920. Each of the first and second sides 931, 932 is approximately 1'–8" long and approximately 1½" high. Each of the first and second end sections 935, 936 is approximately 3" wide and 3½" high. Each of the first and second extensions 937a, 937b is approximately 2" high, and the interconnecting section 938 is approximately 1⅛" wide. The length of the bolt retainer 928 (distance between the first and second ends 927a, 927b) is approximately 2". The holes 926, 919 are sized approximately ⅛" in diameter. In one embodiment, nails are used to secure the damper slide 930 to the slide actuator 900.

Attachment of the damper slide 930 to the slide actuator 900 results in a substantially rigid interconnection of the damper slide 930 to the top plate 142. The first ends 971a, 971b of the coil springs 970a, 970b engage the first and second ends 927a, 927b of the bolt retainer 928. Thus, the top plate 142 is in a substantially rigid engagement with the first ends 971a, 971b of the coil springs 970a, 970b.

The second ends 972a, 972b of the coil springs 970a, 970b are in a substantially rigid engagement with the rail assembly 120 (not shown in FIG. 8) in a manner described below. FIGS. 9F and 9G illustrate the casing side 940a that is substantially similar to the casing side 940b. Thus, the description of the casing side 940a, also applies to the casing side 940b. The casing side 940a comprises a housing side 953 and a head rail side 954. The housing side 953 is an elongate channel member that has a cross section shown in FIG. 9G. In cross section, the housing side 953 comprises a first section 941 connected to a second section 942 at the top and a third section 943 at the bottom. The first section 941 is oriented substantially vertically, and the second and third sections 942, 943 both extend in a first direction, toward the center of the housing assembly, that is substantially perpendicular to the first section 941.

A first extension 944 extends, in the first direction towards the center of the housing assembly, substantially contiguously from an area near the first end edge of the second section 942. Thus the first extension 944 is substantially coplanar with the second section 942. A first bend 945 is contiguously formed from the end of the first extension 944 to form a substantially 90 degree bend that points downward. Similarly, a second extension 946 and a second bend 947 are situated near the second end edge of the second section 942 The second section 942, first and second extensions 944, 946 define an opening 952 that permits the bolt retainer 928 (FIG. 9D) to pass through.

Connected to the substantial lengthwise center of the third section 943 of the housing side 953 is a rail panel 948 that, in cross section, extends downward as shown in FIG. 9G. Thus, the rail panel 948 is substantially perpendicular to the third section 943, and substantially parallel to the first section 941. Connected to the rail panel 948 is a bottom section 949 that extends in the first direction towards the center of the casing assembly so as to be substantially perpendicular to the rail panel 948. The end of the bottom section 949 is connected to a third bend 950 that forms a substantially 90 degree bend that points upward. The length of the head rail side 954 is less than the length of the housing side, as seen in FIG. 9F.

The first, second, and third bends 945, 947, and 950 define a plane that is substantially parallel to the first section 941 and the rail panel 948. Thus, when the casing sides 940a and 940b are joined in a manner described below, the first, second, and third bends 945, 947, 950 of the casing side 940a engage with their counterparts such that the two first sections 941 are substantially parallel, and two rail panels 948 are also substantially parallel.

In one embodiment, the casing side 940a is formed from an ⅛" thick steel plate. The length of the housing side 953 is approximately 1'–2". The first section 941 is approximately 2" high, and the second section 942 is approximately 1 1/16" wide. Each of the first and second extensions 944, 946 is approximately 9/16" wide, and each of the first and second bend 945, 947 is approximately ⅜" high. Thus the opening 952 on one casing side 940a has dimensions of approximately 8"×9/16". The third section 943 is approximately ¾" wide.

The head rail side 954 is approximately 10" long. The rail panel 948 is approximately 4" high. The bottom section 949 is approximately ⅞" wide, and the third bend is approximately ⅜" high.

When the casing sides 940a and 940b are brought together, they enclose the coil springs 970a, 970b and the bolt retainer 928. The casing sides 940a and 940b are held together in part by the casing end caps 960a and 960b. The casing end cap 960a is substantially similar to the casing end cap 960b; thus the description of the end cap 960a also applies to the end cap 960b.

As shown in FIG. 9H, the casing end cap 960a comprises a panel 961 that is oriented substantially vertically. Attached to the top of the panel 961 is a top section 962. Attached to the sides of the panel 961 are first and second side sections 964 and 965. Attached to the bottom of the panel 961 is a bottom section 963. The top, bottom, first side section, and second side sections, 962, 963, 964, 965 each extend in a first direction, such that each of the four sections is substantially perpendicular to the panel 961, so as to form a cap. The panel 961 defines a hole 966 (shown on end cap 960a in FIG. 8) sized to permit the assembly bolt 980 to pass therethrough. The panel 961 is sized such that the top, bottom", first side section, and second side sections, 962, 963, 964, 965 enclose one end of the housing assembly of the casing assembly 940a and 940b. Specifically, the top section 962 of the end cap 960a is positioned on top of the second sections 942 (FIG. 9F) of the housing sides 953. The bottom section 963 of the end cap 960a is positioned underneath the third sections 943 of the housing sides 953. The first and second side sections 964, 965 of the end cap 960a are positioned outside the first sections 941 of the housing sides 953.

In one embodiment, the casing end cap 960a is formed from an ⅛" thick steel plate. The panel 961 is approximately 3½"×2¼". The top section 962 is approximately 3" wide, and extends in the first direction by approximately 3 3/16". The bottom section 963 is approximately 3" wide, and extends in the first direction by approximately 1¼". Each of the first and second side sections 964, 965 is approximately 1½" high, and extends in the first direction by approximately 1¼". The hole 966 has a diameter of approximately 13/16".

Situated adjacent the casing end caps 960a and 960b are the reinforcing plates 955a and 955b. The reinforcing plate 955a is substantially similar to the reinforcing plate 955b; thus description of the reinforcing plate 955a also applies to the reinforcing plate 955b. As shown in FIG. 8, the reinforcing plate 955a is a rectangular shaped plate that defines a hole 966. The reinforcing plate 955a acts as a thick washer to distribute the compression forces applied to the housing assembly so as to inhibit deformation of the casing end caps 960a, 960b. In one embodiment, the reinforcing plate 955a is a ½" thick steel plate with dimensions of approximately 3⅛"×2".

The coil springs 970a and 970b, as shown in FIG. 8, are substantially similar. Thus, the description of the spring 970a is also applicable to the spring 970b. The coil spring 970a comprises a plurality of windings in a helical manner that is well known in the art. The coil spring 970a comprises the first end 971a, and the second end 972a. The spring 970a further comprises a hollow core 973a. In one embodiment, the spring 970a is wound from an approximately ¼" diameter spring steel, such that the overall length is approximately 5 27/32" when uncompressed, and the outside diameter is approximately 1½". The diameter of the hollow core 973a is approximately ⅞".

In one embodiment, the assembly bolt 980 is a 15¾" long shoulder bolt with a ¾" threaded end. The nut 982 is threaded accordingly to receive the threaded end of the bolt 980.

The manner in which the casing assembly 940a, 940b and the parts therein are assembled is now described in reference to FIG. 8. The first coil spring 970a is positioned such that its first end 971a is in engagement with the first end 927a of the bolt retainer 928. Similarly, the first end 971b of the second coil spring 970b is brought into engagement with the second end 927b of the bolt retainer 928. The casing sides 940a and 940b are brought together such that their housing sides 953 (FIG. 9F) enclose the springs 970a and 970b. Casing end caps 960a and 960b are places at the ends of the housing sides 953. The assembly bolt 980 extends through the hole 956 of the reinforcing plate 955b, through the hole 966 (not shown) of the end cap 960b, through the hollow core 973b of the spring 970b, through the opening 939 of the bolt retainer 928, through the hollow core 973a of the spring 970a, through the hole 966 of the end cap 960a, through the hole 956 of the reinforcing plate 955a, so as to be secured by the nut 982.

The head rail sides 954 (FIG. 9F) of the casing sides 940a, 940b are secured to the rail assembly 120 via holes 951 in a similar substantially rigid manner described above in reference to the damper 400 and FIGS. 2 and 4. Thus, the rail assembly 120 is in a substantially rigid engagement with the second ends 972a, 972b of the coil springs 970a, 970b, via the casing assembly 940a, 940b described above. Thus, the top plate 142 is coupled to the rail assembly 120 by the coil springs 970a, 970b, to permit dampening of lateral motion in a manner described below.

Figure 10:
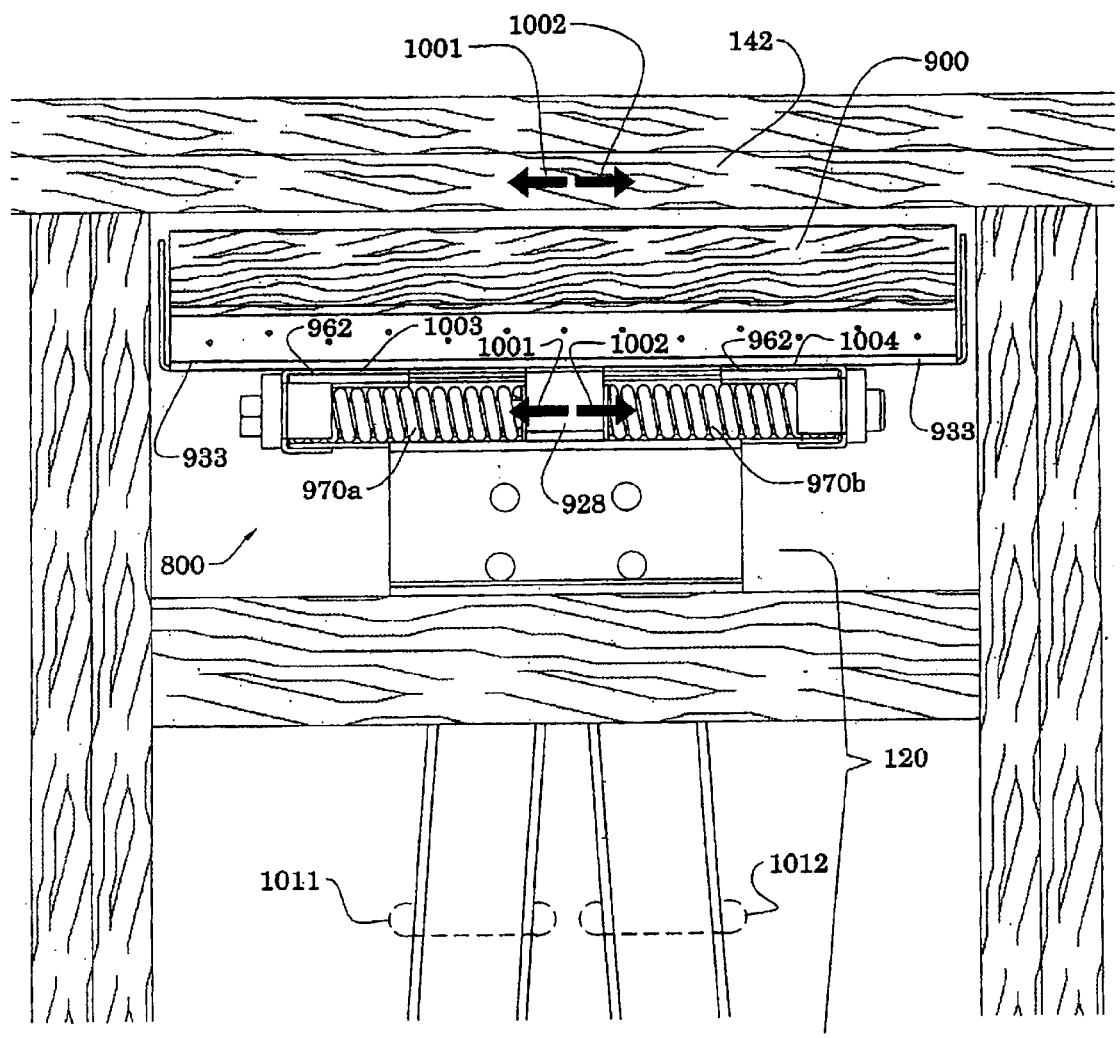
FIG. 10 is a cutaway view of the head assembly of FIG. 9, illustrating positioning of the motion damper coil springs adapted to dampen lateral motion of upper portion of the wall relative to lower portion of the wall.
Figure 11:
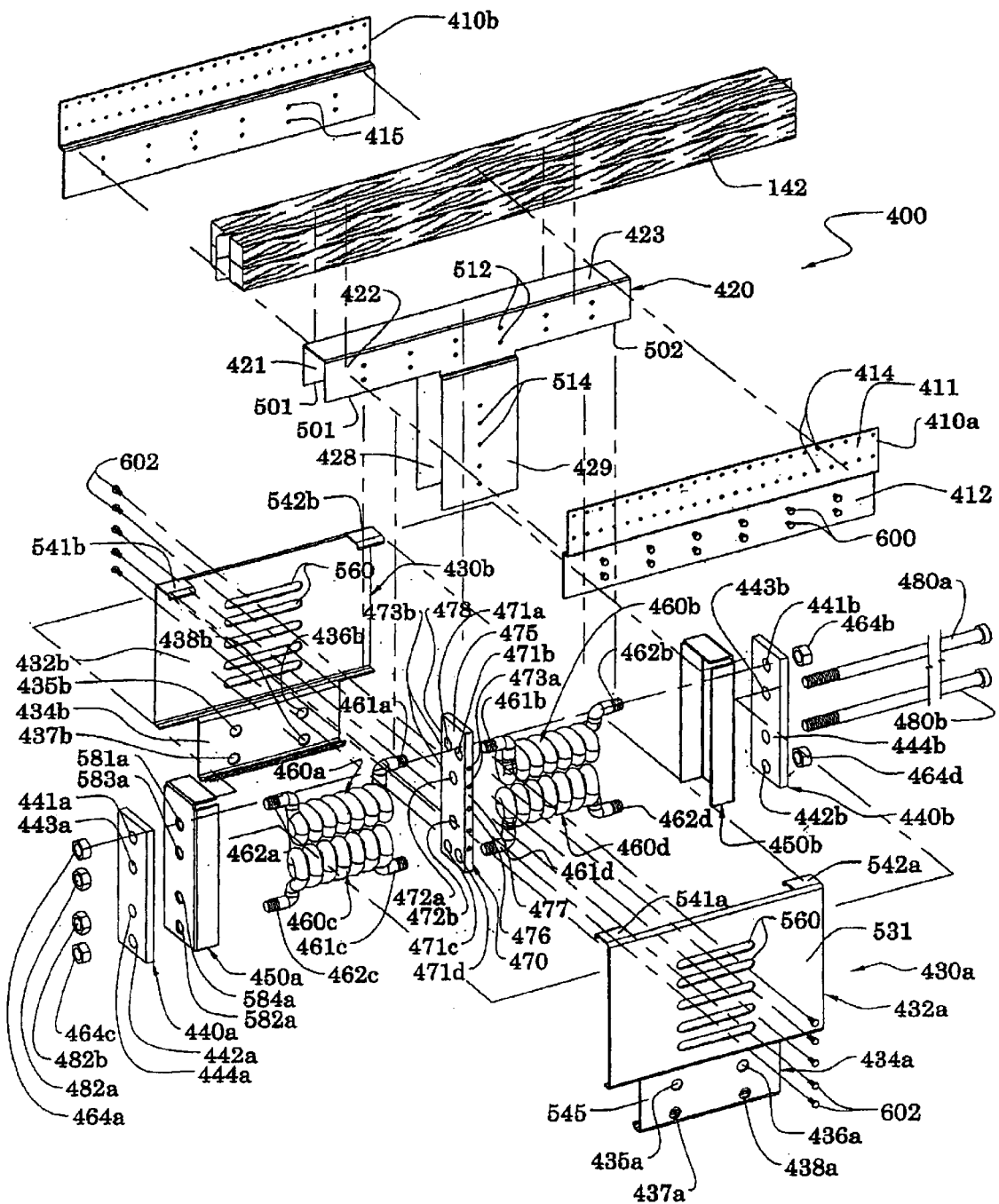
FIG. 11 illustrates an exploded unassembled view of another embodiment of the head assembly of the A-frame shear assembly, wherein the head assembly uses multiple motion damper coil springs to dampen lateral motion of top portion of the wall relative to bottom portion of the wall.

FIG. 10 illustrates a partially cut-away view of the damper 800 coupling the top plate 142 to the rail assembly 120. In particular, FIG. 10 illustrates lateral motions of top and bottom portions of the wall, and how such motions are dampened. For the sake of subsequent description in reference to FIG. 10, it will be assumed that the foundation (and thus the rail assembly 120) is stationary, and a top portion of a building (and, thus the top plate 142) moves as a result of an external force such as a strong wind. It will be appreciated that the A-frame shear assembly 100 functions in a similar manner if the motion is initiated at the foundation, such as in an earthquake.

If the top plate 142 is subjected to an external force that causes motion of the top plate in a first direction 1001, the assembly bolt retainer 928 also moves in the first direction 1001, since the bolt retainer 928 is substantially rigidly interconnected to the top plate 142. As the bolt retainer 928 moves in the first direction 1001 so as to cause a first displacement, the spring 970a is compressed. The compressed spring 970a exerts a restoring force on the bolt retainer 928 that is directed in a second direction 1002 that is substantially opposite of the first direction 1001.

If the first displacement of the bolt retainer 928 in the first direction 1001 is sufficiently large, the restoring motion in the second direction 1002 may cause the bolt retainer 928 to go past the original rest location so as to cause a second displacement. If such overshoot occurs, then the spring 970b is now compressed, thus causing a restoring force in the first direction 1001. It will be appreciated that the amplitude of the second displacement is smaller than the amplitude of the first displacement due to the dampening caused by frictions present in the damper 800. Similarly, the amplitude of the third displacement (if it exists) is smaller than the amplitude of the second displacement, and so on. It will be appreciated that for a lateral motion where the initial displacement is in the second direction 1002, the subsequent motions will be substantially similar but in opposite directions as the sequence of motions described above.

The degree of dampening depends on the spring constant of the springs 970a, 970b, and the amount of friction present. FIG. 10 further illustrates one source of friction within the damper 800. A contact areas 1003, 1004 are where the base section 933 of the damper slide 930 comes into engagement with the top sections 962 of the casing end caps 960a, 960b. It will be appreciated that the damper 800 comprises other sources of frictions. For example, the assembly bolt 980 may come into contact with the inside of the springs 970a, 970b as the bolt 980 extends through the hollow cores.

FIG. 10 further illustrates a first leg 1011 that comprises the third and fourth rails 203, 204, and a second leg 1012 that comprises the first and second rails 201, 202. As is known in the art, the angled "A" orientation of the first and second legs 1011, 1012 provide structural strength during a static situation where the top plate 142 bears down on the A-frame shear assembly 100. In such a situation, both of the first and second legs 1011, 1012 are under compression.

If the top plate 142 is subjected to a shear force that causes a displacement in the first direction 1001, part of that force is transmitted to the rail assembly 120, such that the first leg 1011 experiences a compression force, while the second leg 1012 experiences a tension force substantially simultaneously. The rail assembly 120, being substantially resistant to buckling in a manner described above, thus inhibits the shear force from displacing the top plate 142 excessively with respect to the foundation. In a similar manner, if the shear force causes a displacement in the second direction 1002, part of that force is transmitted to the rail assembly 120, such that the first leg 0101 experiences a tension force while the second leg 1012 experiences a compression force so as to resist excessive displacement of the top plate 142 with respect to the foundation. It will be appreciated that while the damping device 800 has been disclosed in conjunction with an A-frame shear assembly, it can be used with any of a number of known shear panels as will be illustrated and described in an exemplary fashion hereinbelow.

FIG. 11 is an exploded unassembled view of another embodiment of the head assembly, denoted as a damper 400. The damper 400 includes a spring member comprising coil springs arranged along two parallel axes.

The damper 400 comprises first motion damper slide 410a and a second motion damper slide 410b that is substantially similar to the first motion damper slide 410a The first and second damper slides 410a, 410b, described in greater detail below, interconnect the top plate 142 to a shock absorber slide actuator 420 in a substantially rigid manner described below. The slide actuator 420, described in greater detail below, is attached to an inner reinforcing plate 470 in a substantially rigid manner described below. The inner reinforcing plate 470 is described in greater detail below. Also attached to the inner reinforcing plate 470 are first ends 461a, 461b, 461c, 461d of motion damper coil springs 460a, 460b, 460c, 460d in a substantially rigid manner described below. Thus, the top plate 142 is interconnected to the first ends 461a, 461b, 461c, 461d of the coil springs 460a, 460b, 460c, 460d in a substantially rigid manner. The coil springs 460a, 460b, 4604 460d are substantially similar to each other, and are described in greater detail below.

FIG. 11 further illustrates a first motion damper casing side 430a and a second motion damper casing side 430b that is substantially similar to the first casing side 430a. The first and second casing sides 430a, 430b, described in greater detail below, enclose the springs 460a, 460b, 460c, 460d and the inner reinforcing plate 470 in a manner described below. The first and second casing sides 430a, 430b also attach to the first ends 211, 221, 231, 241 (FIG. 2) of the rails 201, 202, 203, 204 in a substantially rigid manner described below. The first and second casing sides 430a, 430b are interconnected to second ends 462a, 462b, 462c, 462d of the springs 460a, 460b, 460c, 460d in a substantially rigid manner described below via first and second motion damper casing end caps 450a, 450b, first and second outer reinforcing plates 440a, 440b, and first and second motion damper assembly bolts 480a, 480b. The first and second casing end caps 450a, 450b are substantially similar to each other, and are described in greater detail below. The first and second outer reinforcing plates 440a, 440b are substantially similar to each other, and are described in greater detail below. The first and second damper assembly bolts 480a, 480b are substantially similar to each other, and are described in greater detail below.

It will be appreciated that the second ends 462a, 462b, 462c, 462d of the springs 460a, 460b, 460c, 460d are thus interconnected to the rail assembly 120 in a substantially rigid manner. As referred to above, the first ends 461a, 461b, 461c, 461d of the springs 460a, 460b, 460c, 460d are interconnected to the top plate 142 in a substantially rigid manner. Thus, the top plate 142 is coupled to the rail assembly 120 by the springs 460a, 460b, 460c, 460d that are guided by the first and second damper assembly bolts in a manner described below. Additionally, the slide actuator 420 engages the top portion of the first and second casing sides 430a, 430 in a manner described below, such that friction exists at the points of engagement. The combination of the springs 460a, 460b, 460c, 460d and friction yield dampening of relative lateral motion between the top plate 142 and the rail assembly 120 (and thus the foundation).

Figure 12A:
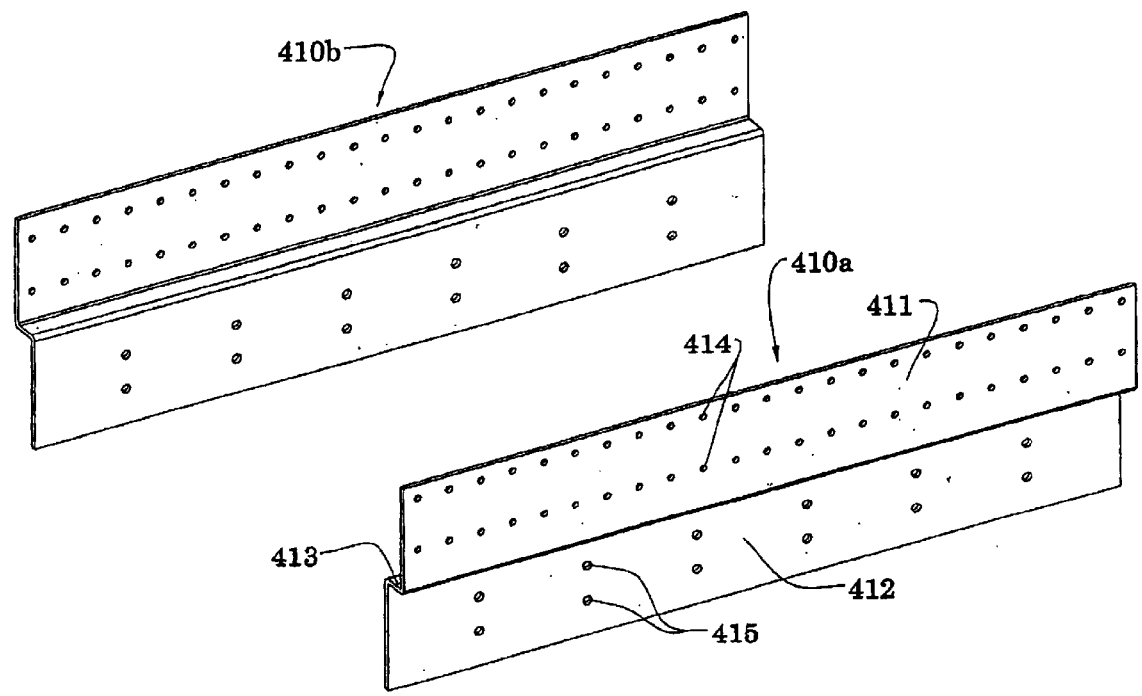
FIG. 12A is an isometric view of a motion damper slide of the head assembly of FIG. 11.
Figure 12B:
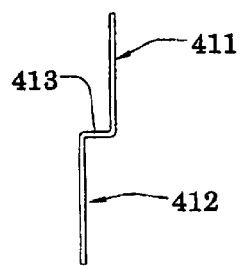
FIG. 12B is an end view of the motion damper slide of FIG. 12A.
Figure 13:
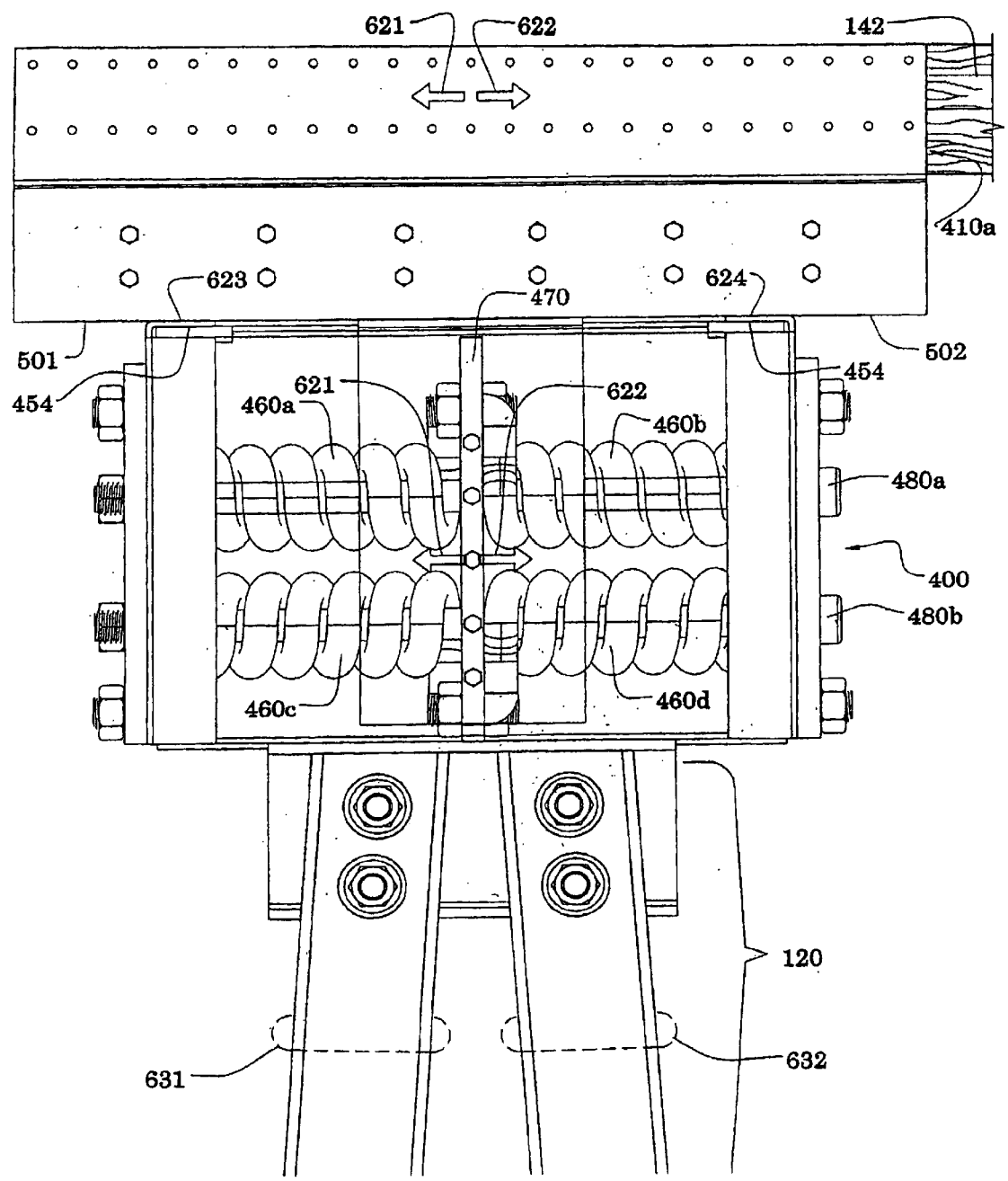
FIG. 13 is a cutaway view of the head assembly of FIG. 11, illustrating positioning of the motion damper coil springs adapted to dampen lateral motion of upper portion of the wall relative to lower portion of the wall.

FIGS. 12A and 12B illustrate the motion damper slide 410a The damper slide 410b (FIG. 11) is substantially similar to the damper slide 410a; thus, the description of the damper slide 410a applies to the damper slide 410b. The damper slide 410a is an elongate metal member that has a cross section comprising a first section 411 and a second section 412 interconnected by an interconnecting section 413, such that the interconnecting section 413 is substantially perpendicular to both first and second sections 411, 412. Furthermore, the interconnecting section 413 is attached to the ends of the first and second sections 411, 412 such that the first and second sections 411, 412 extend away from each other in a substantially parallel manner. In one embodiment, the damper slide 410a is formed from 1/8" thick steel. Each of the first and second sections 411, 412 is approximately 3" long in cross section, and the interconnecting section 413 is approximately 5/8" long id cross section. The lateral dimension of the damper slide 410a is approximately 1'-8".

The first section 411 of the damper slide 410a defines a plurality of holes 414 that are sized to permit nails or screws to pass therethrough and into the top plate 142 (FIG. 11) so as to secure the first section 411 to the top plate 142. In one embodiment, the holes 414 are approximately 3/16" in diameter, and are arranged in two rows with one row being separated from the other row by approximately 1½". The holes 414 are spaced apart by approximately 7/8" within the row.

The second section 412 of the damper slide 410a defines a plurality of holes 415 that are sized to permit screws 600 (FIG. 11) to pass therethrough and be received by the slide actuator 420 so as to secure the second section 412 to the slide actuator 420. In one embodiment, the holes 415 are approximately ¼" in diameter, and are arranged in two rows with one row being separated from the other row by approximately 1". The holes 415 are space apart by approximately 3" within the row.

The two right angle bends in the cross section of the damper slide 410a provide the damper slide 410 structural strength to resist flexing and warping. The right angle between the first section 411 and the interconnecting section 413 also permits receiving of a lower corner of the top plate 142 (FIG. 11) such that the second section 412 extends down beneath the top plate 142 and partially supports the load from the top plate 142. As mentioned above, it will be understood that the description relating to the damper slide 410a applies to the substantially similar damper slide 410b.

Figure 12C:
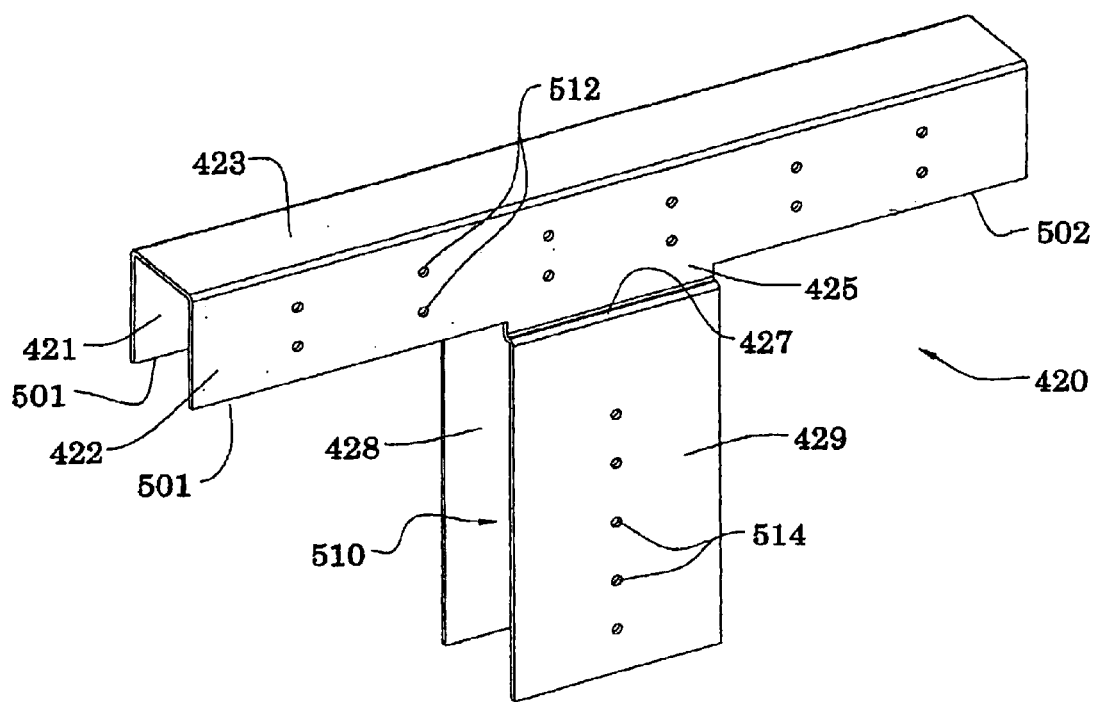
FIG. 12C is an isometric view of a shock absorber slide actuator of the head assembly of FIG. 11.
Figure 12D:
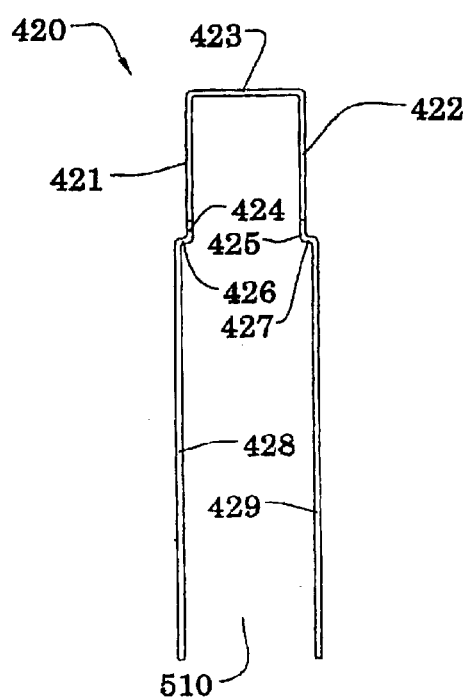
FIG. 12D is an end view of the shock absorber slide actuator of FIG. 12C.

FIGS. 12C and 12D illustrate the shock absorber slide actuator 420 that is substantially rigidly attached to the top plate 142 (FIG. 11) via the slide actuators 410a, 410b. The slide actuator 420 comprises a first section 421 and a second section 422 interconnected by a base section 423 so as to form a U-shaped channel member. Extending from the middle portion of the first section 421 is a first extension 424 that is substantially coplanar with the first section 421, and extends away from the base section 423. A second extension 426 extends substantially perpendicularly outward from the end of the first extension 424, wherein outward direction in reference to the first section 421 is away from the second section 422. A third extension 428 extends substantially perpendicularly from the end of the second extension 426 such that the third extension 428 extends away from the base section 423, substantially parallel to the first section.

The middle portion of the second section 422 is interconnected to extensions 425, 427, 429 in a similar manner, wherein the extensions 425, 427, 429 form substantially symmetric mirror images in cross section with the first, second, and third extensions 424, 426, 428, respectively, in the same manner as the second section 422 being the substantially symmetric mirror image of the first section 421.

Preferably, the slide actuator 420 is formed from a single piece of 1/8" thick steel. The length of the U-shaped channel formed by the first, second, and base sections 421, 422, 423 is approximately 1'-8" long. The base section 423 is approximately 2½" wide, and each of the first and second sections 421, 422 is approximately 2¾" wide. The extensions 424, 426, 428, 425, 427, 429 have a dimension of approximately 5" along the direction parallel to the U-shaped channel elongation direction, and are substantially centered along that direction. The first extension 424 extends approximately 3/8", the second extension 426 extends approximately 3/8", and the third extension 428 extends approximately 9 3/32" in directions specified above. Similarly, the extensions 425, 427, 429 extend in manners substantially similar to but mirror image of the extensions 424, 426, 428.

In use, the slide actuator 420 is oriented such that it resembles an inverted "U" when viewed cross sectionally, and a "T" when viewed from front. In that orientation the base section 423 engages the bottom of the top plate (FIG. 11). Each of the first and second sections 421, 422 comprise a plurality holes 512 that are arranged so as to, substantially match the plurality of holes 415 on the damper slides 410a, 410b (FIG. 12C). In one embodiment, the holes 512 are adapted to receive ¼" screws 600 that pass through the holes 415 of the damper slides 410a, 410b and engage the holes 512 so as to secure the damper slides 410a, 410b to the slide actuator 420. Once the damper slides 410a, 410b are attached to the slide actuator 420, the interconnecting sections 413 of the damper slides 410a, 410b are substantially coplanar with the base section 423 so as to simultaneously engage the bottom of the top plate 142.

Since the slide actuator 420 is substantially rigidly attached to the damper slides 410a, 410b, and the damper slides 410a, 410b are substantially rigidly attached to the top plate 142, the slide actuator 420 is in effect substantially rigidly attached to the top plate 142. Having two separate damper slides 410a, 410b is advantageous over a single piece unit during installation of the A-frame shear assembly 100 into the wall frame 140 (FIG. 1) as described below.

Each of the first and second sections 421, 422 of the slide actuator 420 comprise a first edge 501 and a second edge 502. These edges frictionally engage a portion of the damper casing sides 430a, 430b in a manner described below to promote dampening effect. The third extension 428 and its mirror image counterpart 429 each defines a plurality of holes 514 adapted to secure the slide actuator 420 to the inner reinforcing plate 470 in a manner described below.

The inner reinforcing plate 470, as illustrated in FIG. 11, is a rectangular plate that has a first side 475 and a second side 476. The inner reinforcing plate 470 further comprises a first edge 477 and a second edge 478. The first and second sides 475, 476 define holes 471a, 471b, 471c, 471d, 472a, 472b that extend therethrough sized and arranged to receive the coil springs 460a, 460b, 460c, 460d, and the assembly bolts 480a 480b in manners described below. The first edge 477 of the inner reinforcing plate 470 defines a plurality of holes 473a adapted to allow attachment of the slide actuator 420 to the inner reinforcing plate 470 in a manner described below. Similarly, the second edge 478 defines a plurality of holes 473b (not shown).

In one embodiment, the inner reinforcing plate 470 is a 9⁷⁄₁₆"×2¾" steel plate with ½" thickness, with the first and second edges 477, 478 defining the length dimension. The holes 471a, 471b, 471c, 471d are sized to be approximately ¹³⁄₁₆" in diameter, and are arranged such that each hole is near the corners of the first and second sides 475, 476. The holes 472a, 472b are sized to be approximately ¹³⁄₁₆" in diameter, and are arranged along an imaginary center line that runs lengthwise at substantially mid-width. The holes 472a, 472b are spaced approximately 3" apart. The holes 471a and 471c (and thus 471b and 471d) are spaced approximately 7" apart. The holes 471a and 471b (and thus 471c and 471d) are spaced approximately 1¼" apart. The holes 472a, 472b are collectively positioned within an imaginary rectangle with corners defined by the holes 471a, 471b, 471c, 471d.

In one embodiment, the holes 473a, 473b are adapted to receive ¼" screws 602 (FIG. 11) so as to permit attachment of the slide actuator 420 to the inner reinforcing plate 470 in a manner described below. In one embodiment, the holes 473a, 473b are threaded to receive ¼" screws 602. Thus, the top plate 142 indirectly becomes attached to the inner reinforcing plate 470 in a substantially rigid manner. The first ends 461a, 461b, 461c, 461d of the coil springs 460a, 460b, 460c, 460d are also attached to the inner reinforcing plate 470 in a manner described below.

The description of the head assembly now shifts to the parts that substantially rigidly interconnect the rail assembly 120 to the second ends 462a, 462b, 462c, 462d of the coil springs 460a, 460b, 460c, 460d. As shown in FIG. 11, the damper casing sides 430a, 430b covers the sides of the coil spring assembly. The damper casing side 430a is substantially similar to the damper casing side 430b, and thus the description below pertaining to the casing side 430a also pertains to the casing side 430b. The holes 435a, 436a, 437a, 438a are designated with different part numbers 435b, 436b, 437b, 438b to facilitate description of assembly below.

Figure 12E:
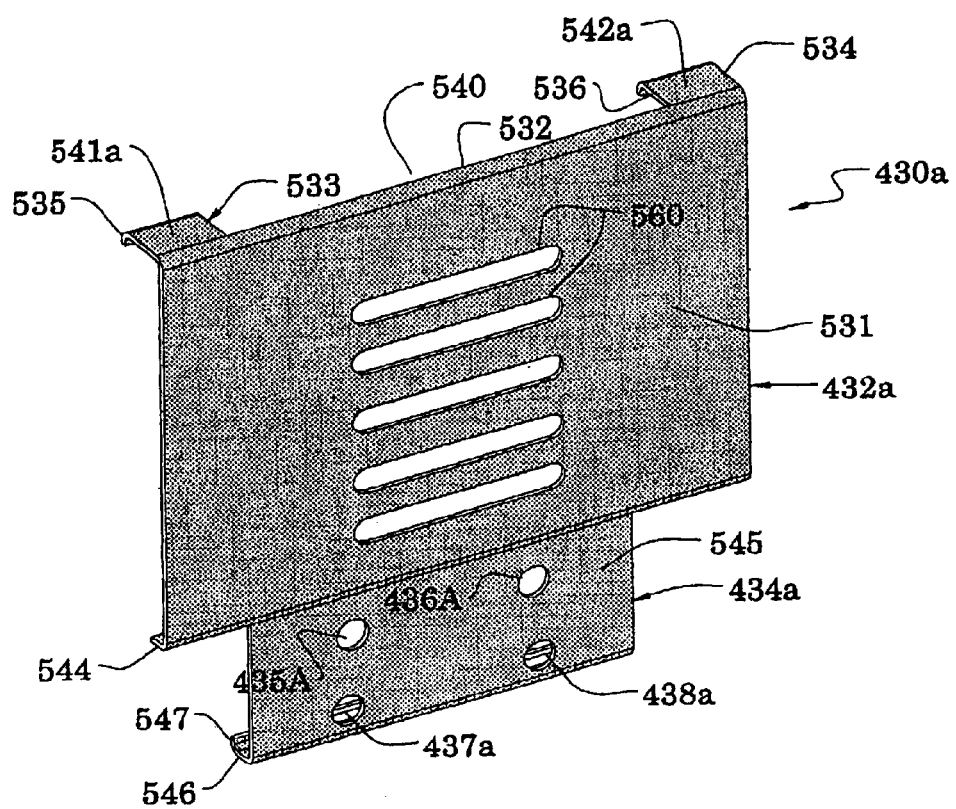
FIG. 12E is an isometric view of a motion damper casing side of the head assembly of FIG. 11.
Figure 12F:
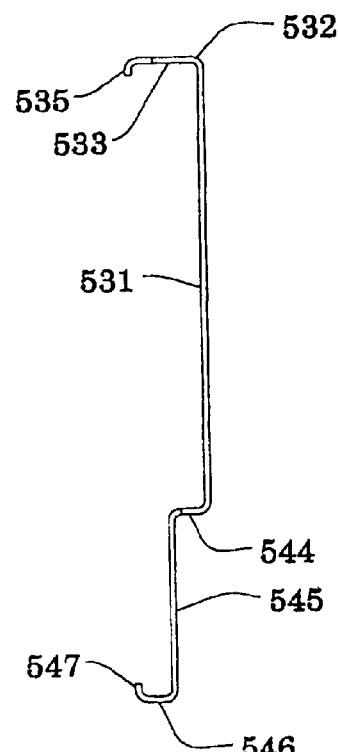
FIG. 12F is an end view of the motion damper casing side of FIG. 12E.

FIGS. 12E and 12F illustrate the damper casing side 430a that comprises a housing side 432a and a head rail side 434a interconnected in a manner described below to form a single piece unit. The housing side 432a comprises a rectangular shaped first panel 531 that defines a plurality of slots 560 which extend in a horizontal direction substantially parallel to the elongation direction of the first panel 531. The housing side 432a further comprises a first bend 532 formed along the top edge of the first panel 531, also extending in a direction parallel to the elongation direction of the first panel 531. In cross section, as seen in FIG. 12F, the first bend 532 forms an approximately 90 degree bend.

As shown in FIG. 12F, a first section 533 extends from the first bend 532 in a direction substantially perpendicular to the first panel 531 plane. Attached at the end of the first section 533 is a second bend 535 that forms an approximately 90 degree bend such that the end of the second bend 535 points in a downward direction substantially parallel to the first panel 531 plane. As shown in FIG. 12E, one edge of the second bend 535, one edge of the first section 533, one edge of the first bend 532, and one edge of the first panel 531 define a plane that is substantially perpendicular to both first section 533 and first panel 531. The first section 533 and the second bend 535 extend partially along the top edge of the first panel 531.

A second section 534 and a third bend 536 are located at the other end of the first bend 532, but are substantially similar to the first section 533 and the second bend 535 described above. The first and second sections 533, 534, situated at opposite ends of the housing side 432a, define an opening 540 that permits portion of the slide actuator 420 to pass through and engage the coil springs 460a, 460b, 460c, 460d housed within a volume defined by the housing side 432a and housing side 432b (not shown) of casing side 430b.

The housing side 432a further comprises a third section 544 located along the bottom edge of the first panel 531. As shown in FIG. 12F, the third section 544 extends in a direction that is substantially same as that of the first section 533, and substantially perpendicular to the first panel 531. The third section 544 runs along the substantially entire length of the bottom of the first panel 531.

The casing side 430a further comprises the head rail side 434a located below the housing side 432a. The head rail side 434a comprises a rectangular shaped second panel 545 that defines holes 435a, 436a, 437a, 438a which are sized and arranged so as to permit the head rail sides 434a and 434b (not shown) to be attached to the rail assembly 120 in a substantially rigid manner described below. As seen in FIG. 12F, the top of the second panel 545 is attached to the third section 544 such that in cross section, the second panel 545 extends in a downward direction substantially perpendicular to the third section 544. Thus the planes defined by the first panel 531 and the second panel 545 are substantially parallel.

The head rail side 434a further comprises a bottom section 546 that is attached to the bottom of the second panel 545. In cross section, as shown in FIG. 12F, the bottom section 546 extends in a direction away from the first panel 531 and substantially perpendicular to the second panel 545. FIG. 12F further shows a fourth bend 547 attached to the end of the bottom section 546. The fourth bend 547 forms an approximately 90 degree bend pointing upward.

Figure 12G:
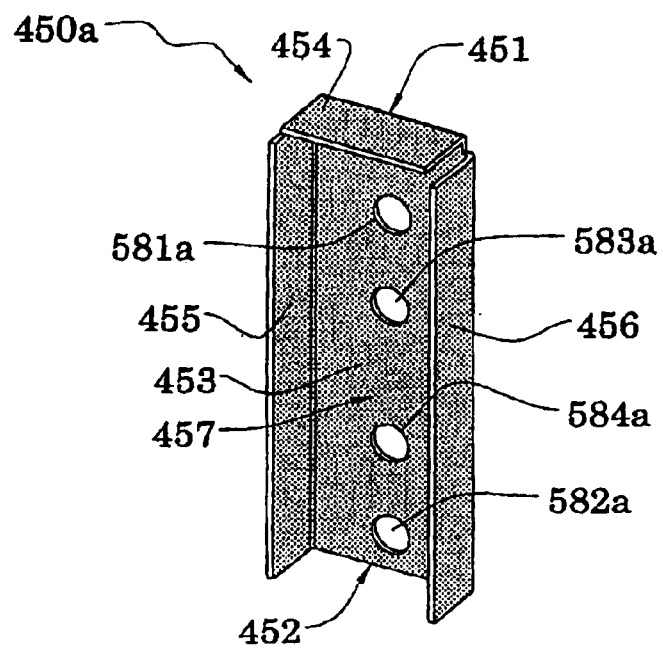
FIG. 12G is an isometric view of a motion damper casing end cap of the head assembly of FIG. 11.

The second panel 545, the bottom section 546, and the fourth bend 547 share a substantially same elongation length which is shorter than the length of the first panel. In one embodiment, the casing side 430a described above is formed from an ⅛" thick steel plate as a single piece. The housing side 432a is approximately 1' 1¹³⁄₁₆" long and 9⅞" tall. The head rail side 434a is approximately 9" long and 4" tall. The slot 540 at the top of the housing side 432a is approximately 10½" long. Accordingly, each of the first and second sections 533, 534 is approximately 2¹⁄₃₂" long. In cross section, the overall dimension from the first panel 531 to the second bend 535 (or third bend 536) is approximately 1⅝". The end of the fourth bend 547 is also displaced horizontally (in cross section) from the first panel 531 by approximately 1⅝", such that an imaginary line connecting the second bend 535 to the fourth bend 547 is substantially vertical and substantially parallel to the first and second panels 531, 545. As such, when two substantially similar casing sides 430a and 430b are assembled together, the bends 535, 536, 547 on each casing sides engage their counterparts so as to form substantially parallel housing sides 432a and head rail sides 434a FIGS. 11 and 12G illustrate the casing end cap 450a that is substantially similar to the casing end cap 450b. The description herein pertaining to the casing end cap 450a also pertains to the casing end cap 450b. FIG. 12G shows an isometric view of the casing end cap 450a comprising a rectangular shaped panel 453 with a first end 451 and a second end 452. The panel 453 defines holes 581a, 583a, 584a, 582a that are arranged along a substantially vertical center line. The holes 581a and 582a are adapted to permit the second ends 462a, 462c (or 462b, 462d) of the springs 460a, 460c (or 460b, 460d) (FIG. 11) to pass therethrough so as to be secured by nuts 464a, 464c (or 464b, 464d). The holes 583a and 583a are adapted to permit the assembly bolts 480a, 480b to pass therethrough so as to be secured by nuts 482a, 482b.

The casing end cap 450a further comprises a flat top section 454 that extends from the top of the panel 453 in a first direction such that is substantially perpendicular to the plane of the panel 453. Extending from the vertical sides of the panel 453 are flat first and second sections 455, 456 that extend in the first direction such that each of the first and second sections 455, 456 is substantially perpendicular to the plane of the panel 453. The first, second, and top sections 455, 456, 454 define a recess 457 sized to receive one end of a housing formed by the housing sides 432a, 432b. Thus, the two casing end caps 450a, 450b cap the two ends of the housing so as to attach the casing end caps 450a, 450b to the housing in a substantially rigid manner.

In one embodiment, the casing end cap 450a is formed from a ⅛" thick steel plate as a single unit. The holes 581a, 583a, 584a, 582a are sized to be 13/16" in diameter. The panel 453 has dimensions of approximately 9½"×3¼". Each of the first and second sections 455, 456 has dimensions of approximately 9½"×1½". The top section 454 has dimensions of approximately 3¼"×1½".

FIG. 11 illustrates the substantially similar outer reinforcing plates 440a, 440b positioned adjacent the casing ends 450a, 450b, respectively. The outer reinforcing plate 440a is a rectangular shaped plate that defines holes 441a, 443a, 444a, 442a that are arranged along a substantially vertical center line. The holes 441a, 442a are adapted to permit the second ends 462a, 462c of the coil springs 460a, 460c to pass therethrough and be secured by the nuts 464a, 464c. The holes 443a, 444a are adapted to permit the assembly bolts 480a, 480b to pass therethrough and be secured by the nuts 482a, 482b. The holes 441a, 443a, 444a, 442a are substantially aligned with the holes 581a, 583a, 584a, 582a of the casing end cap 450a when assembled.

Similarly, the outer reinforcing plate 440b is a rectangular shaped plate that defines holes 441b, 443b, 444b, 442b that are arranged along a substantially vertical center line. The holes 441b, 442b are adapted to permit the second ends 462b, 462d of the coil springs 460b, 460d to pass therethrough and be secured by the nuts 464b, 464d. The holes 443b, 444b are adapted to permit the assembly bolts 480a, 480b to pass therethrough and be secured by the nuts 482a, 482b. The holes 441b, 443b, 444b, 442b are substantially aligned with the holes 581b, 583b, 584b, 582b (not shown) of the casing end cap 450b when assembled.

In one embodiment, the outer reinforcing plate 440a(b) is a ½" thick steel plate with dimensions of 8⅞"×3⅛". The holes 44a(b), 443a(b), 444a(b), 442a(b) are sized to be approximately 13/16" in diameter. The outer reinforcing plates 440a, 440b is a substantially rigid plate that distribute the forces when the assembly bolts 480, 480b, and the spring ends 462a, 462b, 462c, 462d are secured tightly so as to inhibit warping of inner parts such as the casing end caps 450a, 450b.

Figure 12H:
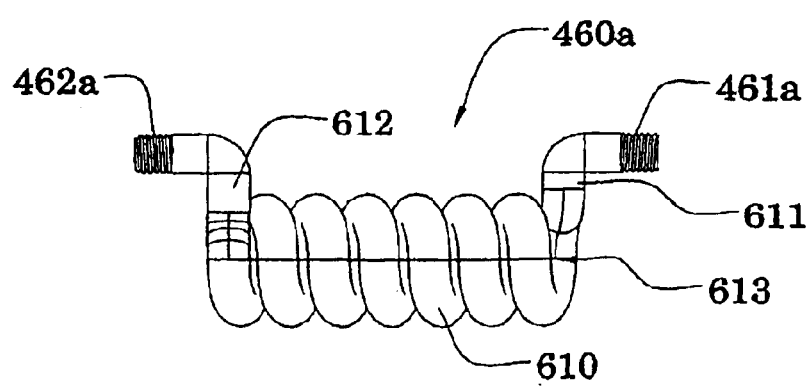
FIG. 12H illustrates one of the motion damper coil springs of the head assembly of FIG. 11.
Figure 12I:
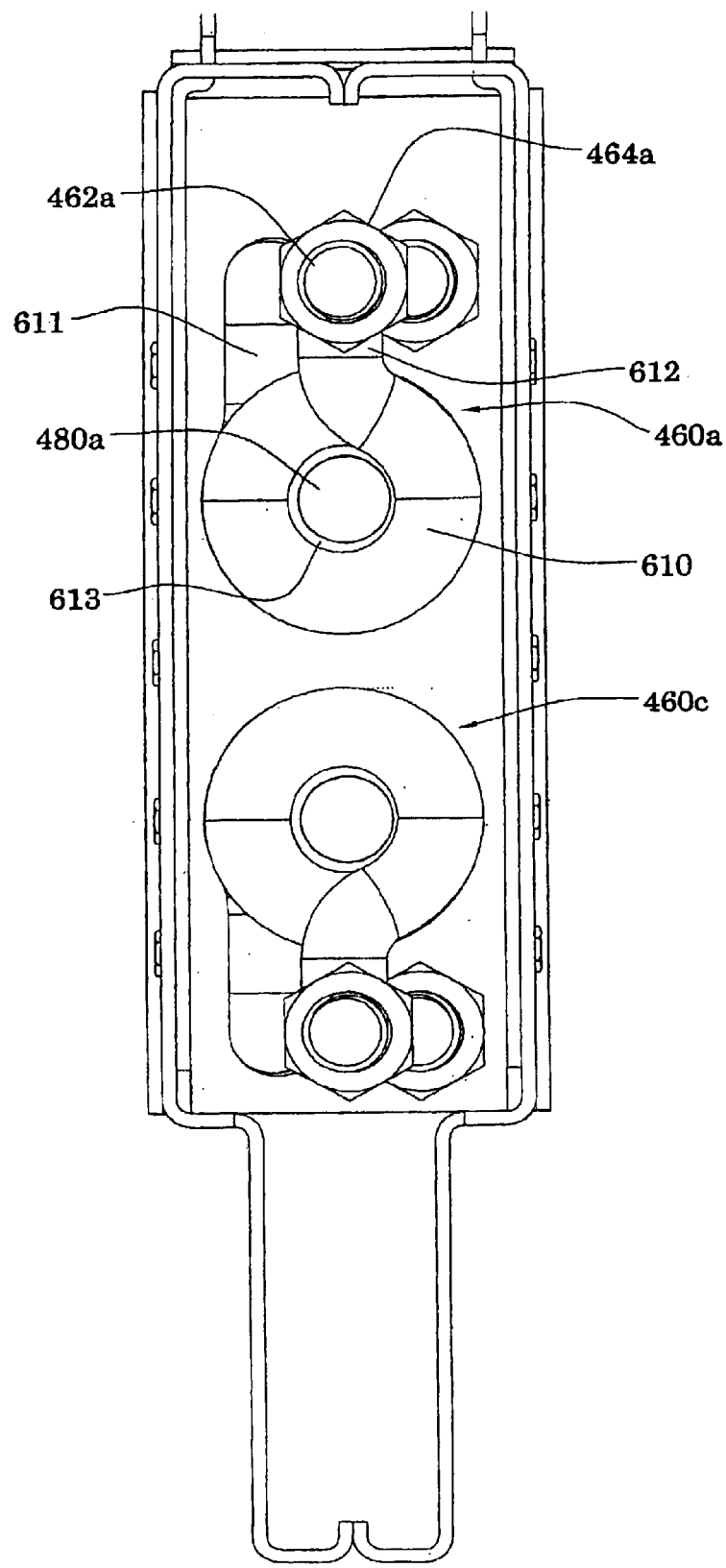
FIG. 12I is a side view of the head assembly of FIG. 11.

It will be appreciated that through a series of interconnections described above, the rail assembly 120 is attached to the second ends 462a, 462b, 462c, 462d of the coil springs 460a, 460b, 460c, 460d is a substantially rigid manner. Thus, the rail assembly 120 is coupled to the top plate 142 by the coil springs 460a, 460b, 460c, 460d. FIGS. 12H and 12I illustrate the coil spring 460a that exemplifies the four coil springs 460a, 460b, 460c, 460d. The coil spring 460a comprises a coil 610 that provides spring properties that are well known in the art. The coil 610 defines a hollow core 613 that extends along the axis of the coil 610. The hollow core 613 permits the assembly bolt 480a to pass therethrough so as to substantially maintain the axial orientation of the coil 610 during compression and extension of the coil 610.

The coil spring 460a further comprises a first extension 611 that extends from the coil end on the first side, generally away from the axis of the coil 610. Attached at the end of the first extension 611 is the first end 461a of the coil spring 460a referred to above. The first end 461a is attached to the first extension 611 such that the first end 461a extends in a direction substantially parallel to the axis of the coil 610. Furthermore, the first end 461a extends away from the second end 462a located at the opposite end of the coil spring 460a. The first end 461a is threaded to engage a nut (not shown in FIG. 11, but substantially similar to the nut 464a) so as to secure the first end 461a to the inner reinforcing plate 470.

Similarly, a second extension 612 extends from the coil end on the second side, generally away from the axis of the coil 610. Attached at the end of the second extension 612 is the second end 462a referred to above. The second end 462a is attached to the second extension 612 such that the second end 462a extends in a direction substantially parallel to the axis of the coil 610. Furthermore, the second end 462a extends away from the first end 461a located at the opposite end of the coil spring 460a. The second end 462a is threaded to engage the nut 464a so as to secure the second end 462a to the outer reinforcing plate 440a.

As evident in FIG. 11, the holes 441a on the outer reinforcing plate 440a is not coaxial with the hole 471a on the inner reinforcing plate 470. As such, the first end 461a is displaced azimuthally from the second end 462a with respect to the axis of the coil 610, as shown in FIG. 12I. This displacement of the first end 461a permits the first end 461b of the second spring 460b to share the same inner reinforcing plate 470.

In one embodiment, the coil spring 460a is formed from an approximately ¾" diameter spring steel. The coil 601 is approximately 6¾" long and wound such that the hollow core 613 has a diameter of approximately ⅞". The first extension 611 is approximately 1" long, and the first end 461a is approximately 1⁵⁄₁₆" long. The second extension 612 is approximately 1" long, and the second end 462a is approximately 1¹⁷⁄₆₄" long. It will be appreciated that the coil springs 460b, 460c, 460d have dimensions and properties substantially similar to the coil spring 460a.

In one embodiment, each of the assembly bolt 480a, 480b is a 17¾" long shoulder bolt with a ¾" threaded end. The nuts 482a, 482b are threaded accordingly to receive the threaded ends of the bolts 480a, 480b.

A manner in which the damper 400 is assembled is now described so as to achieve the desired dampening between the top plate 142 and the rail assembly 120. The description begins from the inside of the damper 400, namely the coil springs, in reference to FIG. 11.

In one method of assembly, the first coil spring 460a is attached to the inner reinforcing plate 470 by inserting the first end 461a through the hole 471a and securing the first end 461a on the second side 476 of the inner reinforcing plate 470 with a nut that is not shown in FIG. 11 but substantially similar to the nut 462a. The second coil spring 460b is attached to the inner reinforcing plate 470 by inserting the first end 461b through the hole 471b and securing the first end 461b on the first side 475 of the inner reinforcing plate 470 with a nut that is not shown but substantially similar to the nut 462a. The third coil spring 460c is attached to the inner reinforcing plate 470 by inserting the first end 461c through the hole 471c and securing the first end 461c on the second side 476 of the inner reinforcing plate 470 with a nut that is not shown but substantially similar to the nut 462a. The fourth spring 460d is attached to the inner reinforcing plate 470 by inserting the first end 461d through the hole 471d and securing the first end 461d on the first side 475 of the inner reinforcing plate 470 with a nut that is not shown but substantially similar to the nut 462a The slide actuator 420 is now attached to the inner reinforcing plate 470 by placing the holes 514 on the extension 429 adjacent the holes 473a on the first edge 477 of the inner reinforcing plate 470 such that the holes are substantially aligned. Screws 602 extend through the holes 514 and are secured to the threaded holes 473a so as to secure the extension 429 to the first edge 477 of the inner reinforcing plate 470. In a similar manner, holes 514 on the extension 428 are substantially aligned with the holes 473b (not shown) on the second edge 478. Screws 602 extend through the holes 514 and are secured to the threaded holes 473b so as to secure the extension 428 to the second edge 478 of the inner reinforcing plate 470.

The inner reinforcing plate 470, now with the four coil springs 460a, 460b, 460c, 460d and the slide actuator 420 attached, is covered partially with the damper casing sides 430a, 430b coming into engagement with each other. As shown in FIG. 12E, the bends 535, 536, 547 of the casing side 430a engages with the counterpart bends on the substantially similar casing side 430b such that the housing sides 432a and 432b partially encloses the four coil springs 460a, 460b, 460c, 460d, and the head rail sides 434a and 434b form a head rail.

The head rail sides 434a, 434b are attached to the first ends 211, 221, 231, 241 of the rails 201, 202, 203, 204 (FIG. 2). A bolt 250 extends through the holes 233a and 233b of the third rail 203, through the hole 435b of the casing side 430b (FIG. 11), through the hole 435a of the casing side 430a, and through the holes 213b and 213a of the first rail 201, and is secured by a nut 252. The hole 233a being larger than the hole 233b permits the head of the bolt 250 to be positioned within the third rail 203 in a manner described above in reference to other points of attachment on the rails. Similarly, the threaded end of the bolt 250 and the nut 252 are positioned within the first rail 201, facilitated by the hole 213a being larger than the hole 213b.

In a similar manner, another bolt 250 extends through the holes 234a, 234b of the third rail 203, through the hole 437b of the casing side 430b, through the hole 437a of the casing side 430a, through the holes 214b, 214a of the first rail 201, so as to be secured by another nut 252. Another bolt 250 extends through the holes 243a, 243b of the fourth rail 204, through the hole 436b of the casing side 430b, through the hole 436a of the casing side 430a, through the holes 223b, 223a of the second rail 202, so as to be secured by another nut 252. Another bolt 250 extends through the holes 244a, 244b of the fourth rail 204, through the hole 438b of the casing side 430b, through the hole 438a of the casing side 430a, through the holes 224b, 224a of the second rail, so as to be secured by another nut 252. Thus, the four rails 201, 202, 203, 204 are attached to the casing sides 430a, 430b in a substantially rigid manner.

The casing sides 430a, 430b, now partially enclosing part of the slide actuator 420, inner reinforcing plate 470, and the four coil springs 460a, 460b, 460c, 460c are capped at the ends by the casing end caps 450a and 450b. The end caps 450a is sized and positioned such that the recess 457 (FIG. 12G) receives a first end of the housing sides 432a, 432b of the casing sides 430a, 430b. The first and second sections 455, 456 are positioned outside the first end of the housing sides 432a, 432b such that the housing sides 432a, 432b are inhibited from separating. The top section 454 of the end cap 450a is position on top of the first sections 533 of the casing sides 430a, 430b. When the end cap 450a is positioned in such a manner, the second ends 462a, 462c of the coil springs 460a, 460c extend through the holes 58la, 582a.

Similarly, the end cap 450b receives a second end of the housing side's 432a, 432b of the casing sides 430a, 430b. The first and second sections 455, 456 are positioned outside the second end of the housing sides 432a, 432b such that the housing sides 432a, 432b are inhibited from separating. The top section 454 of the end cap 450b is positioned on top of the second sections 534 of the casing sides 430a, 430b. When the end cap 450b is positioned in such a manner, the second ends 462b, 462d of the coil springs 460b, 460d extend through the holes 581b, 582d (not shown).

To secure the end caps 450a and 450b to the casing sides 430a, 430b, and to the parts therein, the outer reinforcing plate 440a is positioned adjacent the outside of the end cap 450a such that the holes 441a, 443a, 444a, 442a of the outer reinforcing plate 440a is substantially aligned with the holes 581a, 583a, 584a, 582a of the end cap 450a. Similarly, the holes 441b, 443b, 444b, 442b of the outer reinforcing plate 440b are substantially aligned with the holes 581b, 583b, 584b, 582b (not shown). With such positioning of the outer reinforcing plates 440a, 440b, the second ends 462a, 462c further extends through the holes 441a, 442a of the outer reinforcing plate 440a so as to be secured with nuts 464a, 464c. Similarly, the second ends 462b, 462d further extend through the holes 441b, 442b of the outer reinforcing plate 440b so as to be secured with nuts 464b, 464d.

The outer reinforcing plates 440a, 440b are further interconnected by the assembly bolt 480a that extends through the hole 443b of the outer reinforcing plate 440b, through the hole 583b (not shown) of the end cap 450b, through the hollow core 613 (FIG. 12H) of the coil spring 460b, through the hole 472a of the inner reinforcing plate 470, through the hollow core 613 of the coil spring 460a, through the hole 583a of the end cap 450a, and through the hole 443a of the outer reinforcing plate 440a, so as to be secured by the nut 482a. Similarly, the assembly bolt 480b extends through the hole 444b of the outer reinforcing plate 440b, through the hole 584b (not shown) of the end cap 450b, through the hollow core 613 of the coil spring 460d, through the hole 472b of the inner reinforcing plate 470, through the hollow core 613 of the coil spring 460c, through the hole 584a of the end cap 450a, and through the hole 444a of the outer reinforcing plate 440a, so as to be secured by the nut 482b.

The casing sides 430a, 430b are now attached to the rail assembly 120 and to the second ends 462a, 462b, 462c, 462c of the coil springs 460a, 460b, 460c, 460d in a substantially rigid manner. The first ends 461a, 461b, 461c, 461d of the springs, along with the inner reinforcing plate 470 and the slide actuator 420, are permitted to move in a constrained range of motion relative to the casing sides 430a, 430b. The assembly bolts 480a, 480b extending through the hollow cores 613 of the coil springs 460b, 460a, and 460d, 460c, guides the compression and stretching of the springs along the direction of extension of the bolts 480a, 480b, which is defined to be the lateral direction in reference to the wall frame.

The slots 560 on the casing sides 430a, 430b also extend in the lateral direction. The slot width is sized such that the head of the screw 602 is permitted to slide laterally within the slot 560, so as to further guide the lateral motion of the inner reinforcing plate 470.

The inner reinforcing plate 470 interconnects the first ends 461a, 461b, 461c, 461d of the coil springs 460a, 460b, 460c, 460d to the slide actuator 420 in a manner described above. The extensions 428 and 429 of the slide actuator 420 are positioned within the casing sides 430a, 430b, by extending down through the slots 540 (FIG. 12E). The slots 540 also permits lateral motion of the slide actuator 420 with respect to the casing sides 430a, 430b.

As illustrated in FIG. 11, the second section 422 of the slide actuator 420 is attached to the second section 412 of the damper slide 410a. A plurality of screws 600 extend through the holes 415 (obscured on damper slide 410a in FIG. 11) on the section 412 so as to be secured to the holes 512 on the section 422 in a substantially rigid manner. In one embodiment, the holes 512 are threaded to receive the threaded ends of the screws 600.

The first section 411 of the damper slide 410a is attached to a first side of the top plate 142 by extending a plurality of screws or nails (not shown) through the holes 414 and into the top plate 142. In one embodiment, nails are used to secured the damper slide 410a to a wooden top plate. It will be appreciated that the damper slide 410a can also be secured to a metal equivalent of the wooden top plate such as the top plate 142 illustrated in FIG. 11. The damper slide 410b is attached to a second side of the top plate 142 in a similar manner. In one possible assembly sequence described below, the damper slide 410b is the last part to be assembled.

Once the damper slides 410a, 410b are secured to the top plate 142, the top plate 142 is interconnected to the first ends 461a, 461b, 461c, 461d of the coil springs 460a, 460b, 460c, 460d in a substantially rigid manner. This rigid interconnection is facilitated by the plurality of holes 414 distributed along the length of elongation of the damper slides 410a, 410b. Such distributed attachment points distribute the load forces so as to not subject particular area(s) with excessive forces. Similarly, the plurality of holes 415 help to distribute load forces between the damper slides 410a, 410b the slide actuator 420.

The coil springs 460a, 460b, 460c, 460d coupling the top plate 142 to the rail assembly 120 permit a limited lateral motion between the top plate 142 and the rail assembly 120 (and thus the foundation). The springs substantially restore the relative position between the top plate 120 and the foundation. Damper assembly further comprises dampening mechanisms that dampens the motion between the top plate 142 and the foundation. Substantial part of dampening is achieved by friction present in the damper 400.

One source of friction present in the damper 400 is between the edges 501, 502 of the slide actuator 420 and the top sections 454 (FIG. 12G) of the end caps 450a, 450b. Another source of friction is from contact between the assembly bolts 480a, 480b and the coil springs 460a, 460b, 460c, 460d.

FIG. 13 illustrates a partially cut-away view of the damper 400 coupling the top plate 142 to the rail assembly 120. In particular, FIG. 13 illustrates lateral motions of top and bottom portions of the wall, and how such motions are dampened. For the sake of subsequent description in reference to FIG. 13, it will be assumed that the foundation (and thus the rail assembly 120) is stationary, and a top portion of a building (and thus the top plate 142) moves as a result of an external force such as a strong wind. It will be appreciated that the A-frame shear assembly 100 functions in a similar manner if the motion is initiated at the foundation, such as in an earthquake.

If the top plate 142 is subjected to an external force that causes motion of the top plate in a first direction 621, the inner reinforcing plate 470 also moves in the first direction 621, since the inner reinforcing plate 470 is substantially rigidly interconnected to the top plate 142. As the inner reinforcing plate 470 moves in the first direction 621 so as to cause a first displacement, the springs 460a and 460c are compressed, and the springs 460b and 460d become stretched. The compressed springs 460a, 460c exert a restoring force on the inner reinforcing plate 470 that is directed in a second direction 622 that is substantially opposite of the first direction 621. The stretching springs 460b, 460d also exert a restoring force on the inner reinforcing plate 470 that is directed in the second direction 622.

If the first displacement of the inner reinforcing plate 470 in the first direction 621 is sufficiently large, the restoring motion in the second direction 622 may cause the inner reinforcing plate 470 to go past the original rest location so as to cause a second displacement. If such overshoot occurs, then the springs 460a, 460c are now stretched, and the springs 460b, 460d are now compressed, thus causing a restoring force in the first direction 621. It will be appreciated that the amplitude of the second displacement is smaller than the amplitude of the first displacement due to the dampening caused by frictions present in the damper 400, as described above. Similarly, the amplitude of the third displacement (if it exists) is smaller than the amplitude of the second displacement, and so on. It will be appreciated that for a lateral motion where the initial displacement is in the second direction 622, the subsequent motions will be substantially similar but in opposite directions as the sequence of motions described above.

The degree of dampening depends on the spring constant of the springs 460a, 460b, 460c, 460d, and the amount of friction present. FIG. 13 further illustrates one source of friction within the damper 400. A contact area 623 is where the edge 501 of the slide actuator 420 comes into engagement with the top section 454 of the casing end cap 450a. Similarly, a contact area 624 is where the edge 502 of the slide actuator 420 comes into engagement with the top section 454 of the casing end cap 450b. It will be appreciated that the damper 400 comprises other sources of frictions. For example, the assembly bolts 480a, 480b may come into contact with the inside of the springs 460a, 460b, 460c, 460d as the bolts 480a, 480b extend through the hollow cores.

FIG. 13 further illustrates a first leg 631 that comprises the third and fourth rails 203, 204, and a second leg 632 that comprises the first and second rails 201, 202. As is known in the art, the angled "A" orientation of the first and second legs 631, 632 provide structural strength during a static situation where the top plate 142 bears down on the A-frame shear assembly 100. In such a situation, both of the first and second legs 631, 632 are under compression.

If the top plate 142 is subjected to a shear force that causes a displacement in the first direction 621, part of that force is transmitted to the rail assembly 120, such that the first leg 631 experiences a compression force, while the second leg 632 experiences a tension force substantially simultaneously. The rail assembly 120, being substantially resistant to buckling in a manner described above, thus inhibits the shear force from displacing the top plate 142 excessively with respect to the foundation. In a similar manner, if the shear force causes a displacement in the second direction 622, part of that force is transmitted to the rail assembly 120, such that the first leg 631 experiences a tension force while the second leg 632 experiences a compression force so as to resist excessive displacement of the top plate 142 with respect to the foundation.

As described above in reference to FIGS. 4 to 13, various head assemblies can provide either substantially rigid coupling or ductile couplings between the top plate 142 and the rail assembly 120. With regards to the ductile couplings, again, these couplings can also be used in conjunction with shear panel designs, other than the A-frame shear panel as will be illustrated below without departing from the spirit of the present invention.

Also described above in reference to FIGS. 1 to 3 is a anchor assembly 130 that couples the rail assembly 120 to the foundation 150 in a substantially rigid manner. Alternate anchor assemblies are now described, wherein the coupling between the rail assembly 120 and the foundation 150 is ductile so as to provide limited ductility during uplifting and downward compression force situations.

Figure 14:
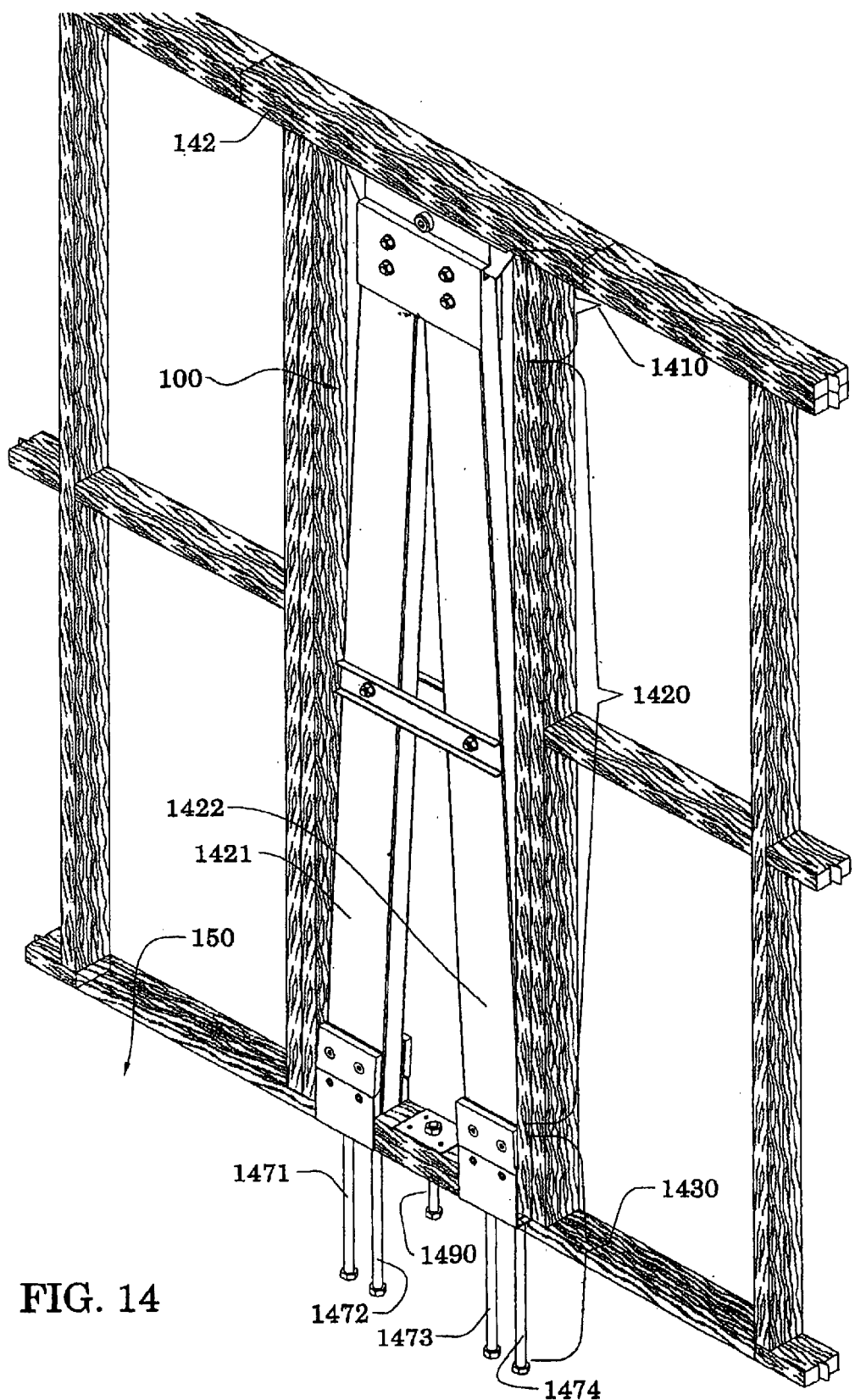
FIG. 14 illustrates a perspective view of another embodiment of the A-frame shear assembly that incorporates an anchor assembly that provides ductility.

FIG. 14 illustrates another embodiment of A-frame shear assembly 100 interposed between the top plate 142 and the foundation 150. The A-frame shear assembly 100 comprises a rail assembly 1420 interconnecting a head assembly 1410 and a anchor assembly 1430. The rail assembly 1420 comprises a first leg 1421 and a second leg 1422 arranged in a manner described above so as to generally form an "A" shape. Each of the first and second legs 1421, 1422 comprises a single elongated rail member with a hollow rectangular cross section, as opposed to two rails per leg in the rail assembly 120 described above in reference to FIGS. 1 to 13. It will be appreciated that the functionality of the rail assembly 1420 is similar to that of the rail assembly 120. The head assembly 1410 is adapted to couple the rail assembly 1420 to the top plate 142, in a manner described below, so as to facilitate ductile functionality of the anchor assembly 1430. It will be appreciated that use of the anchor assembly 1430 described below is not limited to the head assembly 1410, but can be used in conjunction with various damper head assemblies described above.

As illustrated in FIG. 14, one embodiment of the anchor assembly 1430 comprises hold down anchor bolts 1471, 1472, 1473, 1474 that are embedded in the foundation 150, with threaded end portions protruding upward (not shown in FIG. 14) from the foundation 150. The anchor assembly 1430 further comprises a partially embedded shear anchor bolt 1490 that secures shear plates in a manner described below to inhibit lateral movements of the lower portion of the rail assembly 1420 with respect to the foundation 150.

Figure 15:
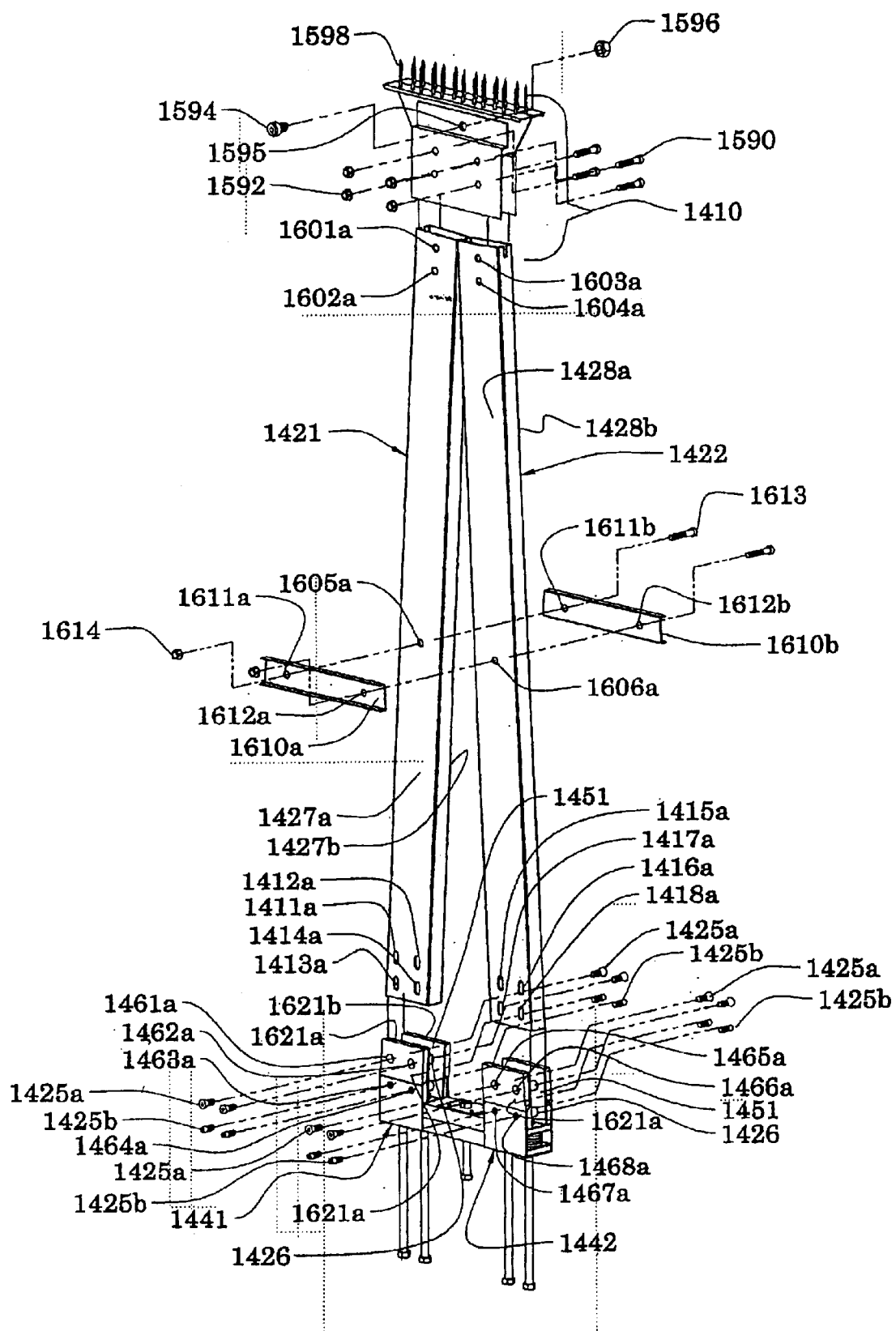
FIG. 15 is an exploded unassembled view of the A-frame shear assembly of FIG. 14, illustrating the attachment of the anchor assembly to the A-frame.

FIG. 15 illustrates a manner in which the first and second legs 142i, 1422 of the rail assembly 1420 are connected to the anchor assembly 1430 and the head assembly 1410. The first leg 1421 comprises a first side 1427a and a second side 1427b. The first side 1427a defines vertically oriented slots 1411a, 1412a, 1413a, 1414a located near the lower end of the first leg 1421. The second side 1427b defines slots 1411b, 1412b, 1413b, 1414b that are not shown but are substantially similar to and substantially aligned with the slots 1411a, 1412a, 1413a, 1414a.

Similarly, the second leg 1422 comprises a first side 1428a and a second side 1428b. The first side 1428a defines slots 1415a, 1416a, 1417a, 1418a located near the lower end of the second leg 1422. The second side 1428b defines slots 1415b, 1416b, 1417b, 1418b that are not shown but are substantially similar to and substantially aligned with the slots 1415a, 1416a, 1417a, 1418a.

The lower end of the first leg 1421 is positioned within a first space 1451 defined by an hold down bracket 1441 (which is described in greater detail below), and the lower end of the second leg 1422 is positioned within another first space 1451 of another hold down bracket 1442 that is substantially similar to the hold down bracket 1441. The hold down bracket 1441 defines holes 1454 (FIG. 16A) and 1455 (labeled as 1463a and 1464a in FIG. 15) that are adjacent to the slots 1411a, 1412a, 1413a, 1414a. The hold down bracket 1441 further defines substantially similar holes 1454, 1455 adjacent the second side 1427b of the first leg 1421, and adjacent to the slots 1411b, 1412b, 1413b, 1414b (not shown). Similarly, the hold down bracket 1442 defines holes 1454 and 1455 (labeled as 1467a and 1468a in FIG. 15) that are adjacent to the slots 1415a(b), 1416a(b), 1417a(b), 1418a(b).

The anchor assembly 1430 further comprises first and second reinforcing plates 1621a(b) and 1622a(b) that are described below in greater detail, and are positioned adjacent the hold down bracket 1441. As such, the first reinforcing plate 1621a located at the upper and outer portion of the hold down bracket 1441 defines holes 1461a and 1462a that substantially align with holes 1454 on the hold down bracket 1441. Similarly, on the second side 1427b of the first leg 1421, the first reinforcing plate 1641b defines holes 1461b and 1462b (not shown) that substantially align with second set of holes 1454 on the hold down bracket 1441. The second reinforcing plates 1622a and 1622b are positioned inside the hold down bracket 1441 in a manner described below, and each defines holes that substantially align with the holes 1455 (1463a(b) and 1464a(b) in FIG. 15). The first and second reinforcing plates 162la(b), 1622a(b) are arranged in a substantially similar manner with the second hold down bracket 1442.

A bolt 1425a extends through the hole 1461a of the first reinforcing plate 1621a, through the first hole 1454 on the hold down bracket 1441, and through another substantially aligned hole 1481 (FIG. 16A) defined by a spacer plate 1480a, through the slot 1411a on the first leg 1421, so as to be secured to a spacer nut 1426. Similarly, seven other bolts 1425a are attached to the four spacer nuts 1426 at the upper portions of the two hold down brackets 1441, 1442 from the two sides 1427a and 1427b.

A bolt 1425b extends through the hole 1463a (1455 in FIG. 16A) on the hold down bracket 1441, through the hole 1624 on the second reinforcing plate 1622a, through another substantially aligned hole 1481 (FIG. 16A) on the spacer plate 1480a, through the slot 1413a on the first leg 1421, so as to be secured to another spacer nut 1426. Similarly, seven other bolts 1425b are attached to the four spacer nuts 1426 at the lower portions of the two hold down brackets 1441, 1442 from the two sides 1427a and 1427b.

In one embodiment, the slots 1411a(b)–1418a(b) are sized to have a length of approximately 1⅜" and a width of approximately ⅝". The holes on the first and second reinforcing plates 1621a(b), 1622a(b), on the hold down brackets 1441, 1442, and spacer plates 1480a(b) are specified in greater detail below. The spacer nuts 1426 are also specified in greater detail below.

FIG. 15 further illustrates stiffeners 1610*a*, 1610*b* that interconnect middle portions of the first and second legs 1421 and 1422. Each of the stiffeners 1610*a*, 1610*b* is an elongate member that in cross section has a first and second sections interconnected by a base section so as to form a shape to resist buckling when compressed along its elongation direction. The base section defines holes 1611*a* and 1612*a* the are spaced and sized to be substantially aligned with holes 1605*a* and 1606*a* defined on the first sides of the first and second legs 1421, 1422 Similarly, the stiffener 1610*b* that is substantially similar to the stiffener 1610*a* defines holes 1611*b*, 1612*b* that substantially align with holes 1605*b*, 1606*b* (not shown) on the second sides of the first and second legs 1421, 1422. Bolts 1613 extend through the substantially aligned holes described above, and are secured by nuts 1614, so as to brace the middle portion of the rail assembly 1420.

FIG. 15 further illustrates a manner in which the top portions of the first and second legs 1421, 1422 are attached to one embodiment of the head assembly 1410. The head assembly 1410, described in greater detail below, defines four sets of holes arranged and sized to substantially align with four sets of holes 1601*a*(b), 1602*a*(b), 1603*a*(b), 1604*a*(b) on the first and second legs 1421, 1422, such that four bolts 1590 extend therethrough to be secured by four nuts 1592. Furthermore, the head assembly 1410 comprises an interconnection by a bolt 1594 and a nut 1596 described below to accommodate limited vertical ductility provided by the anchor assembly 1430. The head assembly 1410 attaches to the top plate 142 (FIG. 14) in a substantially rigid manner by a plurality of fasteners 1698.

Figure 16A:
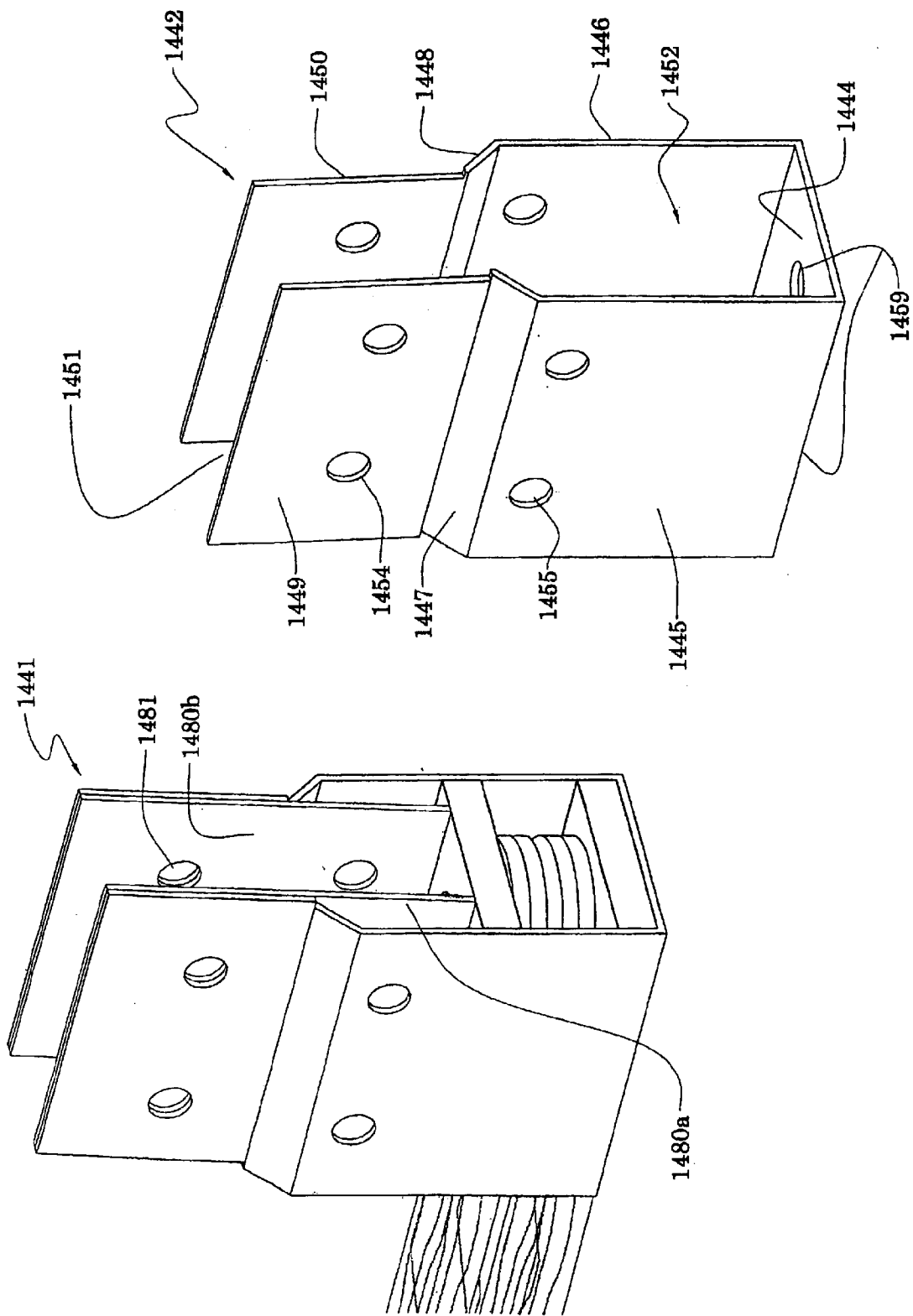
FIG. 16A is illustrates a hold down bracket of the anchor assembly of FIG. 15.

FIG. 16A illustrates the hold down brackets 1441 and 1442 that interconnect the rail assembly 1420 (FIG. 14) to the foundation 150. The first bracket 1441 is substantially similar to the second bracket 1442, and the description of the second bracket 1442 also applies to the first bracket 1441.

The bracket 1442 comprises a first section 1445 interconnected to a second section 1446 by a base section 1444. Planes defined by the first and second sections 1445, 1446 are substantially parallel to each other, and are substantially perpendicular to a plane defined by the base section 1444. As such, a cross section of the first, second, and base sections 1445, 1446, 1444 forms a "U," shape.

It will be understood that for the purpose of describing the bracket 14421, "inward" direction refers to a horizontal direction towards the middle of the "U" shaped cross section. The bracket 1442 further comprises a fifth section 1449 that is substantially parallel to the first section 1445, but displaced inward and upward. The fifth section 1449 is interconnected to the first section 1445 by a third section 1447 such that in cross section, the third section 1447 angles inward and upward. Similarly, the bracket 1442 further comprises a sixth section 1450 that is substantially parallel to the second section 1446, but displaced inward and upward. The sixth section 1450 is interconnected to the second section by a fourth section 1448 such that in cross section, the fourth section 1448 angles inward and upward. The bracket 1442 is substantially symmetric about a plane that is substantially parallel to and halfway between the first and second sections 1445, 1446, such that the assembly of first, third, and fifth sections 1445, 1447, 1449 is substantially symmetrical to the assembly of second, fourth, and sixth sections 1446, 1448, 1450.

The fifth and sixth sections 1449 and 1450 are separated by a first distance so as to define the first space 1451. The first and second sections 1445 and 1446 are separated by a second distance that is larger than the first distance. A second space 1452 is a rectangular box shaped space defined by the base, first, and second sections 1444, 1445, 1446, and below the third and fourth sections 1447, 1448. The second space 1452 is sized to receive compression plates and compression disks to be described below.

The fifth and sixth sections 1449, 1450 each define holes 1454. The first and second sections 1445, 1446 each define holes 1455. The holes 1454 and 1455 substantially align with the holes on the first and second reinforcing plates 1621*a*(b), 1622*a*(b) described in greater detail below. The base section 1444 of the bracket 1442 (and 1441) defines two holes 1459 that are arranged and sized to permit the hold down anchor bolts 1473, 1474 (and 1471, 1472) to pass through so as to be secured to the compression plate in a manner described below.

As seen in FIG. 16A, the spacer plate 1480*a* is positioned adjacent the fifth section 1449 on the inside of the hold down bracket 1441 (and thus the other hold down bracket 1442), The spacer plate 1480*b* that is substantially similar to the plate 1480*a* is positioned adjacent the sixth section 1450 on the inside of the hold down bracket 1441 (and 1442). Each of the rectangular shaped spacer plates 1480*a, b* defines holes that are arranged and sized to substantially align with the holes 1454, 1455 on the hold down brackets 1441, 1442. Furthermore, spacer plates 1480*a, b* are sized such that the length is substantially similar to the length of the fifth and sections 1449, 1450. The height of the spacer plates 1480*a, b* is selected such that their top edges substantially coincide with the top edges of the fifth and sixth sections 1449, 1450 when their bottom edges engage a compression plate described below.

In one embodiment, the hold down bracket 1442 is formed from an ⅛" thick steel plate. The base section 1444 has dimensions of approximately 5⅜"×3⅜'. Each of the first and second sections 1445, 1446 has dimensions of approximately 5⅜"×4¼". Each of the third and fourth sections 1447, 1448 has dimensions of approximately 5⅜"×¾". Each of the fifth and sixth sections 1449, 1450 has dimensions of approximately 5⅜"×3". The fifth and sixth sections 1449 and 1450 are separated by approximately 2" so as to define the inside width of the first space 1451. The second space 1452 is approximately 5⅜" long, 3⅛" wide, and 4¼" high. Each of the holes 1459 are sized to have a diameter of approximately ⅝". Each of the holes 1454, 1455 is sized to have a diameter of approximately ½". Each of the spacer plates 1480*a, b* is has dimensions of approximately 5⅜"× 5⅜".

Figure 16B:
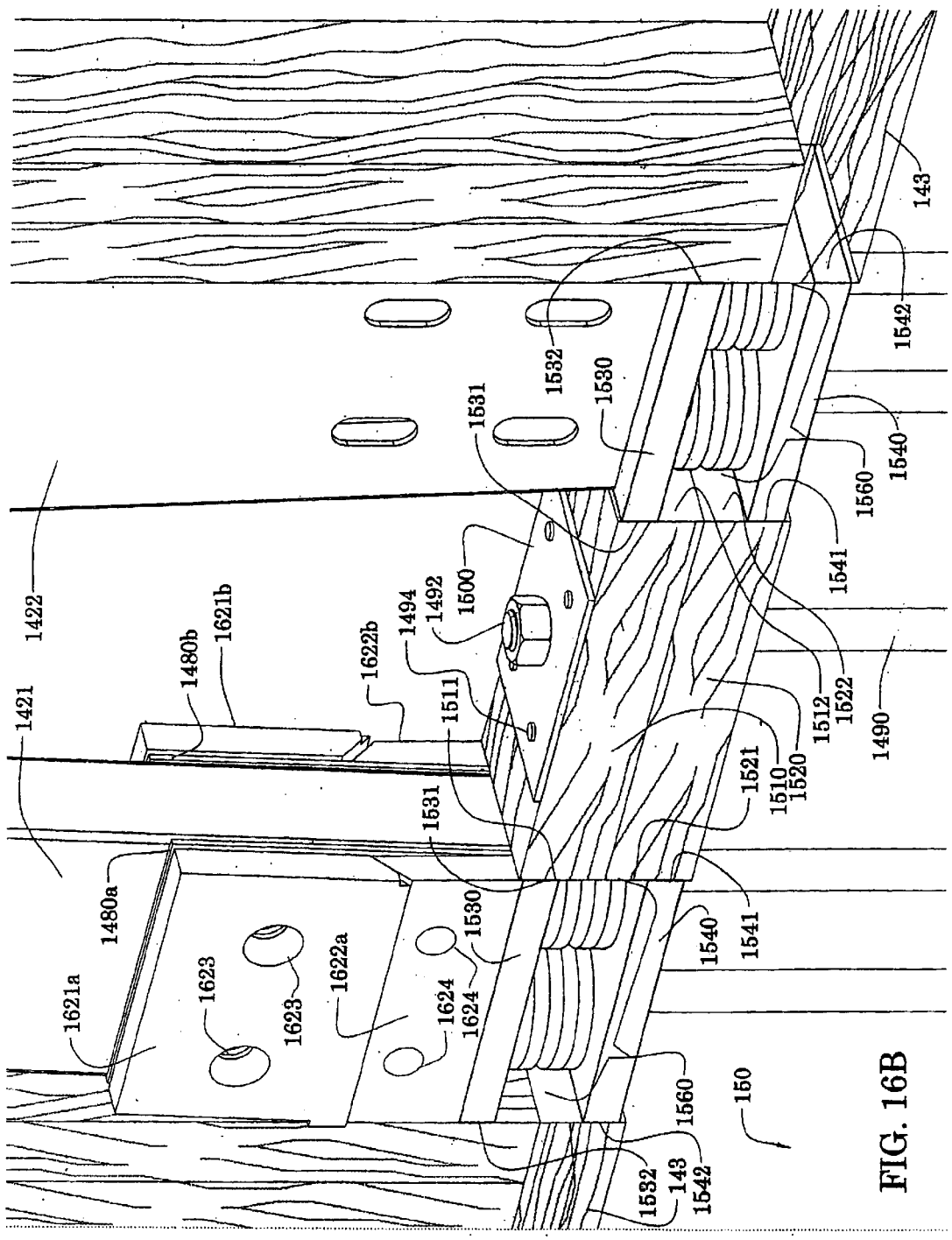
FIG. 16B illustrates compression disks interposed between the legs of the A-frame shear assembly and the foundation.

FIG. 16B illustrates a manner in which first and second shear plates 1510 and 1520 are interposed between the bottom portions of the first and second legs 1421, 1422, so as to resist lateral movement of the rail assembly 1420 (not shown) relative to the foundation 150. In one embodiment, each of the substantially similar first and second shear plates 1510, 1520 is a 2×4 lumber sized to fit lengthwise between the ductile assembly within the hold down brackets 1441, 1442 (not shown).

The first shear plate 1510 comprises a first end 1511 and a second end 1512, and similarly, the second shear plate 1520 comprises a first end 1521 and a second end 1522. The second shear plate 1520 is placed on the surface of the foundation 150, and the first shear plate 1510 is placed on top of the second shear plate 1520. The shear anchor bolt 1490 that is partially embedded in the foundation 150, extends upward through holes (not shown) defined by the first and second shear plates 1510, 1520, and through a hole (not shown) defined by a washer plate 1500, so as to be secured by a nut 1492. In one embodiment, the washer plate 1500 is a rectangular shaped steel plate whose width is substantially similar to the width of the first shear plate 1510. The washer plate 1500 further defines a plurality of nail holes (not shown) so as to permit the washer plate 1500 to be secured to the first and second shear plates 1510, 1520 by nails 1494.

When the first and second shear plates 1510, 1520 are secured in a manner described above, the first end 1511 of the first shear plate 1510 engages a first end 1531 of a first compression plate 1530, and the first end 1521 of the second shear plate 1520 engages a first end 1541 of the second compression plate 1540. Similarly, the second end 1512 of the first shear plate 1510 engages the first end 1531 of another first compression plate 1530, and the second end 1522 of the second shear plate 1520 engages the first end 1541 of another second compression plate 1540. Thus, the first ends 1511, 1521 of the shear plates 1510, 1520 inhibit the lower portion of the first leg 1421 and its anchoring parts from shifting towards the center. Similarly, the second ends 1512, 1522 of the shear plates 1510, 1520 inhibit the lower portion of the second leg 1422 and its anchoring parts from shifting towards the center. It will be appreciated that bottom plates 143 inhibit the lower portions of the first and second legs 1421, 1422 and their anchoring parts from shifting away from the center.

In one embodiment, each of the first and second shear plates 1510, 1520 is an approximately 8" long 2×4 lumber. The holes (not shown) that permit passage of the shear anchor bolt 1490 is sized to have a diameter of approximately ⅝". The washer plate is a rectangular shaped ⅛" thick steel plate with dimensions of approximately 4½"× 3½".

As shown in FIG. 16B, the first and second compression plates 1530 and 1540 located below either the first or second leg 1421, 1422 are positioned such that a spring assembly 1560 is interposed therebetween. The first and second compression plate's 1530, 1540 are substantially stiff rectangular shaped plates that compress the spring assembly 1560 when vertical loads are placed on the anchor assembly 1430. The first compression plate 1530 is substantially similar to the second compression plate 1540, and the description of the first compression plate 1530 below is also applicable to the second compression plate 1540.

FIG. 16B further illustrates positioning of the first and second reinforcing plates 1621*a*(b) and 1622*a*(b). The first reinforcing plate 1621*a* (substantially similar to 1621*b*) is a rectangular shaped plate that is sized to mount and conform to the outside of the fifth section 1449 and the outside of the third section 1447. Thus, the lower edge of the first reinforcing plate 1621*a* is beveled to match the angle defined by the third section 1447. The thickness of the first reinforcing plate 1621*a* is selected to be substantially similar to the amount of inward displacement of the fifth section 1449 from the first section, 1445. As such, when the first reinforcing plate 1621 is mounted on the hold down bracket 1441, the outer surface of the first reinforcing plate 1621 is substantially coplanar with the outer surface of the first section 1445. In a similar manner the first reinforcing plate 1621*b* is mounted on the outside of the sixth section 1450.

The second reinforcing plate 1622*a* (substantially similar to 1622*b*) is a rectangular shaped plate that is sized to mount and conform to the inside of the first section 1445 and the inside of the third section 1447. Thus, the upper edge of the second reinforcing plate 1622*a* is beveled to match the angle defined by the third section 1447. The thickness of the second reinforcing plate 1622*a* is substantially similar to that of the first reinforcing plate 1621*a* such that when mounted, the inner surface of the second reinforcing plate 1622*a* is substantially coplanar with the inner surface of the fifth section 1449. In a similar manner, the second reinforcing plate 1622*b* is mounted on the inside of the second section 1446.

The first reinforcing plate 162*la*(b) defines holes 1623 that are substantially aligned with the holes 1454 (FIG. 16A). In one embodiment, the holes 1623 are tapered to receive tapered-head bolts 1425*a* (FIG. 15) such that the heads fit substantially flush within the outside surface of the first reinforcing plate 1621*a*. The second reinforcing plate 1622*a* (b) defines holes 1624 that are substantially aligned with the holes 1455 (FIG. 16A). In one embodiment, the holes 1624 are countersunk such that the heads of the bolts 1425*b* (FIG. 15) extend through the holes 1455 to engage the second reinforcing plate 1622*a*(b), so as to provide a substantially flush outer surface on the first section 1455 of the hold down bracket 1441. The substantially flush outer surface thus formed permits finishing materials such as wall panels to be installed on the wall without interference from the anchor assembly 1430.

As described above, the first and second reinforcing plates 1621*a*(b) and 1622*a*(b) conform to the side sections of the hold down bracket 1441 (and 1442). As shown in FIG. 16B, the first leg 1421 is positioned between the spacer plates 1480*a*, 1480*b*, both of which are interposed between the sides of the hold down bracket 1421 that are reinforced with the reinforcing plates 1621*a*, 1622*a*, and 1621*b*, 1622*b*. Thus, when the reinforced sides are secured inward, the reinforcing plates inhibit the hold down bracket 1421 from deforming when pulled upward during an uplifting force situation.

Figure 16C:
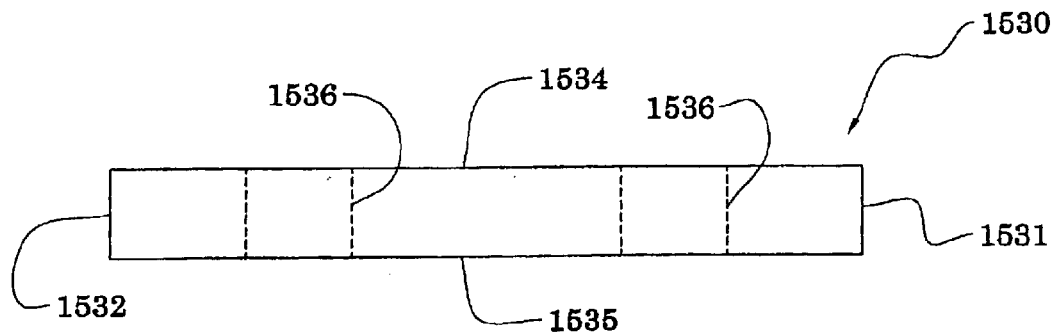
FIG. 16C illustrates a side view of a compression plate of the anchor assembly of FIG. 15.
Figure 16D:
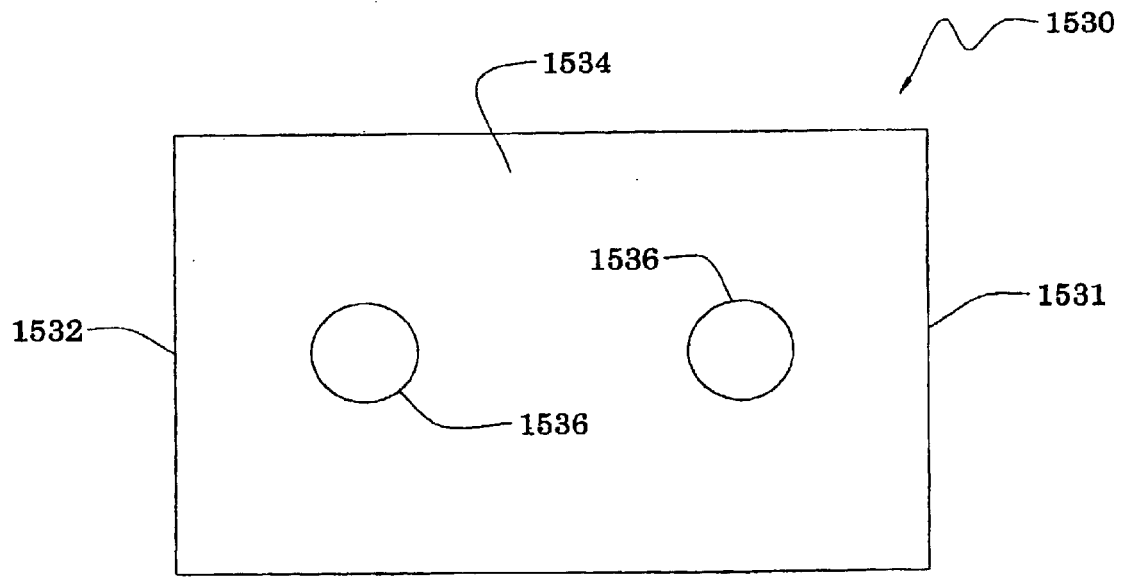
FIG. 16D illustrates a top view of the compression plate of FIG. 16C.

FIGS. 16C and 16D illustrate side and top views of the compression plate 1530 comprising the first and second ends 1531 and 1532 referred to above. The compression plate 1530 further comprises a top surface 1534 and a bottom surface 1535. The compression plate 1530 defines two holes 1536 that extend through the top and bottom surfaces 1534, 1535, and therebetween. In one embodiment, the compression plate 1530 is a ½" thick steel plate with dimensions of approximately 5⅜"×3⅛". The holes 1536 are sized to have a diameter of approximately ¾".

Figure 16E:
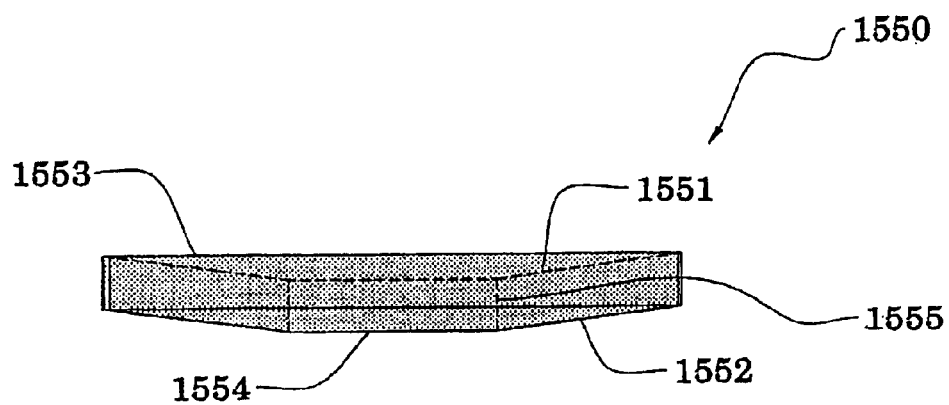
FIG. 16E is a side view of the compression disk of the anchor assembly of FIG. 15.
Figure 16F:
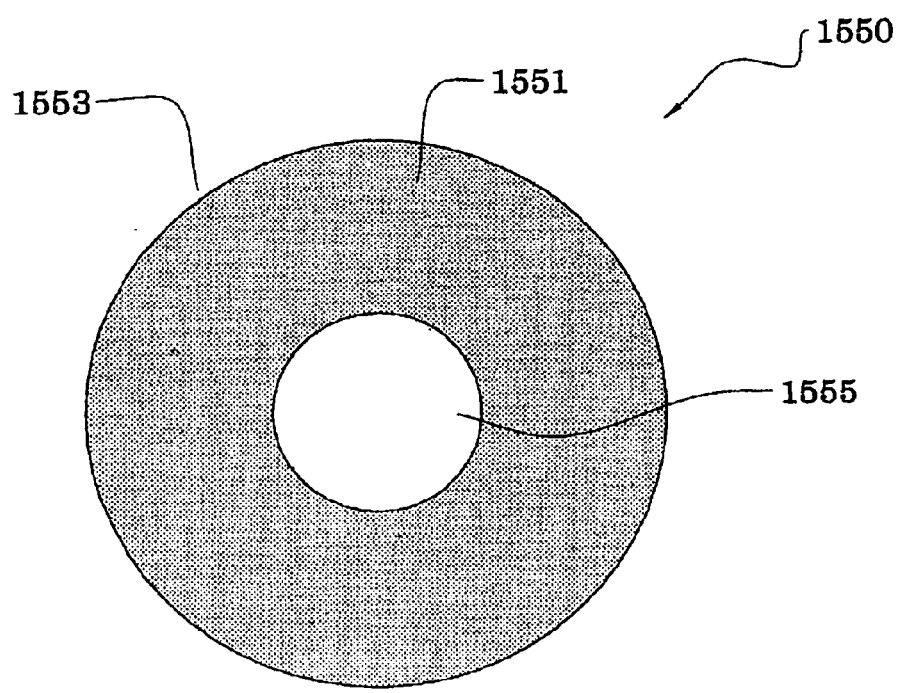
FIG. 16F illustrates a top view of the compression disk of FIG. 16E.

The spring assembly (1560 in FIG. 16B) comprises a plurality of compression disks 1550. FIGS. 16E and 16F illustrate an exemplary compression disk 1550. It will be appreciated that the spring assembly 1560 is not limited to the use of compression disks 1550. A suitably adapted coil spring(s), for example, can also be used in the spring assembly 1560.

As shown in FIGS. 16E and 16F, the compression disk 1550 comprises a first side 1551 and a second side 1552. The first side 1551 forms a concave surface and the second side 1552 forms a convex surface. The first side 1551 has a first edge 1553 that forms a substantially circular perimeter of the first side 1551. The disk 1550 also defines a hole 1555 located at the center of the disk 1550. The second side 1552 has a second edge 1554 that forms a substantially circular perimeter of the hole 1555. Thus, when the disk 1550 is oriented with the first side 1551 facing up, as in FIG. 16E, the first edge 1553 and the second edge 1554 form the highest and the lowest portions, respectively, of the disk 1550.

The spring action of the compression disk 1550 is achieved when the first edge 1553 and the second edge 1554 are compressed towards each other so as to make the compression disk 1550 flatter. The compression disk 1550 applies a reaction restoring force to restore its original shape. In one embodiment, a single compression disk 1550 can be positioned between the first and second compression plates 1530, 1540. In another embodiment, multiple compression disks 1550 can be arranged an positioned between the first and second compression plates 1530, 1540. In FIG. 16B, for example, two stacks of compression disks 1550 are used, wherein each stack comprises four compression disks 1550. When multiple compression disks 1550 are used in the same stack, the disks 1550 are oriented such that for adjacent disks, first edges 1553 are in contact with each other, or second edges 1554 are in contact with each other, so as to allow compression. The holes 1555 permits multiple disks 1550 to remain in a stack by extending a guide member such as the hold down anchor bolt 1471 (FIG. 14) through the holes 1550.

In one embodiment, the compression disk 1550 is formed from a spring grade ¼" thick steel. A circle defined by the first edge 1553 has a diameter of approximately 2¾", and a circle defined by the second edge 1554 has a diameter of approximately 1". The amount of concavity on the first side 1551 is such that the edge of the hole 1555 on the first side 1551 is approximately ⅛" deep from the first edge 1553.

Figure 16G:
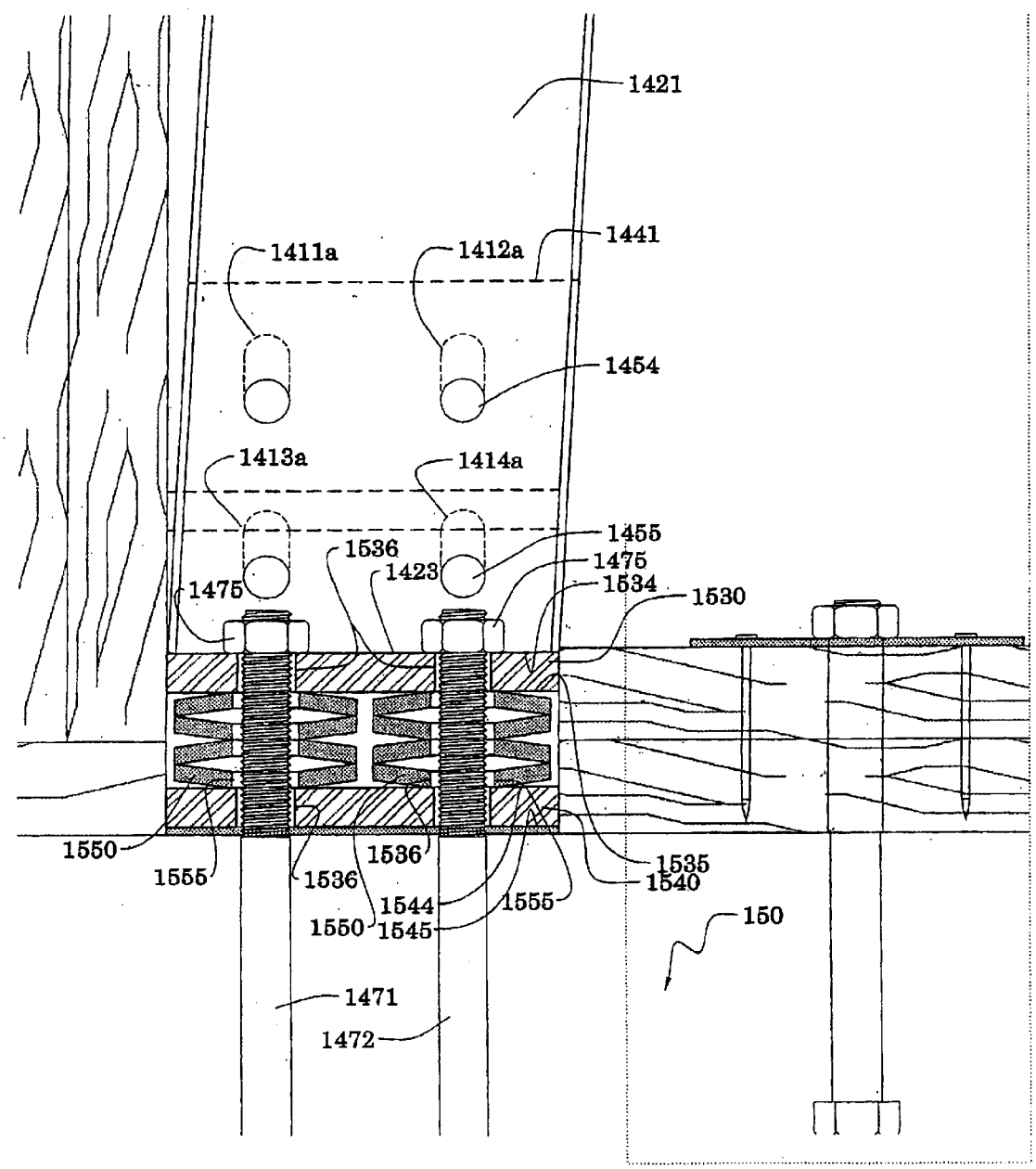
FIG. 16G illustrates a side sectional view of the anchor assembly of FIG. 15.
Figures 16H, 16I, 16J:
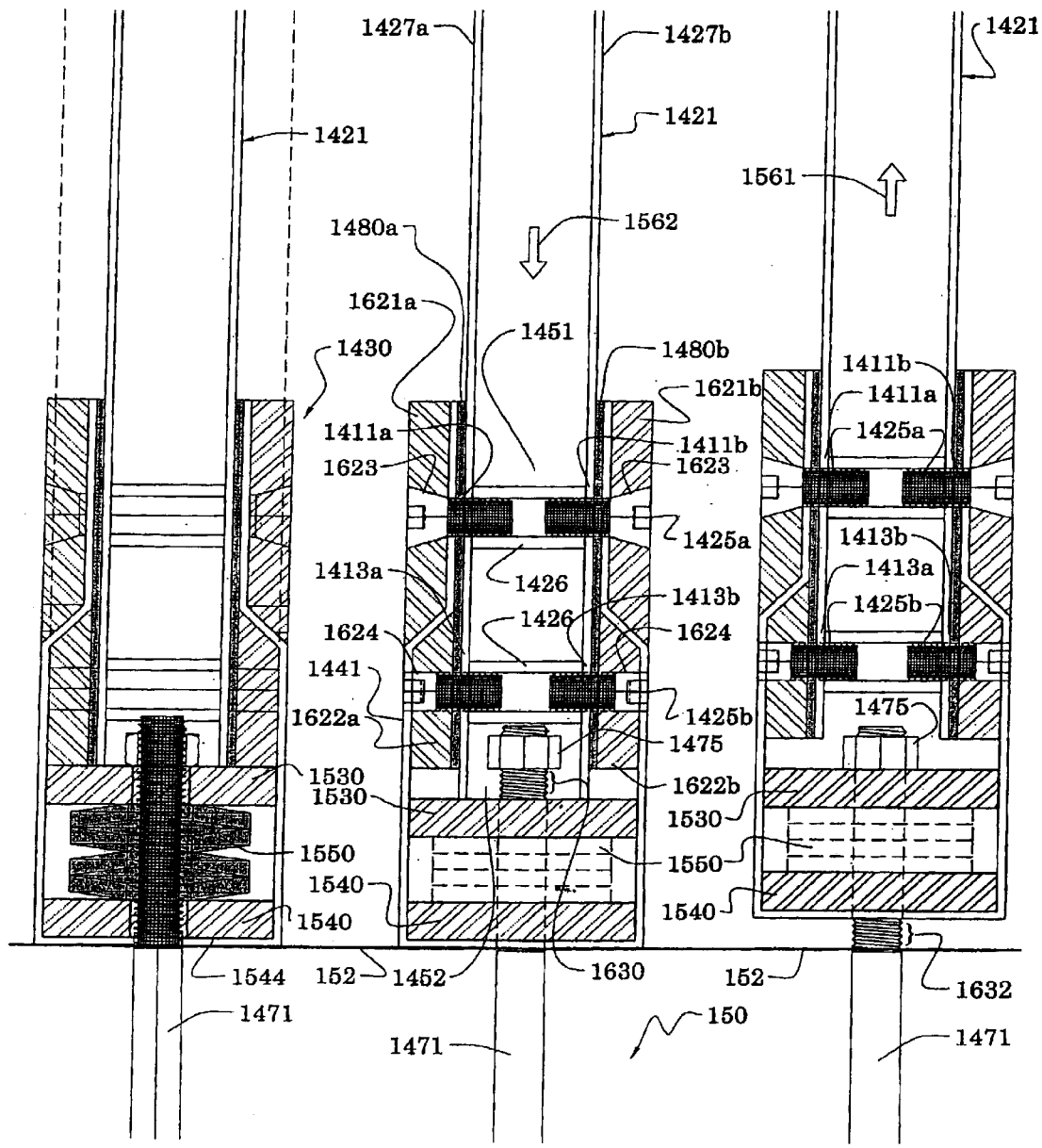
FIG. 16H illustrates an end sectional view of the anchor assembly of FIG. 15 when the compression disks are at rest.
FIG. 16I illustrates the anchor assembly of FIG. 16H when the compression disks are compressed due to a downward compression force applied on one of the legs of the A-frame.
FIG. 16J illustrates the anchor assembly of FIG. 16H when the compression disks are compressed due to an upward tension force applied on one of the legs of the A-frame.

FIGS. 16G and 16H illustrate a manner in which the compression disks 1550 provide ductility between the rail assembly 120 and the foundation 150. FIG. 16G is a partial cutaway view of the anchor assembly that illustrates two stacks of compressions disks 1550 that couple the two hold down anchor bolts 1471 and 1472 to the first leg 1421. The first and second compression plates 1530, 1540, with a plurality of compression disks 1550 interposed therebetween, are positioned in the second space 1452 (FIG. 16A) of the hold down bracket 1441 that sits on top of the foundation surface. The hold down bracket 1441 is positioned such that the first space 1451 and an upper portion of the second space 1452 receive the lower end of the first leg 1421.

The hold down bracket 1441 is attached to the first leg 1421 in a manner described above in reference to FIG. 15. In particular, the vertically oriented slots 1411*a*(b), 1412*a*(b), 1413*a*(b), 1414*a*(b) of the first leg 1421 are positioned such that their lower ends substantially coincide with the holes 1454 and 1455 (and other holes that are substantially aligned with them). The bolts 1425*a* and 1425*b* extend through the aligned holes and slots, such that when secured, the bolts 1425*a*, 1425*b* engage with the lower edge of the slots 1411*a*(b), 1412*a*(b), 1413*a*(b), 1414*a*(b) when the springs 1550 are their rest states. Thus, the first leg 1421 is inhibited from moving upwards relative to the anchor assembly 1430.

The vertical slots 1411*a*(b), 1412*a*(b), 1413*a*(b), 1414*a*(b), however, permit the first leg 1421*a* limited downward movement relative to the anchor assembly in situations where the first leg 1421 is under compression. Both the length of the slots and the amount of compression permitted by the spring stacks determine the amount of downward movement.

As shown in FIG. 16G, the embedded hold down anchor bolt 1471! extends from the foundation 150 through one of the holes 1459 (not shown) on the hold down bracket 1441, through one of the holes 1536 on the second compression plate 1540, through the holes 1555 on the compression disks 1550, and through one of the holes 1536 on the first compression plate 1530 so as to be secured by a nut 1475 in engagement with the top surface 1534. In one embodiment, as shown in FIG. 16G, four compression disks 1550 are stacked together such that the first disk is on top of the top surface 1544 of the second compression plate 1540. The first disk is oriented in a first orientation such that its convex side is facing downward. The second disk is oriented in a second orientation such that its concave side is facing downward. The third disk is oriented in the first orientation, and the fourth disk is oriented in the second orientation. As such, all four disks are able to be compressed in a vertical direction.

Similarly, the hold down anchor bolt 1472 extends through another stack of compression disks 1550 interposed between the first and second compression plates 1530, 1540 so as to be secured by a nut 1475. It will be appreciated that second leg 1422 (not shown) is interconnected to the hold down anchor bolts 1473 and 1474 in a substantially similar manner such that first and second legs 1421, 1422 provide substantially independent ductile couplings to the foundation 150.

FIGS. 16H to 16J illustrate side sectional views of the anchor assembly 1430, illustrating the assembly at rest, under compression, and under tension situations. FIG. 16I also illustrates a manner in which the bolts 1425*a* and 1425*b* extend inward and engage the spacer nuts 1426 so as to interconnect the anchor assembly 1430 to the first leg 1421 (and thus to the second leg 1422). In one embodiment, the spacer nut 1426 is sized to fit inside the hollow first leg 1421 such that its two threaded ends interconnect the first and second sides 1427*a*, 1427*b*. The threaded holes on the ends of the spacer 1426 are positioned adjacent the vertical slots 1411*a*, 1411*b*, 1413*a*, 1413*b* so as to permit receiving of the bolts 1425*a*, 1425*b* from both sides of the leg 1421.

Also illustrated in FIG. 16I is relative positioning of the first and second reinforcing plates 1621*a*(b), 1622*a*(b), the hold down bracket 1441, the spacer plates 1480*a*, 1480*b*, and the first leg 1421. Starting from the outside on the first side 1427*a*, adjacent the first space 1451 of the hold down bracket 1441 are the first reinforcing plate 1621*a*, the fifth section 1449 of the hold down bracket 1441, the upper portion of the spacer plate 1480*a*, and the first side 1427*a* of the leg 1421. Similarly, adjacent the upper portion of the second space 1452 are the upper portion of the first section 1445 of the hold down bracket 1441, the second reinforcing plate 1622*a*, the lower portion of the spacer plate 1480*a*, and the first side 1427*a* of the leg 1421. The second side 1427*b* of the leg 1421 has substantially similar parts as described above arranged in a substantially mirror image manner.

The lower portion of the second space 1452 is occupied by the first and second compression plates 1530, 1540 arranged horizontally, with the stacks of compression disks 1550 interposed therebetween. The top surface of the first compression plate 1530 is in engagement with the bottom edges of the second reinforcing plates 1622*a, b*, the bottom edges of the spacer plates 1480*a, b*, and the bottom end of the leg 1421. The nut 1475 that receives the hold down anchor bolt 1471 inhibits the first compression plate 1530 from moving upward beyond a selected height relative to the foundation 150. When the compression disks 150 are at a rest state as in FIG. 16H, the bottom end of the nut 1475 is at a substantially similar height as the bottom edge of the second reinforcing plates 1622*a, b*. The second reinforcing plate 1540 is positioned at the bottom of the second space 1452 so as to be in engagement with the base section 1444 of the hold down bracket 1441.

It will be appreciated that the sectional view of the anchor assembly 1430 depicts one of the two stacks of the compression disks 1550 that are positioned under the first leg 1421. Furthermore, the second leg 1422 is also interconnected to two stacks of substantially similar stacks of compression disks 1550.

FIG. 16H illustrates the anchor assembly 1430 when the leg 1421 is under a normal load condition, providing structural support to the wall frame. The normal load placed on the placed on the anchor assembly 1430 places the compression disks 1550 in their rest states, such that the first and second compression plates 1530 and 1540 are separated by a first distance.

FIG. 16I illustrates a situation where the leg 1421 experiences a downward compression force as depicted by an arrow 1562. In such a situation, the bottom end of the leg 1421 presses down on the first compression plate 1530. The second compression plate 1540 is in a substantially rigid engagement with the substantially fixed foundation 150, such that the compression disks 1550 are compressed. As a result, the first, and second compression plates 1530 and 1540 are now separated by a second distance that is less than the first distance in reference to FIG. 16H. Thus, the net vertical displacement 1630 of the leg 1421 is approximately equal to the difference in the first and second distances. It will be appreciated that the vertical slots 1411a(b), 1413a(b) on the leg 1421, positioned so as to extend upward from the axes of the bolts 1425a, 1425b, permit this limited downward movement of the leg 1421 relative to the hold down bracket 1441 and the foundation 150. When the leg reaches a point where further movement is not permitted by the anchor assembly 1430, the downward force 1562 is transferred to the foundation 150 through the anchor assembly 1430. It will be appreciated that removal of the downward force 1562 causes the leg 1421 to move back to a position that is similar to the rest position by the restoring force exerted by the compression disks 1550. The degree of restoration to the rest position depends partially on the elastic properties of the compression disks 1550.

FIG. 16J illustrates a situation where the leg experiences an upward tension force as depicted by an arrow 1561. In such a situation, the leg 1421 has a tendency to move upward. The vertical slots 1411a(b), 1413a(b), being positioned at rest such that their bottom ends are in engagement with the bolts 1425a, 1425b, transfers the upward force to the hold down bracket 1441. The first and second reinforcing plates 1621a(b), 1622a(b) inhibit deformation of the hold down bracket 1441 it is being pulled upward. Thus, the second compression plate 1540, in substantially rigid engagement with the hold down bracket 1441, is also pulled upward. The first compression plate 1530 is inhibited from upward movement beyond the bottom end of the nut 1475. Thus, the compression disks 1550 are compressed between the first and second compression plates 1530, 1540, so as to permit a limited upward displacement 1632. When the leg reaches a point where further movement is not permitted by the anchor assembly 1430, the upward force 1561 is transferred to the foundation 150 through the anchor assembly 1430. It will be appreciated that removal of the upward force 1561 causes the leg 1421 to move back to a position that is similar to the rest position, by the restoring force exerted by the compression disks 1550. The degree of restoration to the rest position depends partially on the elastic properties of the compression disks 1550.

The ductility provided by the anchor assembly 1430 described above, permit dissipation of portion of either the upward force 1561 or the downward force 1562. In certain external force situations, it is preferable to have limited ductility in structural design to reduce further damages to the structure. In the A-frame structure described above, the upward force 1561 can be realized by an uplifting force that generally attempts to move the upper portion of the wall upward. More likely, however, the upward force 1561 results when a shear force is applied laterally at the top portion of the wall such that simultaneously the second leg 1422 is under compression and the first leg 1421 is under tension. The downward force 1562 is realized when the shear force acts laterally on the top portion of the wall such that simultaneously the first leg 1421 is under compression and the second leg 1422 is under tension.

Thus, it will be appreciated that ductility is provided for both upward and downward forces 1561, 1562 in the interconnection of the first leg 1421 to the foundation 150. Ductility is also provided in the interconnection of the second leg 1422 to the foundation 150 in a manner similar to the first leg 1421. It will be appreciated that when a shear force is applied on the top portion of the wall, the upward force is transferred to one of the legs while the downward force is transferred to the other leg simultaneously.

Figure 17A:
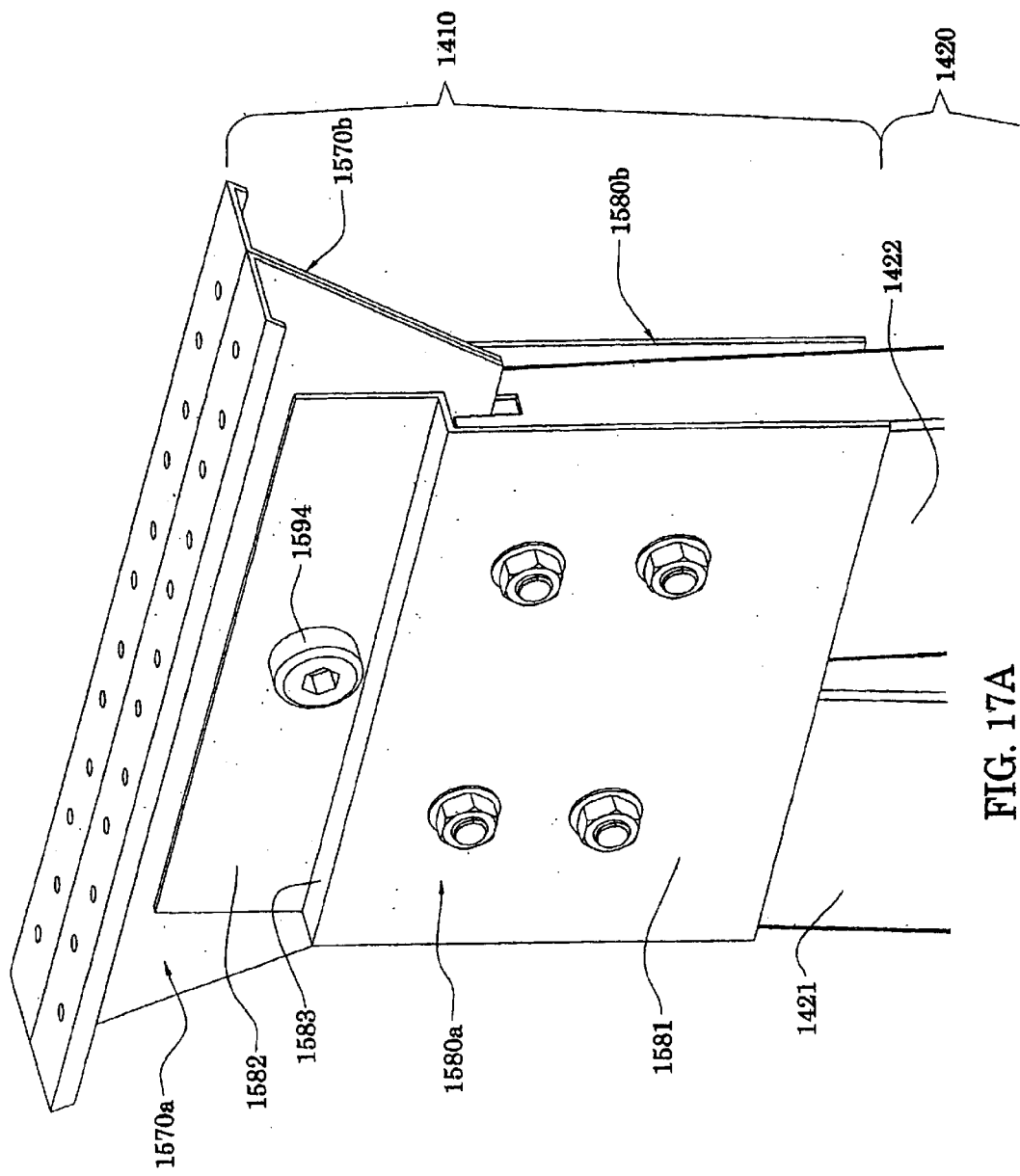
FIG. 17A illustrates a perspective view of a head assembly of the A-frame shear assembly of FIG. 14, wherein the head assembly is adapted to permit limited motion of the anchor assembly of FIG. 15.
Figure 17B:
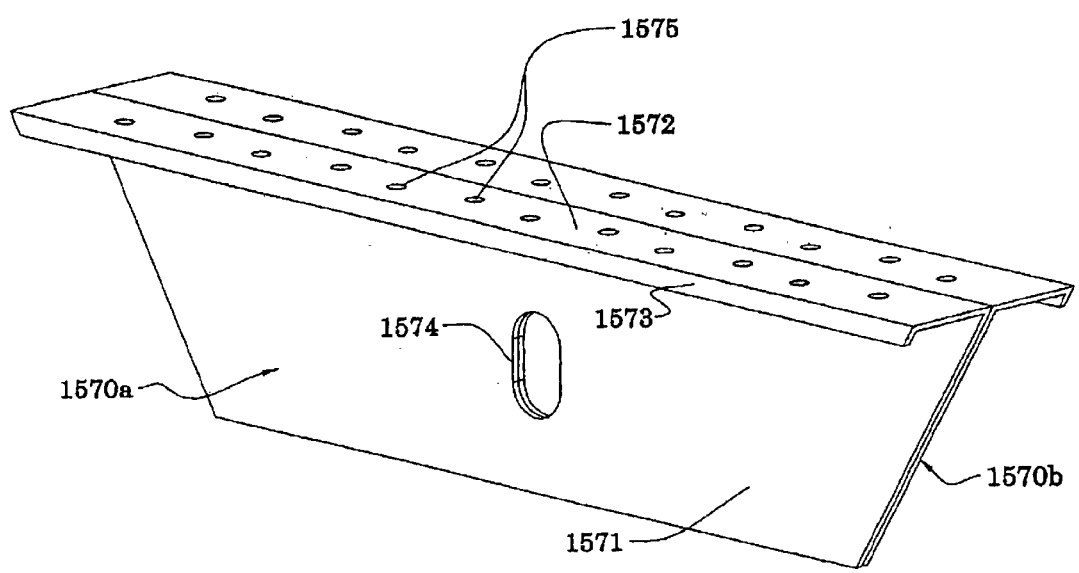
FIG. 17B illustrates shear transfer plates of the head assembly of FIG. 17A.

FIGS. 17A and 17B illustrate one embodiment of the head assembly 1410 that is adapted to facilitate the limited vertical movement of the first and second legs 1421, 1422 as described above. The head assembly 1410 comprises first and second shear transfer plates 1570a and 1570b that are interposed between the rail assembly 1420 and the top plate 142 (not shown). The shear transfer plates 1570a, 1570b are interconnected to the first and second legs 1421, 1422 by first and second connecting plates 1580a and 1580b in a manner described above in reference to FIG. 15.

As seen in FIG. 173, the first shear transfer plate 1570a is substantially similar to the second shear transfer plate 1570b. Thus, the description of the first shear transfer plate 1570a also applies to the second transfer plate 1570b. The shear transfer plate 1570a comprises a trapezoid shaped first section 1571 that is substantially flat and defines a vertical slot 1574 located approximately at middle. The first section 1571 attaches to the connecting plate 1580a. The shear transfer plate 1570a is oriented vertically such that the longer of the two bases of the trapezoid is located on top.

The shear transfer plate 1570a further comprises a rectangular shaped second section 1572 that extends from the longer base of the first section 1571. A plane defined by the second section 1572 is substantially perpendicular to a plane defined by the first section 1571. The length of the second section 1572 is substantially similar to the length of the longer (upper) base of the first section 1571. The second section 1572 defines a plurality of holes 1575 that permit fasteners 1598 (FIG. 15) to extend therethrough so as to attach the second section 1572 to the top plate 142 (not shown).

The shear transfer plate 1570a further comprises a trapezoid shaped third section 1573 that extends downward from the end of the second section 1572 such that a plane defined by the third section 1573 is substantially perpendicular to the second section 1572 and substantially parallel to the first section 1571. The third section 1573 is oriented such that its longer of the two bases is located on top and substantially coincides with the long edge of the second section 1572. The height of the third section 1573 is substantially less than that of the first section 1571. The two right angles formed by the first, second, and third sections 1571, 1572, 1573 provide strength to the shear transfer plate 1570a to resist buckling and deformation when subjected to forces along its length. Thus, when the top plate 142 moves laterally in response to a shear force, the shear transfer plate 1570a transfers the shear force to the legs 1421, 1422 via the connecting plate 1580a.

In a similar manner, the shear transfer plate 1570b transfers the shear force to the legs via the connecting plate 1580b. The shear transfer plates 1570a and 1570b are attached to each other at the first sections 1571, such that in cross section, the assembly of plates 1570a and 1570b is shaped similar to a letter "T".

In one embodiment, each of the shear transfer plates 1570a, 1570b is formed from an ⅛" thick steel plate. The trapezoidal shaped first section 1571 is approximately 5" high, and has bases that are approximately 16" and 12" at top and bottom. The slot 1574 is approximately 1½" long and approximately 1" wide. The rectangular shaped second section 1572 has dimensions of approximately 16×1½". The holes 1575 are sized to have a diameter of approximately ¼". The trapezoidal shaped third section is approximately ⅜" high, and has bases that are approximately 16" and 15¼" at top and bottom.

As seen in FIG. 17A, the connecting plate 1580a comprises a rectangular shaped first section 1581 interconnected to a rectangular shaped second section 1582 by a rectangular shaped interconnecting section 1583. The connecting plate 1580a is oriented such that in cross section, the first section 1581 is substantially vertical, and the interconnecting section 1583 extends in a direction that is substantially perpendicular to the first section 1581. The second section 1582 extends upward from the end of the interconnecting section 1583 so as to be substantially perpendicular to the interconnecting section 1583 and substantially parallel to the first section 1581.

The two substantially right angles thus formed provide the connecting plate 1580a the strength to resist buckling when subjected to lateral forces. The first section 1581 attaches to the first and second legs 1421, 1422 substantially rigidly in a manner described above in reference to FIG. 15. The second section 1582 attaches to the first section 1571 of the shear transfer plate 1570a by the bolt 1594 extending through a hole 1595 (FIG. 15) and the slot 1574 on the shear transfer plate 1570a, so as to be secured by a nut 1596. The slot 1574 is oriented vertically such that lateral forces from the shear transfer plates 1570a, 1570b are transferred to the first and second legs 1421, 1422. The slot 1574 also accommodates limited vertical movements of the first and second legs 1421, 1422. The single bolt 1594 that interconnects the shear transfer plates 1570a, 1570b to the connecting plates 1580a, 1580b also permits a limited pivoting when the first and second legs 1421, 1422 undergo limited vertical movements.

The connecting plate 1580b located on the second side of the legs 1421, 1422 is substantially similar to the connecting plate 1580a described above. In one embodiment, the connecting plate 1580a is formed from an ⅛" thick steel plate. The first section 1581 has dimensions of approximately 10½"×6¼". The four holes defined by the first section 1581 are sized to have a diameter of approximately ⅝". The interconnecting section 1583 has dimensions of approximately 10½"×¾". The second section 1582 has dimensions of approximately 10½"×3". The hole 1595 is sized to have a diameter of approximately 1".

Figure 18:
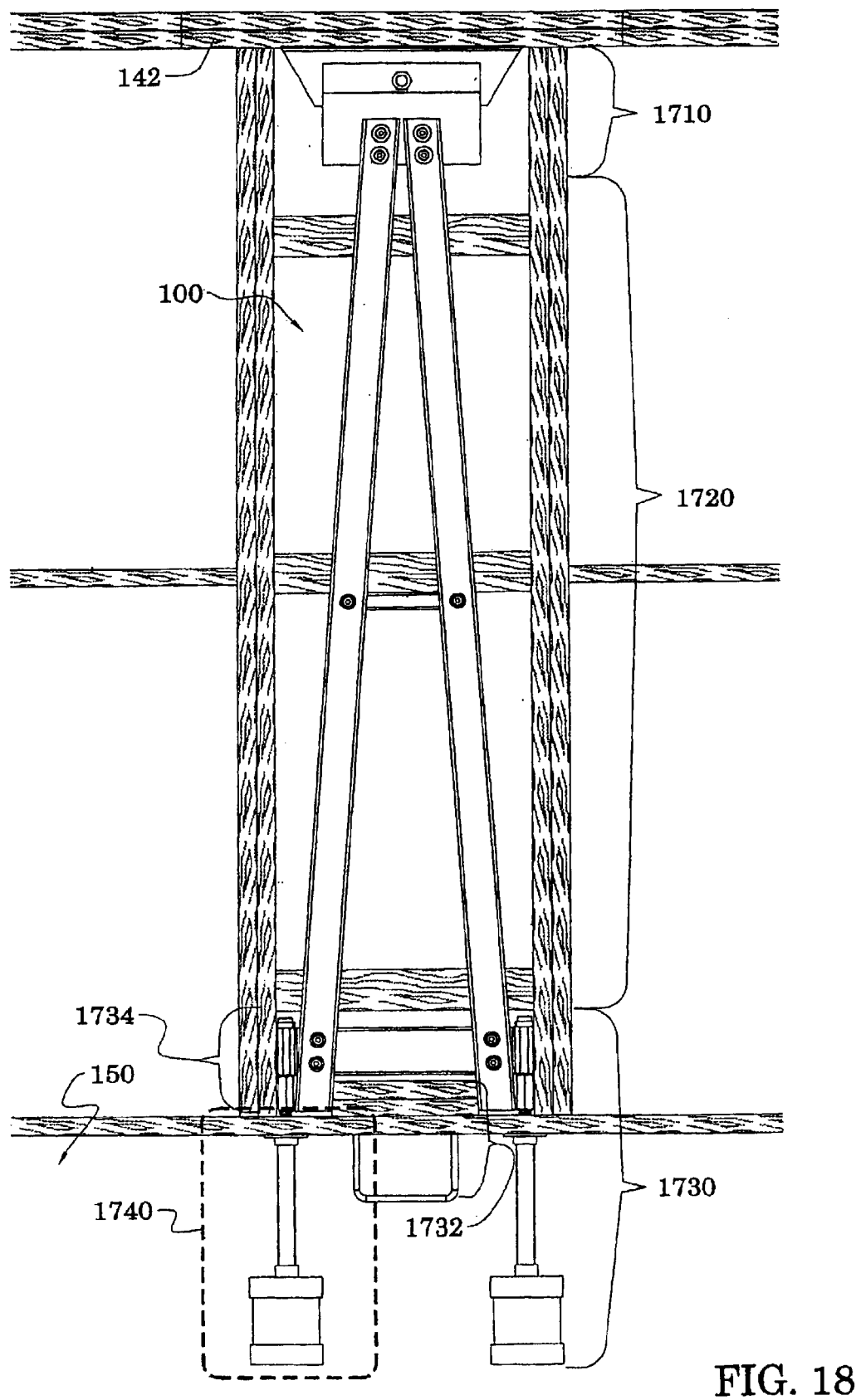
FIG. 18 illustrates another embodiment of the A-frame shear assembly anchor assembly with spring members cast within the foundation.
Figure 19:
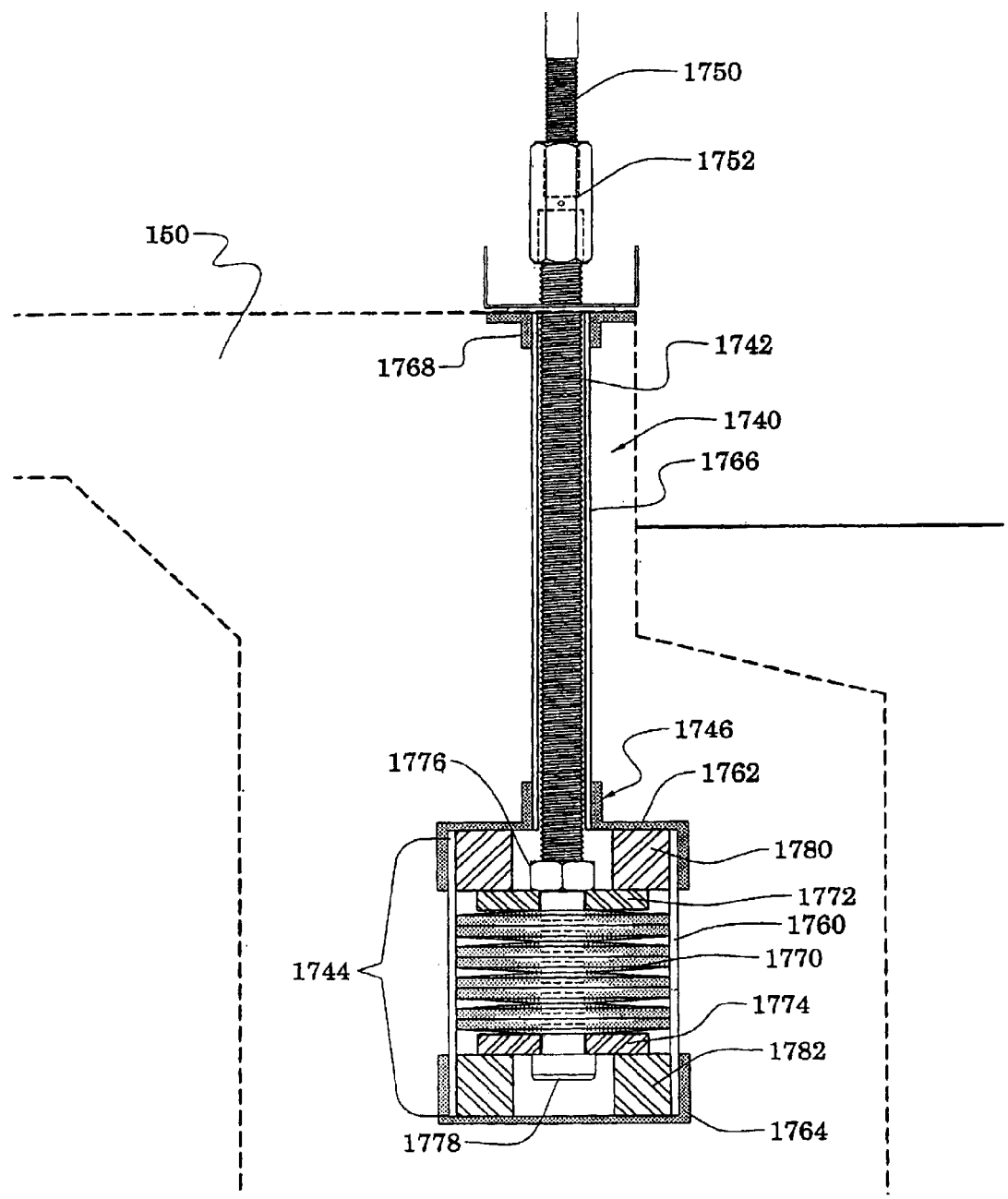
FIG. 19 illustrates a sectional view of the ductile anchor assembly of FIG. 18.

FIGS. 18 and 19 illustrate another embodiment of the A-frame shear assembly 100 interconnecting the top plate 142 to the foundation 150, wherein the anchor assembly 1730 comprises a ductile hold down anchors 1740 that interconnect the bottom portion of the rail assembly 1720 to the foundation 150. The A-frame shear assembly further comprises a rail assembly 1720 that is similar to the rail assembly 120 described above in reference to FIGS. 1 and 2. The rail assembly 1720 is interconnected to the top plate 142 by a head assembly 1710 that is similar to the head assembly 1410 described above in reference to FIGS. 15, 17A, and 17B. In particular, the head assembly 1710 accommodates the limited vertical movements, described below, of the two legs in the rail assembly 1720. The head assembly 1710 can be adapted to interconnect to the two-rail legs (as opposed to one-rail legs for the head assembly 1410) by one of ordinary skill in the art.

The anchor assembly 1730 further comprises a shear anchor assembly 1732 which is similar to that of the anchor assembly 130 described above in reference to FIGS. 2 and 3E–H. Also, the anchor assembly 1730 comprises an above-foundation anchor assembly 1734 which is similar to that of the anchor assembly 130 described above in reference to FIGS. 2, 3D, and 3I–L.

The anchor assembly 1730 comprises the ductile hold down anchors 1740 that replace the first and second sections 341, 342 of the U-shaped hold down anchor bolt 340 described above in reference to FIG. 2. As will be described below, this feature permits the ductile hold down anchors 1740 to be used in conjunction with many other wall strengthening devices that anchor to embedded anchor bolts, with little or no modifications.

FIG. 19 illustrates one embodiment of the ductile hold down anchor 1740 that comprises an anchor bolt 1742 interconnected to a spring assembly 1744. The ductile hold down anchor 1740 further comprises a housing 1746 that houses the spring assembly 1744 and a portion of the anchor bolt 1742. The housing 1746 and parts therein are assembled at a factory and cast into the foundation 150 so as to become a substantially permanent fixture. The top portion of the anchor bolt 1742 protrudes above the foundation surface so as to be coupled to a hold down bolt 1750 by a coupling nut 1752 that may be part of a variety of embodiments of the above-foundation anchor assembly.

As shown in FIG. 19, the spring assembly 1744 comprises a plurality of compression disks 1770 arranged in a stack, interposed between a first compression plate 1772 and a second compression plate 1774. Each of the compression disks 1770 is a curved circular disk with first and second sides that defines a hole in the middle, and is a larger version of the compression disk 1550 described above in reference to FIGS. 16E and 16F. In one embodiment, the compression disk 1770 is formed from a ¼" thick spring steel to have an outer diameter of approximately 5", and an inner diameter of approximately 1". The degree of concavity on its first side is such that the outer edge is approximately ⅛" higher than the inner edge when the first side is facing upward. In the embodiment illustrated in FIG. 19, the spring assembly 1744 has eight compression disks 1770 arranged such that first sides engage with first sides and second sides engage with second sides.

The stack of compression disks 1770 is interposed between the first and second compression plates 1772, 1774 that are positioned on top and bottom of the stack. Each of the substantially similar first and second compression plates 1772, 1774 is a substantially flat circular plate that defines a hole at the center sized to permit the anchor bolt 1742 to pass through. The first and second compression plates 1772, 1774 engage the top and bottom of the stack of compression disks 1770, and compress the stack when an external force urges one of the compression plate towards the other. In one embodiment, each of the compression plates 1772, 1774 is a ½" thick steel plate with an outer diameter of approximately 4½", and an inner diameter of approximately 1".

As shown in FIG. 19, the anchor bolt 1742 extends upward through the hole defined by the second compression plate 1774, through the holes defined by the compression disks 1770, and through the hole defined by the first compression plate 1772. The head 1778 of the anchor bolt 1742 engages the bottom surface of the second compression plate 1774, and a nut 1776 that receives the anchor bolt 1742 engages the top surface of the first compression plate 1772. As such, the bolt's head 1778 and the nut 1776 limit the separation distance between the first and second compression plates 1772, 1774, and permits the stack therebetween to be compressed in either downward or upward force in a manner described below. The anchor bolt 1742 extends substantially beyond the nut 1776, as shown in FIG. 19.

The spring assembly 1744 further comprises first reinforcing plate 1780 located above the first compression plate 1772, and a substantially similar second reinforcing plate 1782 located below the second compression plate 1774. Each of the first and second reinforcing plates 1780, 1782 is a circular shaped disk that defines a hole at the center sized to permit the bolt's head 1778 or the nut 1776 to be positioned therein. The first reinforcing plate 1780 is interposed between the first compression plate 1772 and a first cap 1762 (described below) of the housing 1746, and acts as an upward load bearing member when the first compression plate 1772 is pushes upward (via the compression disk stack) due to an uplifting force on the anchor bolt 1742. The second reinforcing plate 1782 is interposed between the second compression plate 1774 and a second cap 1764 (described below) of the housing 1746, and acts as a downward load bearing member when the second compression plate 1774 is pushes downward (via the compression disk stack) due to a compression force on the anchor bolt 1742. In one embodiment, each of the first and second reinforcing plate 1780, 1782 is formed from an approximately 1½" thick steel plate, and has an outer diameter of approximately 5" and an inner diameter of approximately 2½".

FIG. 19 further illustrates the housing 1746 that houses the spring assembly 1744 and the anchor bolt 1742. The housing 1746 comprises a hollow cylinder 1760 interconnected to a sleeve 1766. The cylinder 1760 houses the spring assembly 1744 and the lower portion of the anchor bolt 1742, and the sleeve 1766 houses the upper portion of the anchor bolt 1742. The sleeve 1766, which is also a hollow cylinder, is positioned above the cylinder 1760 such that the bottom of the sleeve 1766 substantially coincides with the top of the cylinder 1760. Furthermore, the sleeve 1766 and the cylinder 1760 are arranged so as to be substantially co-axial, with the common axis extending along the axis of the anchor bolt 1742. The sleeve 1766 permits the anchor bolt 1742 move vertically relative to the foundation 150. The cylinder 1760 permits the spring assembly 1744 and the lower portion of the anchor bolt 1742 therein to move vertically relative to the foundation.

The sleeve 1766 is interconnected to the cylinder 1760 by the first cap 1762 that comprises a circular base with a first circular wall extending in a first direction from the outer perimeter of the base. Thus, the first circular wall and the base defines a cylindrical shaped first recess that is sized to receive the top portion of the cylinder 1760. The circular base further defines a circular shaped opening, from which a second circular second direction that is substantially opposite from the first direction. Thus, lar wall defines a second recess that is sized to receive the bottom end of the sleeve 1766.

The bottom of the cylinder 1760 is capped by the second cap 1764 that comprises a circular shaped base with a circular wall extending from the outer perimeter of the base. Thus, the circular wall and the base defines a cylindrical shaped recess that is sized to receive the bottom portion of the cylinder 1760.

The housing 1746 further comprises a flange 1768 that interconnects the top of the sleeve 1766 to the foundation's surface. The flange 1768 comprises a circular base section with first and second sides that defines a circular hole in the center. Extending from the hole's edge on the first side of the base section is a circular wall that defines a cylindrical shaped recess sized to receive the top portion of the sleeve. The second side of the flange 1768 is substantially coplanar with the surface of the foundation 150.

The first and second caps 1762, 1764 permit the ductile hold down anchor 1740 to be assembled at a factory. When assembled, joints formed between the first and second caps 1762, 1764, sleeve 1766, and the cylinder 1760 are formed in a manner known in the art to protect the moving parts therein when cast inside the foundation 150.

In one embodiment, the cylinder 1760 is formed from an approximately ⅛" thick steel, and has an inner diameter of approximately 5", with a height of approximately 10". The first cap is formed from an approximately ⅛" thick steel, and the first circular wall has an inner diameter of approximately 5¼", and extends approximately 2" in the direction. The second circular wall has an inner diameter of approximately 1½" and extends approximately 1" in the second direction. The sleeve 1766 is formed from an approximately ⅛" thick steel, and has an inner diameter of approximately 1¼", and is approximately 14" long. The flange is formed from an approximately ⅛" thick steel, and has an outer diameter of approximately 4". The circular wall on the first side extends approximately ¾" downward, and has an inner diameter of approximately 1½". The anchor bolt 1742 has 1" threads and is approximately 2' long, including approximately 1⅜" of the end protruding upward from the surface of the foundation 150.

The various embodiments of the head assembly and the anchor assembly described above attach to an A-frame wall bracing device. It will be appreciated that the ductile head assemblies and/or the ductile anchor assemblies described above may be used on other wall bracing devices so as to provide advantages of ductile couplings described herein. Other wall bracing devices include rectangular shaped panels that are positioned within the wall and interconnect the upper portion of the wall to the foundation. One such panel is disclosed in U.S. Pat. No. 5,706,626 to Mueller titled "Pre-assembled internal shear panel". Another such panel is disclosed in a co-pending application by Mueller titled "Corrugated diaphragm shear panel", Ser. No. 09/897,740, filed on Jun. 29, 2001. Yet another such panel is disclosed in U.S. Pat. No. 6,212,849 to Pellock titled "Pultruded fiberglass reinforced shear panel".

Figure 20B:
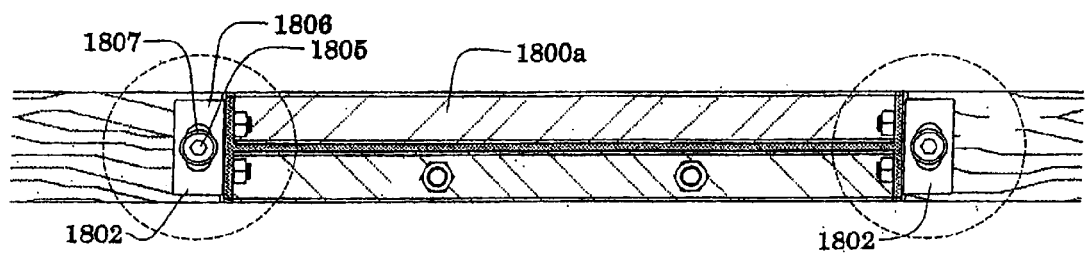
FIGS. 20A and 20B illustrate the use of ductile hold down anchors on a fiberglass or plastic panel.
Figure 20A:
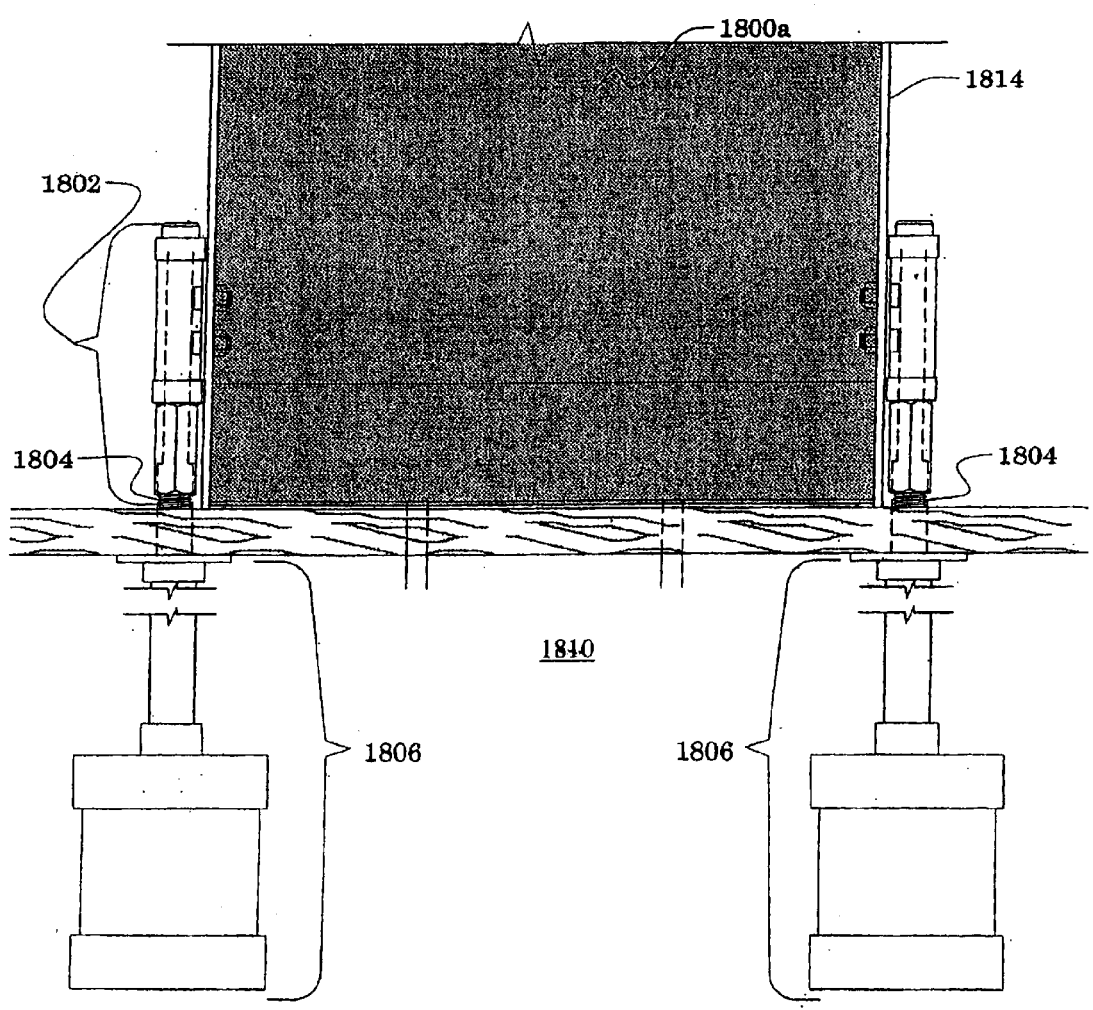

Uses of ductile interconnecting assemblies with wall bracing devices other than the A-frame are illustrated in FIGS. 20A, 20B. In particular, a rectangular shaped panel is interconnected to the foundation by ductile anchor assemblies that are functionally similar to those described above in reference to the A-frame. The rectangular shaped panel illustrated in FIGS. 20A and 20B may represent, but is not limited to, the three panels cited above.

FIGS. 20A and 20B illustrates the rectangular panel 1800 interconnected to a foundation 1810 by a hold down assembly 1802 and a ductile hold down anchor 1806. In this implementation, the panel 1800 is either a plastic or Fiberglass panel that is mounted in the wall in a known manner.

The hold down assembly 1802 attaches to the bottom portion of the panel 1800 in a substantially rigid manner. The hold down assembly 1802 further attaches to an anchor bolt 1804 which is part of the ductile hold down anchor 1806. The cast-in-foundation ductile hold down anchor 1806 is similar to the ductile hold down anchor 1740 described above in reference to FIGS. 18 and 19. Thus, the ductile hold down anchors 1806 positioned below first and second sides 1812 and 1814 of the panel 1800 permit limited vertical movements of the first and second sides 1812 and 1814 of the panel relative to the foundation 1810, so as to dissipate forces that cause such movements.

FIG. 20B is a top view of the shear assembly incorporating the panel 1800a. As is illustrated, the panel 1800a is generally planar and is positioned in the wall. It is attached to the upper portion of the wall using either a rigid attachment or an attachment that includes a spring mechanism so as to be able to damp relative motion therebetween in the manner that will be described in greater detail below. As is also illustrated in FIG. 20B, the panel 1800a is mounted to the anchor assembly via the hold down assembly 1802. The hold down assembly 1802 includes at least one nut 1807 that is mounted on the anchor bolt 1804 through a plate 1806. The plate 1806 includes an opening 1805 that is transverse the plane of the panel 1800 so as to accommodate small misalignment of the wall with respect to the embedded anchor bolts.

Figure 21B:
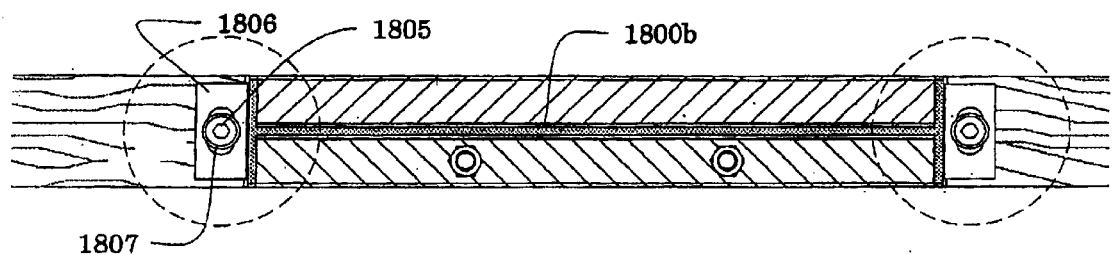
FIGS. 21A and 21B illustrate the use of ductile hold down anchors on a steel panel.
Figure 21A:
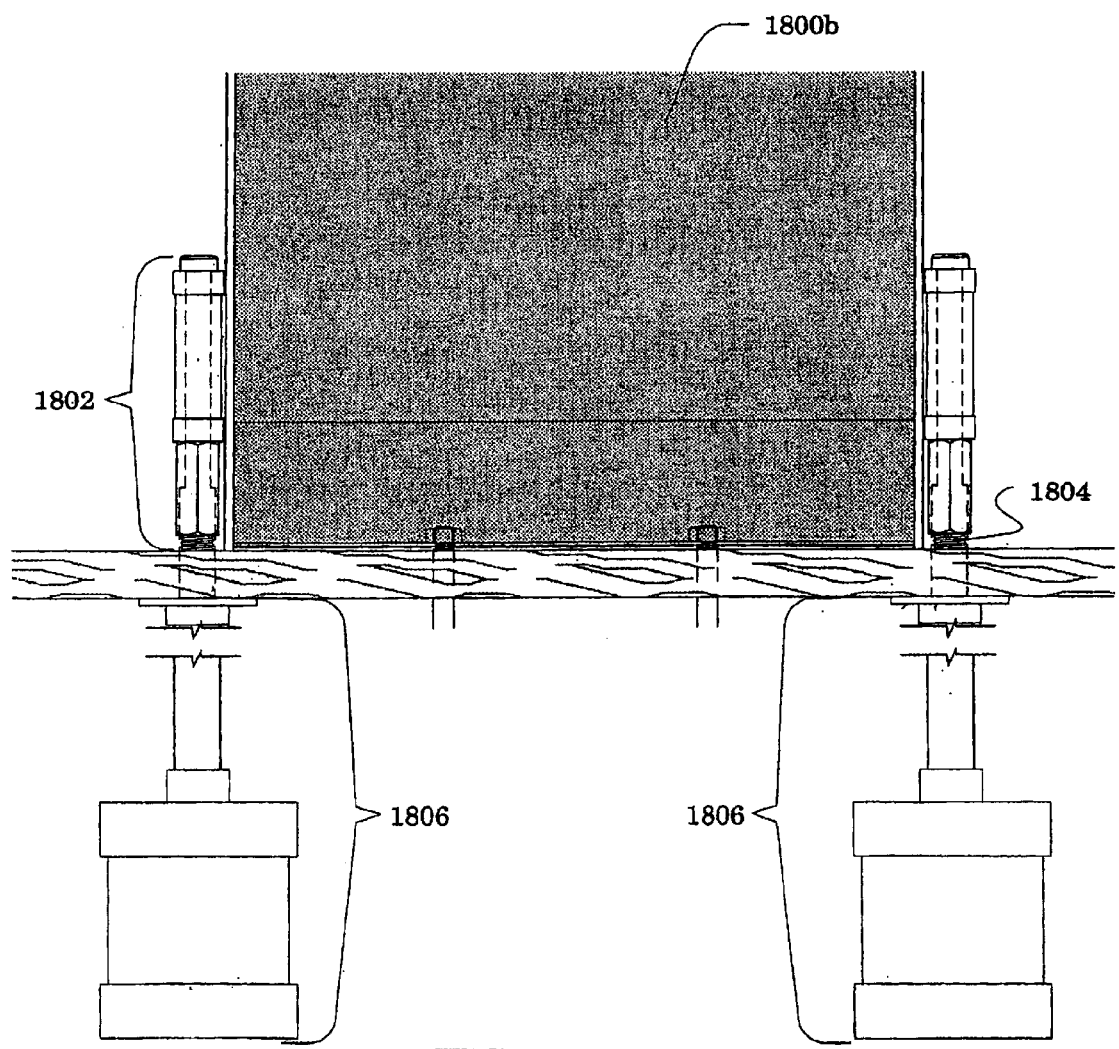

FIGS. 21A and 21B illustrate a similar implementation using a panel 1800b that is made of steel. In this implementation similar hold down assemblies 1802 are used to connect the steel panel to the anchor bolts as disclosed above. Moreover, in this implementation, the ductile hold down anchors 1806 are used to provide for a motion damper device for the assembly.

Figure 22B:
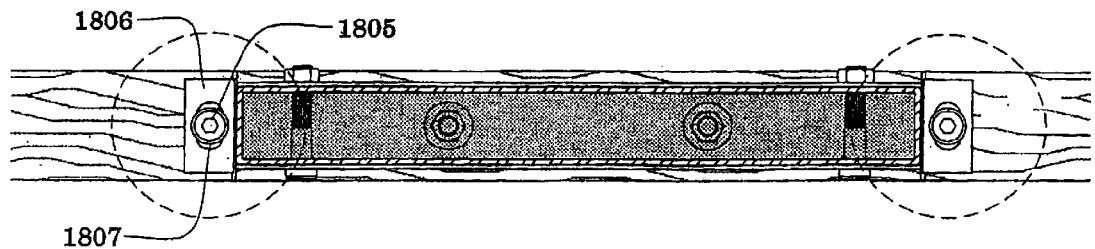
FIGS. 22A and 22B illustrate the use of ductile hold down anchors on a tube steel panel.
Figure 22A:
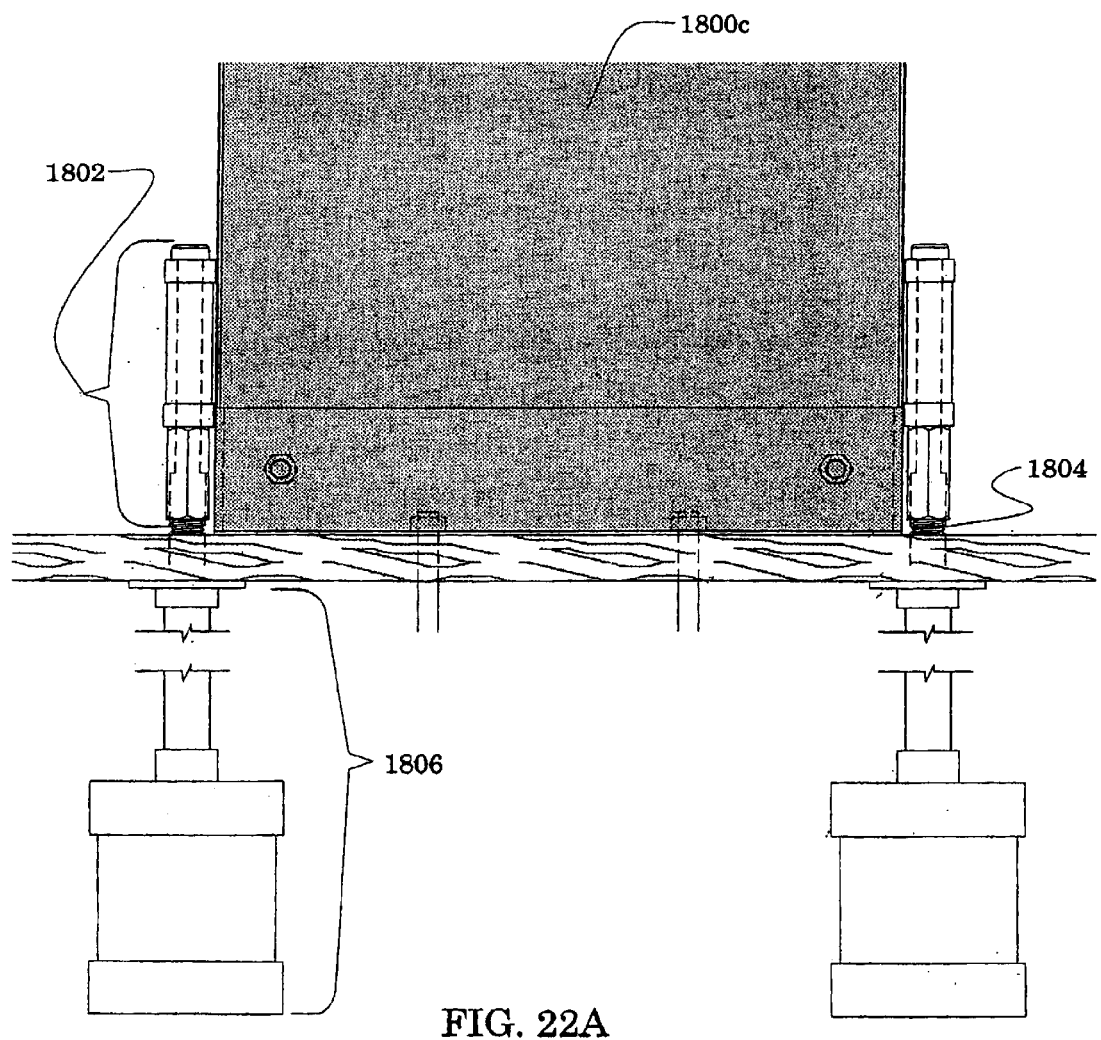

FIGS. 22A and 22B illustrate yet another implementation using a tube-steel panel 1800c. The tube steel panel 1800f is formed of a elongate piece of tube steel that is illustrated in FIG. 22B. The tube steel panel 1800c implementation can also use the hold down assemblies 1802 described above and can also be used in conjunction with the ductile hold down anchors 1806 to provide for motion damping for the assembly.

Figure 23B:
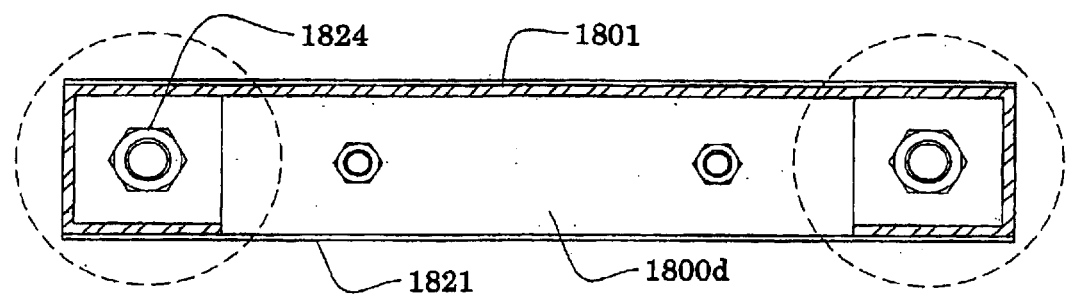
FIGS. 23A and 23B illustrate the use of the ductile hold down anchors round ductile hold down assembly on a Cee channel panel.
Figure 23A:
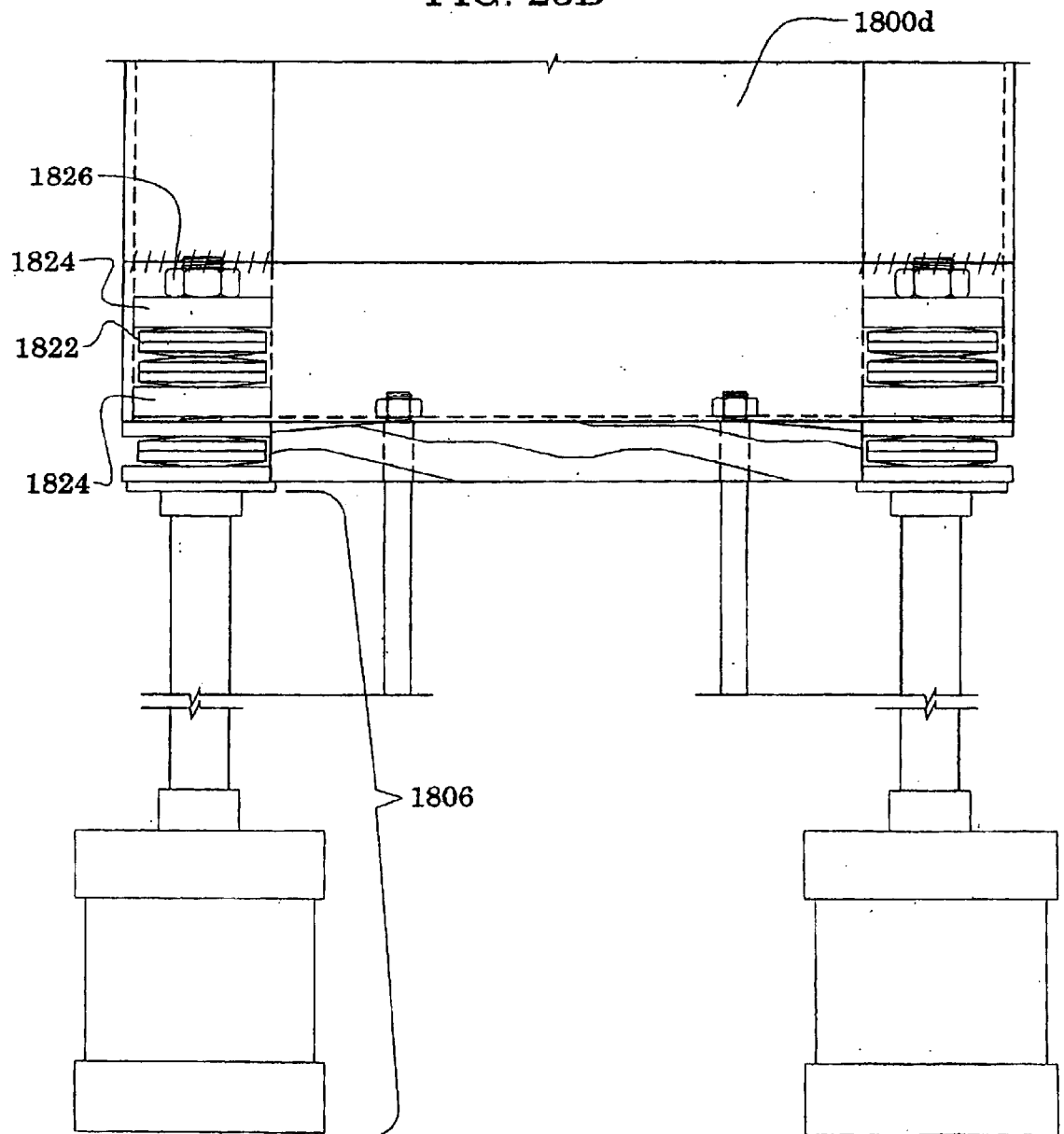

FIGS. 23A and 23B illustrate yet another implementation using a Cee-channel panel 1800d. The Cee-channel panel 1800d includes a Cee-channel member 1801 and a diaphragm 1821 that is positioned so as to enclose the Cee-channel member 1801 in the manner illustrated in FIG. 23B. In the implementation shown FIGS. 23A, 23B, the panel 1800d is coupled to the anchor bolt 1804 with an above-foundation ductile hold down assembly 1820 that is similar in construction and operation as the above-foundation ductile hold down assembly described in conjunction with FIGS. 16A–16J. In particular, a plurality of compression disks 1822 and compression plates 1824 are interposed between the foundation 150 and a hold down nut 1826 that secures the panel 1800d to the anchor bolt. Thus a portion of the transmitted compressive and uplift forces can be dissipated by the compression disks 1822 in the same manner as described above in conjunction with FIGS. 16A–16J.

Moreover, as is also illustrated in FIGS. 23A, 23B, the panel can be additionally equipped with the ductile hold down anchor 1806 discussed above. In this way, even more of the transmitted forces can be dissipated by both the above-foundation ductile hold down assembly 1820 and the ductile hold down anchor 1806 in the previously described manner. It will be appreciated that any of the rectangular panels, as well as the A-frame panel described above can be equipped with one or either of these foundation based motion damping devices or assemblies without departing from the spirit of the present invention.

From the foregoing it should be appreciated that any of a number of different panel style shear assemblies can be used with either the foundation ductile assembles or the above-ground ductile assembles without departing from the spirit of the present invention. The introduction of motion damping either in the foundation or at the interface between the foundation and the shear transfer members provides significant advantages for resisting uplift forces and absorbing shear forces that are exerted on the walls of the buildings.

Figure 24A:
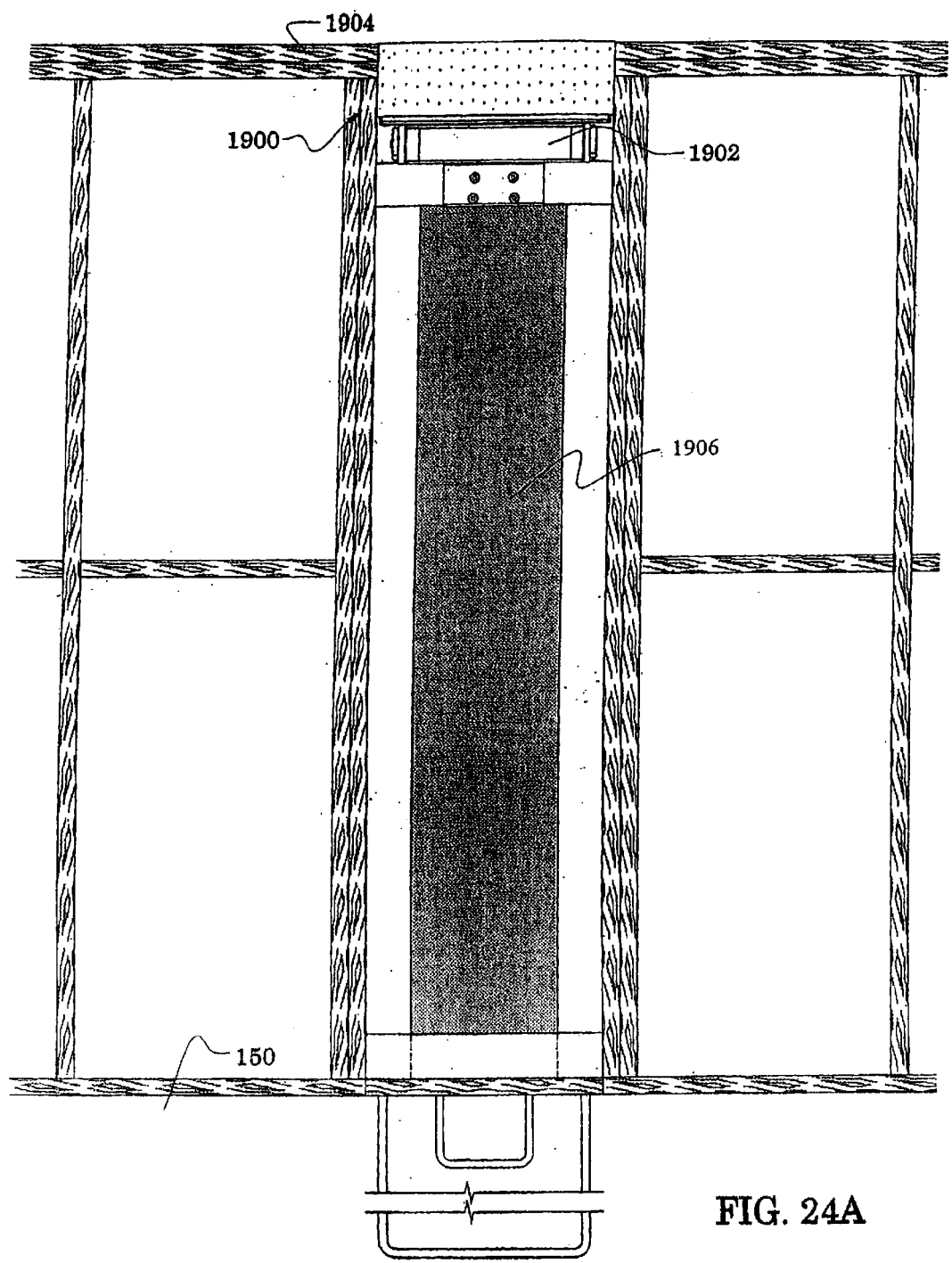
FIGS. 24A and 24B illustrate the use of a damper assembly on a generic shear panel.

FIG. 24A illustrates a generic rectangular shear panel 1906, such as the panels disclosed above in connection with FIGS. 20–23 with a head assembly 1900 that is adapted to include the functionality of the damper 800 discussed above in connection with FIGS. 7–10. Basically, the head assembly 1900 includes a damper 1902 that has essentially the same components as the damper 800 and operates in substantially the same manner. The damper 1902 includes two coaxial springs (not shown) and the damper 1902 is attached between the upper horizontal plate 1904 of the wall and the panel 1906 such that lateral shear forces exerted on the upper horizontal plate 1904 with respect to the foundation 150 results in one of the springs expanding and the other spring contracting in the same manner as described above in conjunction with FIG. 10. In this way, lateral motion can be damped through the use of a damper 1900 that is substantially the same as the damper 800. Thus, it will be appreciated that the damper 800 can be readily adapted to any of a number of known shear assemblies without departing from the spirit of the present invention.

Figure 24B:
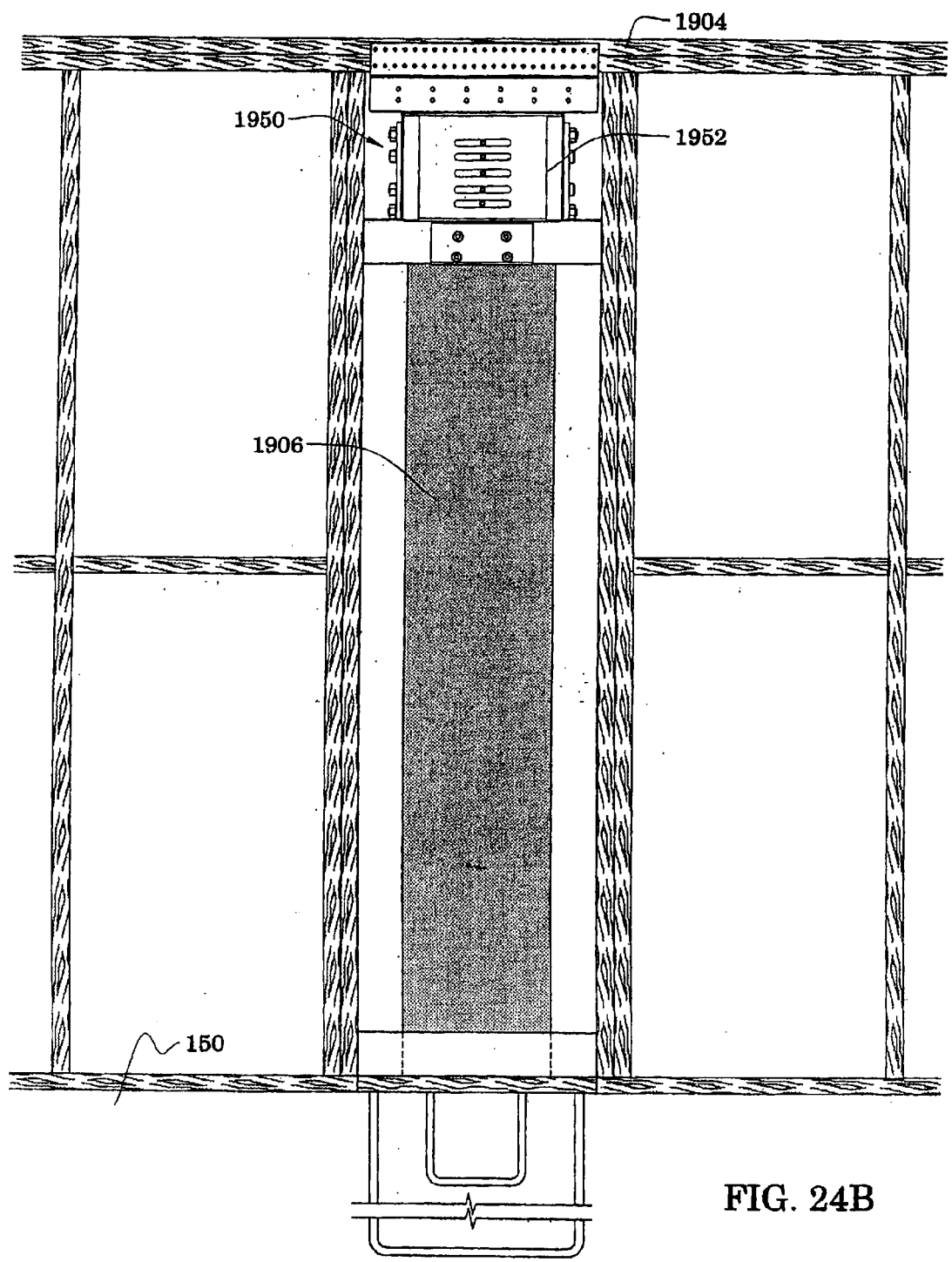

Similarly FIG. 24B illustrates the generic rectangular shear panel 1906, such as the panels disclosed above in connection with FIGS. 20–23 with a head assembly 1950 that is adapted to include the functionality of the damper 400 discussed above in connection with FIGS. 11–13. Basically, the head assembly 1950 includes a damper 1952 that has essentially the same components as the damper 400 and operates in substantially the same manner. The damper 1952 includes two parallel sets of two co-axial springs (not shown) and the damper 1952 is attached between the upper horizontal plate of the wall 1904 and the panel 1906 such that lateral shear forces exerted on the upper horizontal plate 1904 with respect to the foundation result in two of the springs expanding the other two springs contacting in the same manner as described above in conjunction with FIG. 13. In this way, lateral motion can be damped through the use of a damper 1900 that is substantially the same as the damper 800. Thus, it will be appreciated that the damper 1900 can also be readily adapted to any of a number of known shear assemblies without departing from the spirit of the present invention.

It will be appreciated that the A-frame, rectangular shaped panels, and other wall bracing devices may be adapted to attach to the ductile anchoring devices and ductile head assemblies described above by one of ordinary skill in the art. Thus, variety of combinations of head assemblies, wall bracing devices, and anchoring devices may be used to suit various designs of building structures.

Although the foregoing description of the preferred embodiments of the present invention has shown, described and pointed out the fundamental novel features of the invention, it will be understood that various omissions, substitutions and changes in the form of the detail of the apparatus as illustrated, as well as the uses thereof, may be made by those skilled in the art without departing from the spirit of the present invention. Consequently, the scope of the invention should not be limited to the foregoing discussion, but should be defined by the appended claims.

What is claimed is:

1. A system for reducing the effects of lateral and vertical shear forces on a building structure comprising:
    a wall comprising a plurality of vertical studs and at least one upper horizontal plate interconnecting the plurality of vertical studs wherein the wall further comprises a lower portion wherein the upper horizontal plate is adjacent the upper portion of the building and the lower portion of the wall is adjacent a foundation of the building;
    a shear assembly that fits within a space defined by two adjacent studs of the wall, the upper horizontal plate, and the lower portion of the wall, such that the shear assembly couples the upper portion of the wall to the foundation wherein the shear assembly comprises:
        a head assembly that couples the shear assembly to the horizontal plate of the wall;
        an anchor assembly that couples the shear assembly to the foundation;
        an interconnecting member having a first end that is mechanically coupled to the head assembly and a second end that is mechanically coupled to the anchor assembly, wherein the interconnecting member transfers forces between the first and second ends and wherein the interconnecting member comprises a panel member; and
    a lateral motion damping device that is mechanically coupled to the shear assembly so as to be interposed between the building structure and the shear assembly so as to permit limited relative movement between the shear assembly and the building structure such that at least a portion of the lateral shear forces exerted on the upper portion of the wall are dissipated by lateral damping device.

2. The system of claim 1, wherein the panel member comprises a fiberglass panel.

3. The system of claim 1, wherein the panel member is made of metal.

4. The system of claim 3, wherein the panel member is formed of a Cee-channel shape with a diaphragm positioned thereon.

5. The system of claim 3, wherein the panel member is formed of tube steel.

6. A system for reducing the effects of shear forces on a building structure, comprising:
    a wall comprising a plurality of vertical studs wherein the wall includes an upper portion and a lower portion and wherein the upper portion of the wall is adjacent the upper portion of the building and the lower portion of the wall is adjacent a foundation of the building; and
    a shear assembly that fits within a space defined by two adjacent studs of the wall, the upper portion of the wall, and the lower portion of the wall, such that the shear assembly couples the upper portion of the wall to the foundation wherein the shear assembly comprises:
        an interconnecting structure having a first end and a second end, wherein the interconnecting structure transfers forces between the first end and the second end and wherein the interconnecting structure comprises a panel member;
        a head assembly that mechanically couples the upper portion of the wall to the first end of the interconnecting structure;
        at least one spring member that is mechanically interposed between the first end of the interconnecting structure and the upper portion of the wall that permits limited relative movement between the upper portion of the wall and the first end of the interconnecting structure such that at least a portion of lateral shear forces exerted on the head assembly are dissipated by mechanical extension and retraction of the spring member; and
        an anchor assembly that mechanically couples the second end of the interconnecting structure to the foundation.

7. The system of claim 6, wherein the panel member comprises a fiberglass panel.

8. The system of claim 6, wherein the panel member is made of metal.

9. The system of claim 8, wherein the panel member is formed of a Cee-channel shape with a diaphragm positioned thereon.

10. The system of claim 8, wherein the panel member is formed of tube steel.

11. A shear assembly for reducing the effects of shear forces on a building structure that includes a wall attached to a foundation, the shear assembly comprising:
    an interconnecting structure with a first end and a second end, wherein the interconnecting structure transfers forces between the first end and the second end and wherein the interconnecting structure comprises a panel member;
    a head assembly that mechanically couples an upper portion of the wall to the first end of the interconnecting structure; and
    an anchor assembly that mechanically couples the second end of the interconnecting structure to the foundation, wherein the anchor assembly comprises at least one motion damping device that permits limited relative movement between the foundation and the second end of the interconnecting structure such that at least a portion of uplifting and downward compression forces exerted on the anchor assembly are dissipated by the at least one motion damping device.

12. The shear assembly of claim 11, wherein the panel member comprises a fiberglass panel.

13. The shear assembly of claim 11, wherein the panel member is made of metal.

14. The shear assembly of claim 13, wherein the panel member is formed of a Cee-channel shape with a diaphragm positioned thereon.

15. The shear assembly of claim 13, wherein the panel member is formed of tube steel.

16. A shear assembly for reducing shear and uplift forces between an upper portion of a wall and a foundation of a building, the assembly comprising:
    a head assembly that is attached to the upper portion of the wall;
    an interconnecting member that is mechanically coupled to the head assembly wherein the interconnecting member comprises a panel member,
    an anchor assembly that is coupled to the interconnecting member, wherein the anchor assembly includes at least one anchor bolt that is mounted in the foundation so as to be embedded therein; and a motion damping device mechanically coupled to the embedded portion of the anchor bolt of the anchor assembly wherein forces exerted on the upper portion of the wall are transmitted to the foundation via the anchor assembly such that the motion damping device dissipates at least a portion of the forces transmitted to the foundation.

17. The shear assembly of claim 16, wherein the panel member comprises a fiberglass panel.

18. The shear assembly of claim 16, wherein the panel member is made of metal.

19. The shear assembly of claim 18, wherein the panel member is formed of a Cee-channel shape with a diaphragm positioned thereon.

20. The shear assembly of claim 18, wherein the panel member is formed of tube steel.

* * * * *